United States Patent
Okamoto et al.

(10) Patent No.: US 7,859,620 B2
(45) Date of Patent: Dec. 28, 2010

(54) LIQUID CRYSTAL DISPLAY

(75) Inventors: Masayuki Okamoto, Kashiwa (JP); Hajime Hiraki, Kashiwa (JP); Seiichi Mitsui, Kashiwa (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/427,449

(22) Filed: Apr. 21, 2009

(65) Prior Publication Data

US 2009/0268135 A1 Oct. 29, 2009

Related U.S. Application Data

(62) Division of application No. 12/051,776, filed on Mar. 19, 2008, now Pat. No. 7,542,116, which is a division of application No. 11/333,304, filed on Jan. 18, 2006, now Pat. No. 7,394,511, which is a division of application No. 10/774,625, filed on Feb. 10, 2004, now Pat. No. 7,050,132, which is a division of application No. 10/177,149, filed on Jun. 24, 2002, now Pat. No. 6,900,863, which is a division of application No. 09/887,442, filed on Jun. 25, 2001, now Pat. No. 6,563,554, which is a division of application No. 09/217,931, filed on Dec. 22, 1998, now Pat. No. 6,281,952.

(30) Foreign Application Priority Data

| Dec. 26, 1997 | (JP) | ................................... 9-359036 |
| Dec. 22, 1998 | (JP) | ................................. 10-364247 |

(51) Int. Cl.
*G02F 1/1335* (2006.01)

(52) U.S. Cl. ....................................... 349/114; 349/106

(58) Field of Classification Search ................. 349/106, 349/108, 109, 113, 114, 96; 345/88; 359/891
See application file for complete search history.

(56) References Cited

U.S. PATENT DOCUMENTS 5,220,444 A    6/1993 Mitsui et al.

(Continued)

FOREIGN PATENT DOCUMENTS

JP    59-017530 A    1/1984

(Continued)

OTHER PUBLICATIONS

"Brightness Function: Effects of Adaptation," J. C. Stevens et al., Journal of the Optical Society of America, vol. 53, No. 3, pp. 375-385 (Mar. 1963).

*Primary Examiner*—Dung T Nguyen
*Assistant Examiner*—Tai Duong
(74) *Attorney, Agent, or Firm*—Birch, Stewart, Kolasch & Birch, LLP

(57) ABSTRACT

A liquid crystal display is furnished with: a liquid crystal display element having a pair of substrates, to which alignment members are provided to their respective opposing surfaces, and a liquid crystal layer sandwiched by the pair of substrates; an alignment mechanism for providing at least two different director configurations simultaneously on different arbitrary regions used for display in the liquid crystal layer; and a reflection film provided to at least one of the different arbitrary regions showing different director configurations; wherein the different arbitrary regions showing different director configurations are used for a reflection display section for showing reflection display and a transmission display section for showing transmission display, respectively. Examples of the alignment mechanism include an alignment film to which the alignment treatment is applied in different orientations in the reflection display section and transmission display section, respectively, an insulation film having different film thicknesses in the reflection display section and transmission display section, and so forth.

3 Claims, 32 Drawing Sheets

U.S. PATENT DOCUMENTS

| | | |
|---|---|---|
| 5,578,241 A | 11/1996 | Plach et al. |
| 5,598,285 A | 1/1997 | Kondo et al. |
| 5,684,551 A | 11/1997 | Nakamura et al. |
| 5,691,791 A | 11/1997 | Nakamura et al. |
| 5,737,051 A | 4/1998 | Kondo et al. |
| 5,753,937 A | 5/1998 | Shimomaki et al. |
| 5,847,789 A | 12/1998 | Nakamura et al. |
| 6,084,650 A | 7/2000 | Sekiguchi |
| 6,108,064 A | 8/2000 | Minoura et al. |
| 6,124,909 A | 9/2000 | Miyashita et al. |
| 6,147,728 A | 11/2000 | Okumura et al. |
| 6,195,140 B1 | 2/2001 | Kubo et al. |
| 6,211,992 B1 | 4/2001 | Van Aerle et al. |
| 6,327,010 B1 | 12/2001 | Scheuble et al. |
| 6,496,241 B1 | 12/2002 | Tillin |
| 6,580,484 B2 | 6/2003 | Okamoto et al. |
| 6,791,640 B1 | 9/2004 | Okamoto et al. |

FOREIGN PATENT DOCUMENTS

| | | |
|---|---|---|
| JP | 59218483 | 12/1984 |
| JP | 61-230101 | 10/1986 |
| JP | 03-11514 A | 1/1991 |
| JP | 03-245122 A | 10/1991 |
| JP | 07-114020 A | 5/1995 |
| JP | 07-218923 | 8/1995 |
| JP | 7-318929 A | 12/1995 |
| JP | 07-333598 | 12/1995 |
| JP | 7-333598 A | 12/1995 |
| JP | 07318929 | 12/1995 |
| JP | 08-292413 | 11/1996 |
| JP | 09-274327 | 10/1997 |
| JP | 10-142621 | 5/1998 |
| JP | 10-282488 | 10/1998 |
| JP | 10-325953 | 12/1998 |
| JP | 11-052366 A | 2/1999 |
| JP | 11-52366 A | 2/1999 |
| JP | 11-101992 | 4/1999 |
| JP | 11-183892 | 7/1999 |
| WO | WO-98/48320 | 10/1998 |

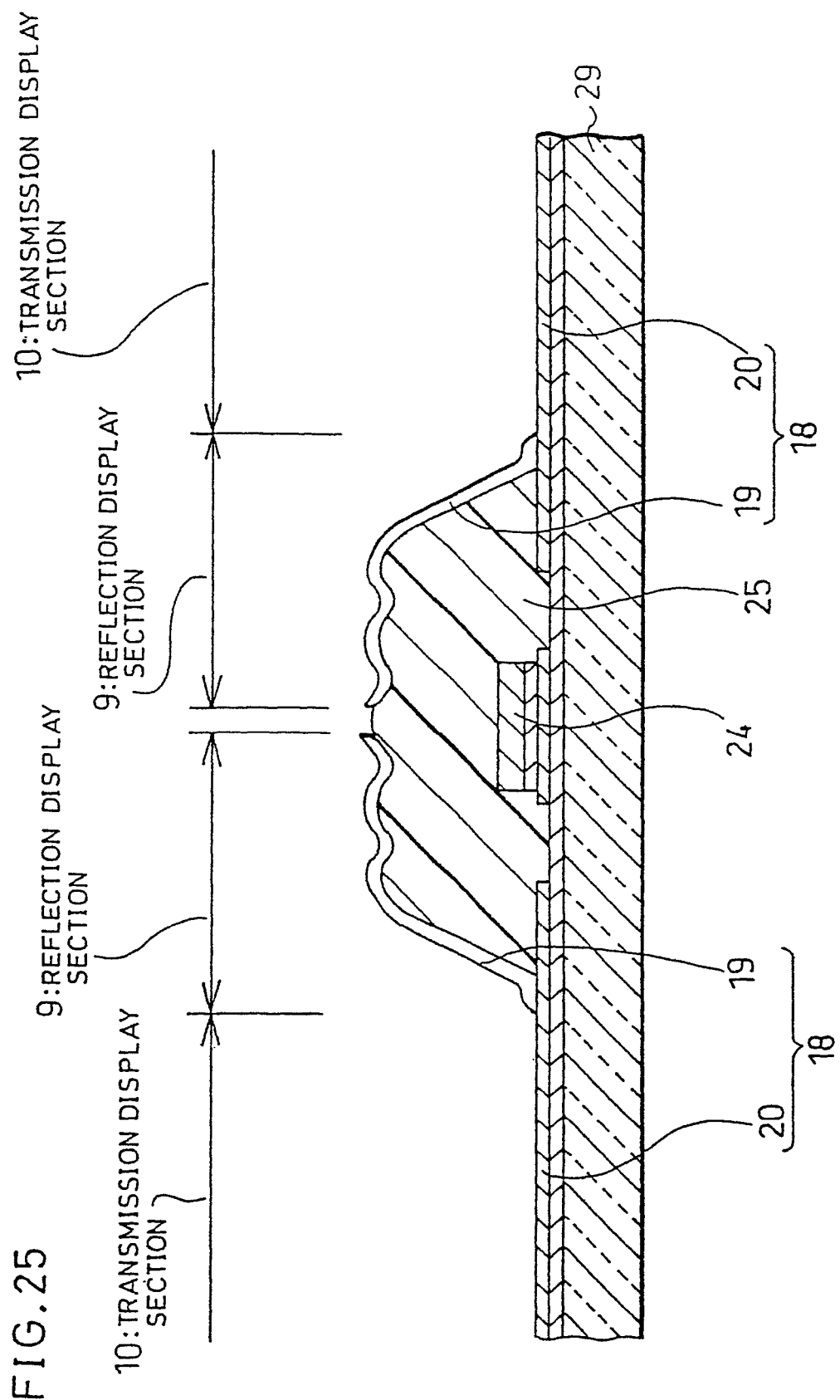

LIQUID CRYSTAL DISPLAY

CROSS REFERENCE TO RELATED APPLICATIONS

This application is a Divisional of application Ser. No. 12/051,776 filed on Mar. 19, 2008 now U.S. Pat. No. 7,542,116, which is a divisional of application Ser. No. 11/333,304 filed on Jan. 18, 2006, now U.S. Pat. No. 7,394,511 issued Jul. 1, 2008, which is a divisional of application Ser. No. 10/774,625 filed on Feb. 10, 2004, now U.S. Pat. No. 7,050,132 issued May 23, 2006, which is a divisional of application Ser. No. 10/177,149 filed on filed on Jun. 24, 2002, now U.S. Pat. No. 6,900,863 B2 issued May 31, 2005, which is a divisional of application Ser. No. 09/887,442 filed Jun. 25, 2001, now U.S. Pat. No. 6,563,554 B2 issued May 13, 2003, which is a divisional of application Ser. No. 09/217,931 filed on Dec. 22, 1998, now U.S. Pat. No. 6,281,952 issued Aug. 28, 2001, for which priority is claimed under 35 U.S.C. §120; and this application claims priority of Application No. 9-359036 filed in Japan on Dec. 26, 1997 and Application No. 10-364247 filed in Japan on Dec. 22, 1998, under 35 U.S.C. §119. The entire contents of all of these applications are hereby incorporated by reference.

FIELD OF THE INVENTION

The present invention relates to liquid crystal displays used for information systems, such as word processors and notebook-type personal computers, video equipment of various kinds, video game machines, portable VCRs, digital cameras, etc. More particularly, the present invention relates to liquid crystal displays used indoors and outdoors, or in automobiles, air-planes, marine vessels, etc. where a variety of ambient light conditions occurs.

BACKGROUND OF THE INVENTION

Conventionally, CRTs (Cathode Ray Tubes), EL (Electroluminescence) elements, PDPs (Plasma Display Panels), etc. have been put into practical use as displays of the light emissive type in which display contents can be overwritten electrically.

However, since this type of displays emit display light and use the same directly for the display, there arises a problem that their power consumption is quite large. Further since a light-emitting surface of the displays of this type serves as a display surface having high reflectance, if the displays of this type are used under the circumstances where ambient light is brighter than the luminance, for example, in direct sunlight, there always occurs a phenomenon known as "wash-out" in which the display light can not be observed.

On the other hand, liquid crystal displays have been put into practical use as color displays which display characters and/or images not by emitting the display light, but by adjusting an amount of transmitted light from a particular light source. These liquid crystal displays include a transmission type and a reflection type.

Of the two types, particularly popular are the liquid crystal displays of the transmission type which employ a light source called "back light" at the back side, namely, behind the liquid crystal cell. Since the liquid crystal displays of the transmission type are advantageous in thinness and lightness, they have been used in diversified fields. On the other hand, the liquid crystal displays of the transmission type consume a large amount of power to keep the back light turned ON. Thus, regardless of the advantage that only a small amount of power is consumed to adjust transmittance of the liquid crystal, a relatively large amount of power is consumed as a whole.

However, the liquid crystal displays of the transmission type (that is, color liquid crystal displays of the transmission type) wash out less frequently compared with the displays of the light emissive type. This is because, in the color liquid crystal displays of the transmission type, the reflectance on the display surface of a color filter layer is reduced by the reflectance reducing technique using a black matrix.

Nevertheless, it becomes too difficult to observe the display light on the color liquid crystal displays of the transmission type when they are used under the circumstances where the ambient light is very strong and the display light is relatively weak. This problem can be eliminated by using brighter back light, but this solution raises another problem that the power consumption is further increased.

Unlike the displays of the light emissive type and liquid crystal displays of the transmission type, the liquid crystal displays of the reflection type show the display using the ambient light, thereby obtaining display light proportional to an amount of the ambient light. Thus, the liquid crystal displays of the reflection type are advantageous in a principle that they do not wash out, and when used in a very bright place in direct sunlight, for example, the display can be observed all the more sharply. Further, the liquid crystal displays of the reflection type do not use the back light for the display, and therefore, have another advantage that the power for keeping the back light turned ON can be saved. For the above reasons, the liquid crystal displays of the reflection type are particularly suitable as the devices for the outdoor use, such as portable information terminals, digital cameras, and portable video cameras.

However, since these conventional liquid crystal displays of the reflection type use the ambient light for the display, the display luminance largely depends on the surrounding environment, and when used under the circumstances where the ambient light is weak, there arises a problem that the display content can not be observed. Particularly, in case that a color filter is used for realizing the color display, the color filter absorbs the light and the display becomes darker. Thus, when used under these circumstances, the above problem becomes more apparent.

To eliminate the above problem, a lighting device called "front light" has been developed as an auxiliary light, so that the liquid crystal displays of the reflection type can be used under the circumstances where the ambient light is weak. Since the liquid crystal displays of the reflection type have a reflection layer behind the liquid crystal layer, they can not use the back light as do the liquid crystal displays of the transmission type. For this reason, the lighting device (front light) lights the liquid crystal displays of the reflection type from the front side, that is, from the display surface side.

On the other hand, liquid crystal displays, employing a transflective film which transmits a part of incident light and reflects the rest, have been put into practical use as the liquid crystal displays which can be used under the circumstances where the ambient light is weak while maintaining the advantages of the liquid crystal displays of the reflection type. The liquid crystal displays using both the transmitted light and reflected light are generally referred to as the liquid crystal displays of the transflective type.

For example, Japanese Laid-open Patent Application No. 218483/1984 (Tokukaisho No. 59-21843) (Japanese Patent Application No. 92885/1983 (Tokugansho No. 58-92885)) discloses a liquid crystal display of the transflective type which modulates the brightness by the TN (Twisted Nematic)

mode, STN (Super-Twisted Nematic) mode, etc., which are known as the liquid crystal display modes for modulating the luminance of the transmitted light. Also, Japanese Laid-open Patent Application No. 318929/1995 (Tokukaihei No. 7-318929) discloses a liquid crystal display of the transflective type, in which a transflective film is provided in close proximity to the liquid crystal layer. Further, Japanese Laid-open Patent Application No. 160878/1994 (Tokukaihei No. 6-160878) (U.S. Pat. Nos. 5,598,285 and 5,737,051) discloses a liquid crystal display of the transmission type adopting the in-plane switching method as a technique for realizing a wider range of viewing angles. However, since the liquid crystal display of the transflective type disclosed in Japanese Patent Application No. 218483/1984 (Tokukaisho No. 59-218483) has the transflective film behind the liquid crystal cell seen from the viewer's side, there occur the following problems (1) and (2).

(1) It is very difficult to set the brightness which affects a visibility of the display device. More specifically, when the brightness of the liquid crystal display of the transflective type is set adequately for the reflection display, the brightness is set high, so that it can be used under the circumstances where the ambient light is insufficient. However, if the brightness is set high by using a polarization plate having high transmittance in the TN method, for example, a contrast ratio, which is defined as a quotient obtained by dividing the brightness in the light display by the brightness in the dark display, becomes too low for the transmission display, thereby deteriorating the visibility. Conversely, when the brightness of the liquid crystal display of the transflective type is set adequately for the transmission display, it is preferable to set the brightness in such a manner as to raise the contrast ratio. However, in this case, the brightness becomes too low for the reflection display, thereby deteriorating the visibility as well.

(2) In the reflection display, since the display is observed by reflecting the light having passed through the liquid crystal layer sandwiched by the two substrates by the reflection film provided behind the liquid crystal cell, there occurs parallax (double image) and the resolution deteriorates, thereby making high-resolution display very difficult.

Also, in the liquid crystal display of the transflective type disclosed in Japanese Laid-open Patent Application No. 318929/1995 (Tokukaihei No. 7-318929), since the transflective film is used as the reflection film, there arises another problem that there is no optical design such that can be suitable for both the reflection display section and transmission display section.

Further, although the in-plane switching method disclosed in Japanese Laid-open Patent Application No. 160878/1994 (Tokukaihei No. 6-160878) is employed in the liquid crystal displays of the transmission type, the director configuration of the liquid crystal on the comb-shaped electrode does not contribute to the display. This is not because, in most cases, the electrode lines are made of metal that does not transmit light, but because the director configuration of the liquid crystal is not changed sufficiently for the transmission display.

SUMMARY OF THE INVENTION

Thus, to eliminate the above problems, the inventors of the present invention tried to apply the display method capable of eliminating the parallax and employed in the liquid crystal displays of the reflection type to the liquid crystal displays of the transflective type. More specifically, the inventors conducted an assiduous study by applying the two following methods to the transflective display:

(a) the GH (Guest-Host) method for filling liquid crystal composition blended with a dichroic dye into the liquid crystal layer; and (b) the reflection type liquid crystal display method using a single polarization plate (hereinafter, referred to as the single polarization plate method).

To apply the above two display methods (a) and (b) which eliminate the parallax to the liquid crystal displays of the transflective type, the reflection layer is provided to touch or almost touch the liquid crystal layer, and a transmission opening is made through the reflection layer to use the transmitted light for the display in addition to the reflected light.

Then, the study revealed the following problems. In case of (a) GH method, when a concentration of the dichroic dye blended with the liquid crystal composition is adjusted adequately for the reflection display, the brightness is sufficiently high but the contrast ratio becomes too low in the transmission display section, thereby failing to obtain satisfactory display. On the other hand, when a concentration of the dichroic dye blended with the liquid crystal composition is adjusted adequately for the transmission display, the contrast ratio is sufficiently high in the transmission display section, but the brightness becomes too low in the reflection display section, thereby failing to obtain satisfactory display.

Also, in case of (b) single polarization plate method, the director configuration of the liquid crystal and a thickness of the liquid crystal layer which determine the optical characteristics, a voltage applied to the liquid crystal for driving the same, etc. are set adequately for either the reflection display section or the transmission display realized by additionally providing a polarization plate or the like behind the display surface (double polarization plate method).

Firstly, the display in the transmission display section when the thickness of the liquid crystal layer is set adequately for the reflection display will be explained. In this case, an amount of change in the polarization state caused when the director configuration of the liquid crystal layer is changed by an external field, such as an electric field, is about a strength such that can realize a satisfactory contrast ratio when incident light from the front, that is, from the display surface side, passes through the liquid crystal layer and exits to the display surface side by passing through the liquid crystal layer again. However, when set in this manner, an amount of the change of the polarization state of the light having passed through the liquid crystal layer is not sufficient in the transmission display section. Thus, even if the polarization plate used for the transmission display alone is provided behind the liquid crystal cell seen from the viewer's side in addition to the polarization plate used for the reflection display and provided to the viewer's side of the liquid crystal cell, that is, the display surface side, the display in the transmission display section is not satisfactory. In other words, when the director configurations (thickness of the liquid crystal layer, director configuration of the liquid crystal, etc.) of the liquid crystal layer are set to be suitable for the reflection display, in the transmission display section, either the brightness is not sufficient or even if the brightness is sufficient, the transmittance does not decrease in the dark display, thereby failing to attain a sufficient contrast ratio for the display.

To be more specific, in case of the reflection display, the director configuration of the liquid crystal in the liquid crystal layer is controlled by means of a voltage applied to the liquid crystal layer to impart a phase difference of about ¼ wavelength to the light passing through the liquid crystal layer only once. When the transmission display is shown with the voltage modulation such that imparts a ¼ wavelength phase modulation to the light passing through the liquid crystal layer set in such a manner as to impart the above-specified phase difference to the light passing through the same, if the transmittance of the transmission display section for the dark display is lowered sufficiently, about half the luminance of the light is absorbed by the polarization plate at the light outgoing side when the transmission display section shows the light display, thereby failing to obtain satisfactory light display. If optical elements, such as a polarization plate and a phase difference compensation plate, are provided to increase the brightness in the light display in the transmission display section, the brightness in the dark display in the transmission display section is increased to about half the brightness in the light display, and the resulting contrast ratio is not satisfactory for the display.

Next, the display in the reflection display section, in case that the director configurations of the liquid crystal layer are set to be suitable for the transmission display, will be explained. In case that the reflection display is shown when the liquid crystal layer is set adequately for the transmission display, the director configuration of the liquid crystal must be controlled by the voltage modulation in such a manner that the polarization state of the light passing through the liquid crystal layer only once is modulated between the two polarization states which are orthogonal each other. The two orthogonal polarization states include two linearly polarized light beams having oscillation planes intersecting at right angles, two circularly polarized light beams of right and left circularly polarization, or two elliptically polarized light beams having the same ellipticity whose major axis orientations intersect at right angles, thereby having opposite rotation directions in their respective photo-electric fields. To realize the modulation of the polarization state in any combination of the above two polarization states being orthogonal each other, a voltage must be modulated in such a manner that the liquid crystal layer imparts a phase difference of ½ wavelength to the light passing through the same. When the polarization state of the light is modulated by any combination of the two orthogonal polarization states in the above manner, satisfactory brightness and contrast ratio can be attained in the transmission display optionally, by the function of the polarization plate, with the help of the phase difference compensation plate.

However, when the liquid crystal layer is set to realize the above control, the reflectance in the reflection display is changed from the light display to the dark display and to the light display again while the transmittance in the transmission display is changed once from the light display to the dark display. Thus, the same display, that is, either the light or dark display, can not be realized simultaneously in the reflection display section and transmission display section by the same liquid crystal alignment changing means (for example, the thickness of the liquid crystal layer is equal, the initial director configuration is identical, and the driving voltage is equal). The problems raised in the methods (a) and (b) are also raised with the liquid crystal display of the transflective type disclosed in aforementioned Japanese Laid-open Patent Application No. 318929/1995 (Tokukaihei No. 7-318929). In addition, a pressure detecting input device (touch panel) superimposed on the liquid crystal display has light reflecting properties, thereby posing a problem that the visibility is deteriorated. This problem is particularly obvious in the liquid crystal displays of the reflection type.

Also, in general, a front light unit used to improve the visibility of the liquid crystal displays of the reflection type under the circumstances where the ambient light is weak has a planar light pipe structure. Thus, the display content is observed through this light pipe, and there arises a problem that the visibility is deteriorated.

The present invention is devised to solve the above problems, and it is therefore an object of the present invention to provide a liquid crystal display with excellent visibility, capable of showing high-resolution display while using both the reflected light and transmitted light for the display. It is another object of the present invention to provide a liquid crystal display with excellent visibility, capable of showing high-resolution color display while using both the reflected light and transmitted light for the display.

The inventors of the present invention continued an assiduous study to fulfill the above and other objects, and achieved the present invention when they discovered that the cause of the problems occurred in the conventional liquid crystal displays applying either the GH method or polarization plate method is that the director configuration of the liquid crystal layer is set identical in the transmission display section and reflection display section at the same time.

Here, the director configuration of the liquid crystal layer indicates not only the director defined as orientation of the liquid crystal molecules at a specific point in the liquid crystal layer, but also the variation of the director field with respect to the position along the normal axis of the liquid crystal layer.

To be more specific, to fulfill the above and other objects, a liquid crystal display of the present invention is a liquid crystal display furnished with a liquid crystal display element having a pair of substrates, to which alignment members are provided to their respective opposing surfaces, and a liquid crystal layer sandwiched by the pair of substrates, characterized in that:

alignment mechanism for providing at least two different director configurations simultaneously on different arbitrary regions used for display in the liquid crystal layer is provided;

a reflecting member is provided to at least one of the different arbitrary regions showing different director configurations; and the different arbitrary regions showing different director configurations are used for a reflection display section for showing reflection display and a transmission display section for showing transmission display, respectively.

According to the above arrangement, the director configuration of the liquid crystal can be different simultaneously. Thus, for example, an amplitude of modulation in an opti-physical quantity, such as an amount of absorbed light (absorbance) in case that a light absorber like a dichroic dye is used for the display, and a phase difference in case that optical anisotropy is used for the display, can be changed separately in each region having a different director configuration of the liquid crystal. Thus, according to the above arrangement, the transmittance or reflectance based on an amplitude of modulation in an opti-physical quantity in response to the director configuration of the liquid crystal layer can be obtained, thereby making it possible to set the optical parameters of the transmission display section and those of the reflection display section independently. Consequently, according to the above arrangement, it has become possible to provide a liquid crystal display of the transflective type with excellent visibility, capable of showing high-resolution display while using both the reflected light and transmitted light for the display.

Also, to fulfill the above and other objects, a liquid crystal display of the present invention is a liquid crystal display furnished with a liquid crystal display element having a pair of substrates, to which alignment members are provided to their respective opposing surfaces, and a liquid crystal layer sandwiched by the pair of substrates, characterized in that:

a region used for display in the liquid crystal layer is composed of regions having at least two different thicknesses of the liquid crystal layer;

the regions having at least two different thicknesses are used for a reflection display section and a transmission display section, respectively;

a reflecting member is provided at least to the reflection display section; and the thickness of the liquid crystal layer is thinner in the reflection display section than in the transmission display section.

According to the above arrangement, the transmittance or reflectance based on an amplitude of modulation in an optiphysical quantity in the regions having different thicknesses of the liquid crystal layer can be obtained, thereby making it possible to set the transmission display section and reflection display section independently. Thus, according to the above arrangement, it has become possible to provide a liquid crystal display of the transflective type with excellent visibility, capable of showing high-resolution display while using both the reflected light and transmitted light for the display.

According to the present invention, satisfactory display can be shown on both the reflection display section and transmission display section by providing the above arrangement to the liquid crystal display. However, there is an optimal ratio of the reflection display section to the transmission display section for showing satisfactory display, and this optimal ratio varies depending on whether color display or monochrome display is desired, or whether the display is shown mainly by the reflection display or transmission display.

In the liquid crystal display of the present invention, in case that both the reflection display section and the transmission display section show color display, it is preferable that an area of the reflection display section accounts for 30% or above and 90% and less of a total of areas of the reflection display section and the transmission display section.

When the color display is shown on the liquid crystal display of the present invention in the above manner, besides the liquid crystal layer, design of the color filter layer, which plays an important role in color reproduction, is critical. According to the study of the inventors of the present invention, the liquid crystal display of the transflective type will be used in typical two styles.

One is a style that mainly shows the transmission display in general use and uses the reflection display supplementarily, so that the wash-out can be prevented under the lighting environment where the ambient light is very strong, and therefore, can be used extensively in diversified lighting environments compared with the displays of the luminous type or the liquid crystal displays of the transmission type. The other is a style that mainly shows the reflection display in general use by exploiting the advantages of the reflection display that the power consumption is small and the lighting device known as the back light is turned ON only when used under the circumstances where the lighting is weak. Hence, like in the former style, this style can be used extensively in diversified lighting environments.

In the former style (the style showing the transmission display mainly), by providing a color filter having a transmission color at least in the transmission display section of the regions making up the region of each pixel in at least one of the pair of substrates, it has become possible to provide a liquid crystal display with excellent visibility, capable of showing high-resolution color display while using both the reflected light and transmitted light for the display.

When the color display is shown in the above manner, it is effective if the color filter having a transmission color is provided at least to the transmission display section in each pixel, and in the reflection display section, either no color film is used or a color filter having the same brightness as the brightness of the color filter provided to the transmission display section or a color filter having a transmission color brighter than the brightness in the color filter provided to the transmission display section, is provided at least partially.

In the latter style (the style showing the reflection display mainly), by providing a color filter having a transmission color at least in the reflection display section of the regions making up the display region of each pixel in at least one of the pair of substrates, it has become possible to provide a liquid crystal display with excellent visibility, capable of showing high-resolution color display while using both the reflected light and transmitted light for the display.

When the color display is shown in the above manner, it is effective if the color filter having a transmission color is provided to at least the reflection display section in each pixel, and in the transmission display section, either no color film is used or a color filter having chroma as good as the chroma of the color filter provided to the reflection display section or a color filter having a transmission color with better chroma than the chroma of the color filter provided to the reflection display section, is provided at least partially.

According to the above arrangement, it has become possible to provide a liquid crystal display with excellent visibility, capable of showing a high-resolution color display while using both the reflected light and transmitted light for the display.

For a fuller understanding of the nature and advantages of the invention, reference should be made to the ensuing detailed description taken in conjunction with the accompanying drawings.

BRIEF DESCRIPTION OF THE DRAWINGS

FIG. 25 is a cross section of the TFT element substrate taken on line B-B' of FIG. 23(a);

DESCRIPTION OF THE EMBODIMENTS

Figure 1:
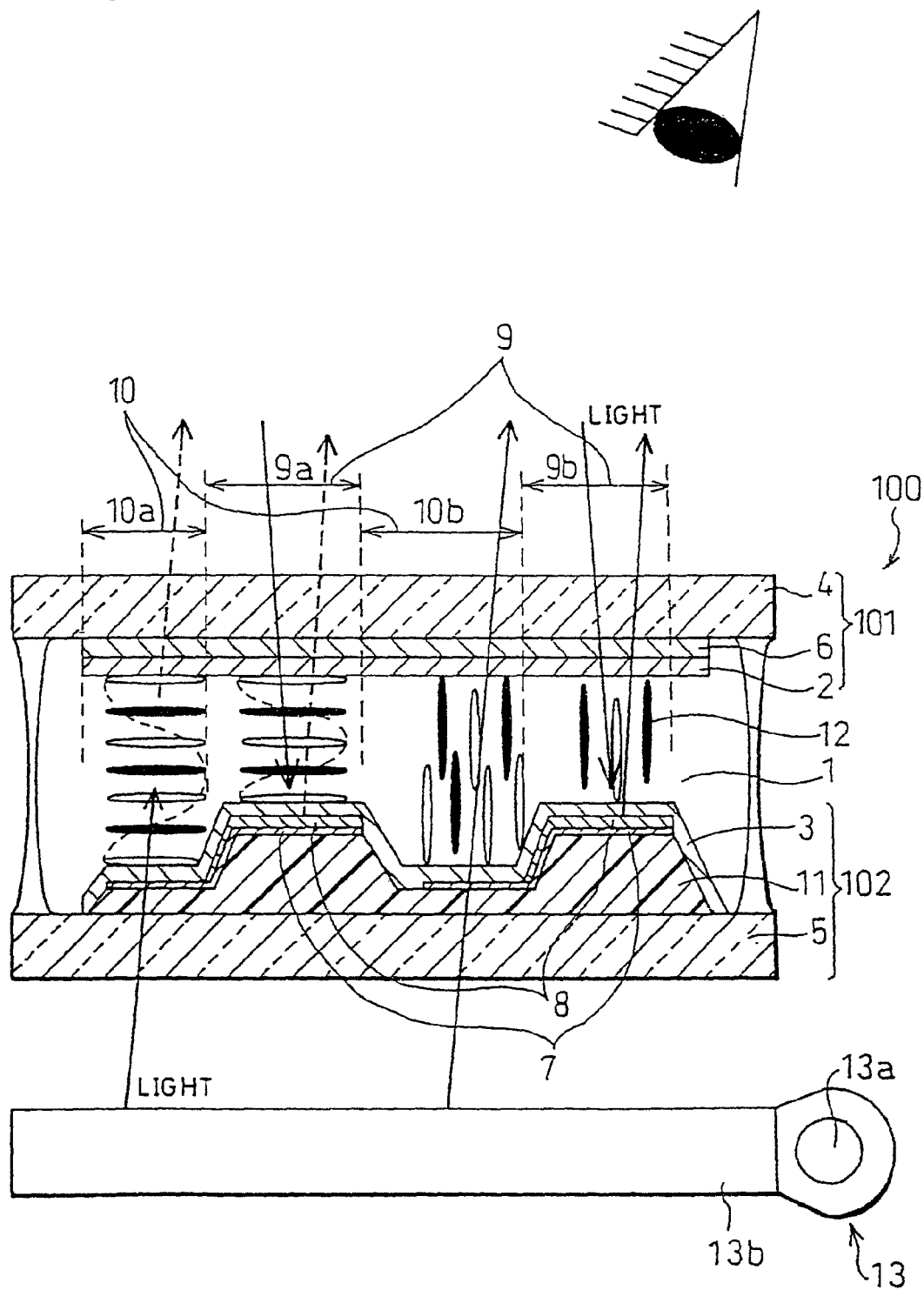
FIG. 1 is a cross section showing a major portion of a liquid crystal display in accordance with Embodiment 1 of the present invention.

A liquid crystal display of the present invention is characterized in that the director configuration of the liquid crystal can take different states respectively in the reflection display section and transmission display section at the same time. Here, the director configuration of the liquid crystal means not only the director defined as orientation of the liquid crystal molecules at a particular point in the liquid crystal layer, but also the variation of the director field with respect to the position along the normal axis of the liquid crystal layer. Thus, in the present invention, methods of realizing different director configurations of the liquid crystal in the reflection display section and transmission display section and alignment mechanisms used for these methods are classified into three categories, and each will be explained separately below.

In a first category method, the liquid crystal is given different director configurations in the reflection display section and transmission display section by means of an alignment mechanism formed to impose a specific condition of the liquid crystal layer differently in the reflection display section and transmission display section.

To be more specific, examples of the first category method include:

(1) using an alignment mechanism that twists the director of the liquid crystal at totally different twist angles in the reflection display section and transmission display section;

(2) using an alignment mechanism that greatly changes the tilt angle of the director of the liquid crystal with respect to the substrates;

(3) providing liquid crystal materials of different kinds in the reflection display section and transmission display section; and (4) blending different kinds of dyes with the liquid crystal material at different concentrations in the transmission display section and reflection display section (in this case, a liquid crystal material of the same kind may be used in the transmission display section and reflection display section).

The liquid crystal display of the present invention is furnished with the mechanism used for implementing the above methods as the alignment mechanism of the present invention. The first category method and the alignment mechanism used for the first category method may be a combination of any of the above example methods (1) through (4), and different director configurations of the liquid crystal can be realized in the reflection display section and transmission display section by the above example methods and the alignment mechanism used for these example methods.

In a second category method, the liquid crystal is given different director configurations in the reflection display section and transmission display section by display content overwriting means for overwriting the display content with a time lapse (in other words, the alignment mechanism that makes the director configurations of the liquid crystal different in the transmission display section and reflection display section is a display content overwriting means). The display content overwriting means adopted in the second category method can be any of the existing display overwriting means.

More specifically, examples of the second category method include:

(5) overwriting the director configuration of the liquid crystal by using different electrodes in the transmission display section and reflection display section as the alignment mechanism, in other words, applying different voltages as the display content overwriting means directly to the reflection display section and transmission display section;

(6) applying substantially different voltages to the reflection display section and transmission display section from the same electrode. In this case, the liquid crystal is given with different director configurations in the reflection display section and transmission display section driven by a common electrode by providing an insulation body (for example, an insulation film) having different layer thicknesses in the reflection display section and transmission display section between the liquid crystal layer and the electrode driving the same; and (7) making the directions of the electric fields different in the reflection display section and transmission display section. In case that the display is shown by changing the in-plane alignment direction of the liquid crystal of the liquid crystal layer by means of an electrode group provided in parallel with one of the substrates sandwiching the liquid crystal layer for supplying different potentials to the liquid crystal layer, the director configurations of the liquid crystal differ greatly at a region between the electrodes and a region on the electrode. Thus, these regions having different director configurations of the liquid crystal may be used for the reflection display and transmission display, respectively. Further, a method of applying different potentials to the liquid crystal layer aligned perpendicularly to the substrates by the same electrode group may be adopted. In case of adopting the second category method, the electrodes or insulation body used for implementing the above example methods, or a combination thereof corresponds to the alignment mechanism of the present invention, and naturally, the resulting liquid crystal display is furnished with such alignment mechanism.

In a third category method, the director configurations of the liquid crystal do not differ greatly, but the thicknesses of the liquid crystal layer, which are factors that determine the optical characteristics, differ in the reflection display section and transmission display section. To implement the third category method, an insulation film having different thicknesses in the reflection display section and transmission display section, substrates having different layer thicknesses or shapes in the reflection display section and transmission display section, etc. are used as the above alignment mechanism.

In case of adopting the third category method, the director configuration of the liquid crystal may be twisted uniformly like in the TN method adopted in the liquid crystal display employing two polarization plates, for example. In this case, the director configuration of the liquid crystal is parallel to the substrates sandwiching the liquid crystal layer, and the director is twisted while changing its direction in the plane of one of the substrates in accordance with a distance from that substrate. When this director configuration of the liquid crystal is adopted in the reflection display section and transmission display section by varying the thickness of the liquid crystal layer, satisfactory display can be realized both in the reflection display section and transmission display section, because the optical characteristics vary with the thickness of the liquid crystal layer.

Also, in the GH method, since varying the thickness of the liquid crystal layer can offer substantially the same effect as the effect obtained in case of changing the concentration of the dye, satisfactory display can be realized both in the reflection display section and transmission display section, even when the director configurations of the liquid crystal are substantially the same in the reflection display section and transmission display section.

As has been explained, the method for realizing different director configurations of the liquid crystal in the reflection display section and transmission display section and the alignment mechanism used for this method are classified into three categories, and the liquid crystal display method used in the liquid crystal display of the present invention realized by the above method and alignment mechanism is not especially limited, and can be selected from the methods using a change of the director configuration of the liquid crystal for the display. Examples of the liquid crystal display method applicable in the present invention include: a mode using the nematic phase of the liquid crystal composition for the display, such as the TN method, STN method, nematic bistable mode, vertical alignment mode, hybrid alignment mode, and ECB (Electrically Controlled Birefringence) mode. Also, a mode using scattering, such as the polymer dispersing type liquid crystal mode and dynamic scattering method, can be used as the above liquid crystal display method. Further, the surface stabilized ferroelectric liquid crystal display method using ferroelectric liquid crystal composition and the thresholdless switching anti-ferroelectric liquid crystal display method using anti-ferroelectric liquid crystal can be used as the above liquid crystal display method of the present invention, because they also use a change of the director configuration of the liquid crystal for the display.

In case of adopting the third category method, the liquid crystal display method used in the present invention can be a method of using modulation of the optical rotatory polarization like the TN method, a method of using the modulation of the retardation like the ECB mode, or a method of modulating light absorption (absorbance) like the GH method. In case of adopting the third category method, besides the above methods, any method is applicable, provided that the thickness of the liquid crystal layer is a critical factor for determining the optical characteristics, and provided that making the liquid crystal layer thick in the transmission display section and thin in the reflection display section can offer an effect of realizing satisfactory display.

As has been discussed, the liquid crystal display of the present invention is furnished with a liquid crystal display element having a pair of substrates, to which alignment members (alignment means) are provided to their respective opposing surfaces, and a liquid crystal layer sandwiched by the pair of substrates, and it is arranged in such a manner that: it is furnished with alignment mechanism for imparting at least two different director configurations to arbitrary and different areas in the liquid crystal layer used for the display simultaneously; a reflecting member (reflecting means) is provided in at least one of the regions showing the different director configurations in the liquid crystal layer; and the regions showing the different director configurations are used as a reflection display section for showing reflection display and a transmission display section for showing transmission display, respectively. This arrangement makes it possible to obtain transmittance or reflectance based on an amplitude of modulation in an opti-physical quantity in response to the director configuration of the liquid crystal layer, thereby realizing a high contrast ratio without causing any parallax. Consequently, not only can the visibility under dark circumstances be improved, but also satisfactory visibility can be obtained even when the ambient light is strong.

To change an amplitude of modulation in an opti-physical quantity (such as absorption of light and a phase difference caused by optical anisotropy) in the reflection display section and transmission display section independently, even if the alignment direction of the liquid crystal determined by the applied voltage is oriented to substantially the same direction across a region of the liquid crystal layer used for the display, regions having different thicknesses of the liquid crystal layer can attain substantially the same effect as the effect obtained when the alignment direction of the liquid crystal layer is changed in these regions. For this reason, another liquid crystal display of the present invention is furnished with a liquid crystal display element having a pair of substrates, to which alignment members (alignment means) are provided to their respective opposing surfaces, and a liquid crystal layer sandwiched by the pair of substrates, and it is arranged in such a manner that:

a region used for display in the liquid crystal layer is composed of regions having at least two different thicknesses of the liquid crystal layer;

the regions having at least two different thicknesses are used for a reflection display section and a transmission display section, respectively;

a reflecting member (reflecting means) is provided at least to the reflection display section; and the thickness of the liquid crystal layer is thinner in the reflection display section than in the transmission display section.

This arrangement also makes it possible to obtain transmittance or reflectance based on an amplitude of modulation in an opti-physical quantity in regions having different thicknesses of the liquid crystal layer. Accordingly, the transmission display section and reflection display section can be set independently. Thus, according to the above arrangement, a high contrast ratio can be attained without causing any parallax, and not only can the visibility under dark circumstances be improved, but also satisfactory visibility can be obtained even when the ambient light is strong.

A liquid crystal display realizing satisfactory reflection display and transmission display by changing the thickness of the liquid crystal layer in the reflection display section and transmission display section will be explained mainly in Embodiments 1 and 2 below.

Embodiment 1

Mainly referring to FIG. 1, an example liquid crystal display adopting the GH method will be explained in the present embodiment.

FIG. 1 is a cross section of a major portion of the liquid crystal display in accordance with the present embodiment. As shown in the drawing, the liquid crystal display includes a liquid crystal cell 100 (liquid crystal display element), and optionally, a back light 13 (lighting device) serving as back light means. The liquid crystal cell 100 and back light 13 are provided sequentially in this order from the viewer's (user's) side.

As shown in the drawing, the liquid crystal cell 100 is composed of a liquid crystal layer 1 sandwiched by an electrode substrate 101 (first substrate) and an electrode substrate 102 (second substrate). The electrode substrate 101 has an alignment film 2 on a surface touching the liquid crystal layer 1 (an interface between the first substrate and the liquid crystal layer 1), and the electrode substrate 102 has an alignment film 3 on a surface touching the liquid crystal layer 1 (an interface between the second substrate and the liquid crystal layer 1).

The electrode substrate 101 is composed of a substrate 4 made of, for example, a light transmitting glass substrate on which are formed an electrode 6 (voltage applying means) for applying a voltage to the liquid crystal layer 1, and the electrode 6 is covered with the alignment film 2 (alignment mechanism) to which the rubbing treatment has been applied.

On the other hand, the electrode substrate 102 provided in such a manner as to oppose the electrode substrate 101 through the liquid crystal layer 1 is composed of a light transmitting substrate 5 on which are formed counter electrodes 7 (voltage applying means) opposing the electrode 6 through an insulation film 11 for applying a voltage to the liquid crystal layer 1.

The insulation film 11 is made in such a manner as to have different film thicknesses in regions corresponding to a region of the liquid crystal layer 1 used for the display, so that the above region of the liquid crystal layer 1 used for the display has at least two different thicknesses of the liquid crystal layer (herein, exactly two different thicknesses). To be more specific, the insulation film 11 is made thinner in the region corresponding to the transmission display section 10 than in the region corresponding to the reflection display section 9.

In the region of the electrode substrate 102 corresponding to the reflection display section 9, a reflection film 8 (reflecting means) is formed to cover the electrodes 7, and further, the alignment film 3 (alignment member, alignment mechanism) to which the rubbing treatment has been applied is formed to cover the electrodes 7 and reflection film 8.

Here, each of the electrodes 6 and 7 is a transparent electrode made of ITO (Indium Tin Oxide), for example. Also, a voltage is applied to the electrodes 6 and 7 to apply an electric field in the liquid crystal layer 1. Thus, the display is controlled by a voltage applied in accordance with the display content.

Also, the reflection film 8 has light reflecting properties, and is made of metal, such as aluminum or silver, or composed of dielectric multi-layer film mirror. In case that the reflection film 8 is made of a conducting material, the reflection film 8 may also serve as an electrode instead of the electrodes 7. In other words, the reflection film 8 may be a reflective pixel electrode serving both as a liquid crystal driving electrode for driving the liquid crystal layer 1 and the reflecting means. Further, the reflection film 8 may be a color reflection film which reflects light having a wavelength in a range selected from the visible light, as the case may be.

It should be appreciated that the materials and producing methods of each member forming the electrode substrates 101 and 102 are not limited to the above disclosure, and any known material and typical method are applicable. Also, the arrangement of the liquid crystal display is not limited to the above-described arrangement. For example, it may be arranged in such a manner that voltages are applied to the electrodes 6 and 7 of the reflection display section 9 and transmission display section 10 directly from an exterior of the liquid crystal cell 100 in the form of a signal from a touch panel (pressed coordinate detecting type input means) or the like, which will be explained in embodiments below. Also, active elements, such as TFT elements and MIM elements, may be provided as the switching elements.

As shown in FIG. 1, the electrode substrates 101 and 102 are bonded to each other with a sealing agent or the like in such a manner that their respective alignment films 2 and 3 oppose each other, and liquid crystal composition is filled into a space therebetween, whereby the liquid crystal layer 1 is formed.

The back light 13 is provided behind the liquid crystal cell 100 seen from the viewer's (user's) side, that is, at the back side of the electrode substrate 102. The back light 13 is mainly composed of a light source 13a and a light pipe 13b. For example, the light source 13a is provided along the side surface of the light pipe 13b, and accordingly, the light pipe 13b receives light emitted from the light source 13a on the side surface where it is provided, and emits the received light to an object, namely, the liquid crystal cell 100. Here, any existing lighting device can be used as the back light 13.

In the above-arranged liquid crystal display, the reflection display section 9 on which is formed the reflection film 8 shows the display by controlling the reflection luminance of the ambient light incident on the display surface from the substrate 4 side, that is from the viewer's side, by changing the director configuration of the liquid crystal. The transmission display section 10 on which is formed no reflection film 8 shows the display by controlling the luminance of the transmitted light incident on the display surface from the substrate 5 side by changing the director configuration of the liquid crystal. In this case, light emitted from the back light 13 provided behind the liquid crystal cell 100 may be used, as the case may be.

As has been explained, the liquid crystal display of FIG. 1 is assembled in such a manner as to have different thicknesses of the liquid crystal layer in the reflection display section 9 and transmission display section 10. Consequently, the present liquid crystal display has substantially different director configurations of the liquid crystal in the reflection display section 9 and transmission display section 10.

Here, the arrangement of the liquid crystal display having different thicknesses in the reflection display section 9 and transmission display section 10 will be explained in the following.

The liquid crystal layer can be given different thicknesses in the reflection display section 9 and transmission display section 10, for example, by providing the insulation film 11 having different thicknesses in the reflection display section 9 and transmission display section 10 as shown in FIG. 1.

In order to vary the thickness of the liquid crystal layer in the reflection display section 9 and transmission display section 10, it is sufficient if at least one of the substrates (electrode substrates 101 and 102) sandwiching the liquid crystal is arranged in the above manner.

Therefore, the insulation film 11 is not necessarily provided on the substrate 4 and it can be provided on the substrate 5 instead. Even in this case, the reflection film 8 is provided on the substrate 5 on the electrode substrate 102 side (that is, opposing side to the display surface side (electrode substrate 101 side) through the liquid crystal layer 1).

In the liquid crystal display of FIG. 1, the thickness of the liquid crystal layer is changed in the reflection display section 9 and transmission display section 10 by changing the thickness of the insulation film 11 in a region corresponding to the reflection display section 9 and a region corresponding to the transmission display section 10. However, the same can be realized by forming the substrate 4 or 5 it self in exactly the same shape as the insulation film 11 of FIG. 1.

When the thickness of the insulation film 11 is changed in the region corresponding to the reflection display section 9 and the region corresponding to the transmission display section 10, the insulation film 11 on the region corresponding to the transmission display section 10 is made thinner than the insulation film 11 on the region corresponding to the reflection display section 9 as shown in FIG. 1, or the insulation film 11 is formed on the region corresponding to the reflection display section 9 alone, and not on the region corresponding to the transmission display section 10.

Further, the thickness of the liquid crystal layer in the reflection display section 9 or in the transmission display section 10 is kept constant by providing spacers (not shown) to the liquid crystal layer 1 or by any other applicable means. For example, when spherical spacers are provided to the liquid crystal layer 1, the thickness of the thinner liquid crystal layer in the reflection display section 9 is almost as large as the diameter of the spacers.

The liquid crystal layer 1 sandwiched by a pair of the substrates prepared in the above manner, that is, the electrode substrates 101 and 102, is made of the liquid crystal composition as previously mentioned. As the liquid crystal display method using the liquid crystal layer 1, the GH method may be used, in which the liquid crystal composition prepared by blending a dichroic dye 12 with liquid crystal is used as shown in FIG. 1, and the director configuration of the liquid crystal and the alignment direction of the dichroic dye 12 are changed simultaneously upon application of an electric field in the liquid crystal layer 1, so that the display is shown using the variance of the absorption coefficient caused by the dichroism.

Next, the following will explain, with reference to FIG. 1, the action of the liquid crystal layer 1 in the GH method, and the display principle in case that the thicknesses of the liquid crystal layer are different in the reflection display section 9 and transmission display section 10.

When the display is shown on the liquid crystal display of FIG. 1, the display is shown in the transmission display section 10 by letting light emanated from the back light 13 or the like behind the liquid crystal layer 1 pass through the liquid crystal layer 1 only once and go out from the display surface as the display light as is indicated by an arrow. Here, the dichroic dye 12 blended in the liquid crystal composition in the liquid crystal layer 1 changes its light absorbance in response to the director configuration of the liquid crystal. Thus, when the liquid crystal is aligned in parallel with the display surface (electrode substrate 101) as shown in a transmission display section 10a (which is referred to as planer alignment, hereinafter), the dichroic dye 12 in this region absorbs most of the light passing through the liquid crystal layer 1, and the transmission display section 10 shows the dark display. On the other hand, when the liquid crystal is aligned perpendicular to the display surface (electrode substrate 101) as shown in a transmission display section 10b, (which is referred to as the vertical alignment), the dichroic dye 12 absorbs a smaller amount of the light, and the transmission display section 10 shows the light display.

By contrast, the reflection display section 9 uses the light incident on the display surface from the viewer's side for the display. To be more specific, as is indicated by an arrow, the light incident on the display surface passes through the liquid crystal layer 1 is reflected by the reflection film 8, passes through the liquid crystal layer 1 again, and exits from the display surface as the display light. Here, when the liquid crystal is aligned in parallel with the display surface as shown in a reflection display section 9a, the dichroic dye 12 in this region absorbs most of the light, and the reflection display section 9 shows the dark display. On the other hand, when the liquid crystal is aligned perpendicular to the display surface as shown in a reflection display section 9b, the dichroic dye 12 in this region absorbs less amount of the light, and the reflection display section 9 shows the light display.

Thus, the light display and dark display can be shown by controlling the director configuration of the liquid crystal by supplying a potential difference between the electrodes 6 and 7. In this case, the initial director configuration of the liquid crystal is not especially limited. For example, the liquid crystal may be aligned in parallel with the display surface or twisted further when no voltage is applied. Conversely, the liquid crystal may be aligned perpendicular to the display surface when no voltage is applied. In the former case (parallel when no voltage is applied or further with a twist), liquid crystal having positive dielectric constant anisotropy can be used. On the other hand, in the latter case, (perpendicular when no voltage is applied), liquid crystal having negative dielectric constant anisotropy can be used. As has been explained, the initial director configuration of the liquid crystal is not especially limited, but it is necessary to adjust the thickness of the insulation film 11 in such a manner as to secure a thickness of the liquid crystal layer suitable for the director configuration of the liquid crystal to be used.

Here, for ease of production of the liquid crystal layer 1, liquid crystal layer 1, as in typical liquid crystal displays, is preferably provided continuously across the reflection display section 9 and transmission display section 10 or a plurality of display pixels, as shown in FIG. 1.

Even when the liquid crystal layer 1 is provided across the reflection display section 9 and transmission display section 10, if the thicknesses of the liquid crystal layer are different in the reflection display section 9 and transmission display section 10, a distance the light travels by passing through the liquid crystal layer 1 only once in the transmission display section 10 to serve as the display light in the end can be set equal to a distance the light travels by passing and returning through the liquid crystal layer 1 in the reflection display section 9.

Thus, the reflection brightness in the reflection display section 9 and the transmission brightness in the transmission display section 10 can be set to substantially the same level, and the contrast ratios in the reflection display section 9 and transmission display section 10 can be also set to substantially the same value. In other words, in the GH method using the light absorption by the dichroic dye 12, providing different thicknesses of the liquid crystal layer in the reflection display section 9 and transmission display section 10 can offer substantially the same effect as the effect offered by changing the concentration of the dye, and therefore, by so doing, the adequate concentration of the blended dichroic dye 12 in the reflection display section 9 and the adequate concentration of the blended dichroic dye 12 in the transmission display section 10 can be set to substantially the same value. Consequently, the reflection display section 9 and transmission display section 10 can show satisfactory display simultaneously both in the reflection display section 9 and transmission display section 10 by means of the liquid crystal layer 1 provided across the reflection display section 9 and transmission display section 10. In short, both the display contrast ratio and brightness in the light display become substantially equal in the reflection display section 9 and transmission display section 10.

Herein, "brightness" is defined as a ratio of the incident light on the liquid crystal layer 1 observed by the viewer as the display light in either the reflection display section 9 or transmission display section 10, and "contrast ratio" is defined as the quotient obtained by dividing the brightness in the light display by the brightness in the dark display.

Generally, the contrast ratio suitable for the transmission display must be higher than the contrast ratio suitable for the refection display. Thus, in order to realize satisfactory display, compared with a case of setting the equal contrast ratio in the reflection display section 9 and transmission display section 10 to satisfy the above requirement, it is more effective to set the contrast ratio higher in the transmission display section 10 than in the reflection display section 9 by setting the thickness of the liquid crystal layer larger in the transmission display section 10 than in the reflection display section 9.

In the following, the liquid crystal display of the present embodiment will be explained based on the above-described display principle and with reference to FIGS. 1 through 3 by way of an example and comparative examples for purposes of explanation only, without any intention as a definition of the limits of the invention.

EXAMPLE 1

Explained in the present example is a liquid crystal display employing the liquid crystal layer 1 adopting the GH method, in which the liquid crystal having the negative dielectric constant anisotropy aligns substantially perpendicular to the display surface when no voltage is applied to the liquid crystal layer 1 and tilts with respect to the display normal when a voltage is applied to the liquid crystal layer 1. First, the following will explain a method of manufacturing the liquid crystal display.

Initially, a 140 nm-thick ITO film is sputtered over the transparent substrate 4, which is etched by photolithography, whereby the electrode 6 (transparent electrode) of a predetermined pattern is formed. Here, a glass substrate is used as the substrate 4.

Next, a vertical aligning alignment film is provided to the substrate 4 by the offset printing on the surface where the electrode 6 is formed, and the substrate 4 is baked at 200 C in an oven, whereby the alignment film 2 is formed. Subsequently, the alignment treatment is applied to the alignment film 2 by means of rubbing, and as a consequence, the electrode substrate 101 which serves as the substrate on the viewer's side is produced.

The vertical aligning alignment film originally has the properties such that align the liquid crystal along the normal direction of the film surface, and the alignment treatment like the rubbing changes the properties to the properties such that tilt the director configuration of the liquid crystal by several degrees with respect to the normal direction. After a voltage is applied to the liquid crystal layer 1, the tilt thus conferred tilts the director configuration of the liquid crystal much further toward the above alignment treatment direction.

In the meantime, insulation photosensitive resin is applied over the substrate 5 by spin coating, and UV rays are irradiated to the photosensitive resin masked in such a manner that no photosensitive resin is left in the transmission display section 10, while a 3 m-thick layer of the photosensitive resin is formed in the reflection display section 9, whereby a predetermined pattern of the insulation film 11 is formed. The pattern edge portion of the insulation film 11 is made in such a manner as to form gentle steps, so that the electrode 7 which will be formed later will not be broken by a difference in steps of the insulation film 11. As with the substrate 4, a transparent glass substrate is used as the substrate 5.

Further, a 140 nm-thick ITO film is sputtered over the substrate 5 on the surface where the insulation film 11 is formed, over which a 200 nm-thick aluminum film, which will serve as a light reflective electrode, is sputtered. Then, the aluminum film thus formed is patterned by photolithography and dry etching in such a manner as to leave the aluminum film in the reflection display section 9 alone (where the photosensitive resin was left when the photosensitive resin was patterned to form the insulation film 11), whereby the reflection film 8 is formed. Further, the ITO film beneath the reflection film 8 is etched by photolithography to form the electrodes 7 (transparent electrode) of a predetermined pattern.

Subsequently, the alignment film 3 is formed over the substrate 5 on the surface where the electrodes 7 and reflection film 8 are formed in the same manner as the alignment film 2 formed on the electrode substrate 101 serving as the substrate on the viewer's side. Then, the alignment treatment is applied to the alignment film 3 by means of rubbing, whereby the electrode substrate 102 is produced.

Then, as a sealing agent, sealing resin (not shown) is provided around one of the electrode substrates 101 and 102 produced in the above manner, and plastic spherical spacers having a diameter of 4.5 m are scattered over the other electrode substrate on the surface where the alignment film is formed. Then, as shown in FIG. 1, the electrode substrates 101 and 102 are placed to oppose each other with their electrode surfaces inside, and the sealing resin is cured under applied pressure, whereby a liquid crystal cell for filling is produced. Filling spaces (thicknesses of the liquid crystal layer 1) into which the liquid crystal will be filled in the refection display section 9 and transmission display section 10 of the liquid crystal cell for filling were measured by means of the reflected light spectrum, and were 4.5 m across and 7.5 m across, respectively.

Further, a concentration of the dichroic dye 12, blended with the liquid crystal having the negative dielectric constant anisotropy to produce the liquid crystal composition filled in the liquid crystal cell for filling is adjusted in such a manner that a satisfactory contrast ratio can be attained both in the reflection display section 9 and transmission display section 10. Further, a chiral dopant for imparting twist to the director configuration of the liquid crystal is added to the liquid crystal composition, so that, with the alignment treatment applied to the alignment films 2 and 3, the chiral dopant imparts the same twist to the director configuration of the liquid crystal in the liquid crystal layer 1 sandwiched by the electrode substrates 101 and 102 above and beneath in the reflection display section 9 and transmission display section 10 when a voltage is applied for the dark display. Then, the liquid crystal cell for filling is filled with the liquid crystal by means of vacuum injection, whereby the liquid crystal display is assembled.

Figure 2:
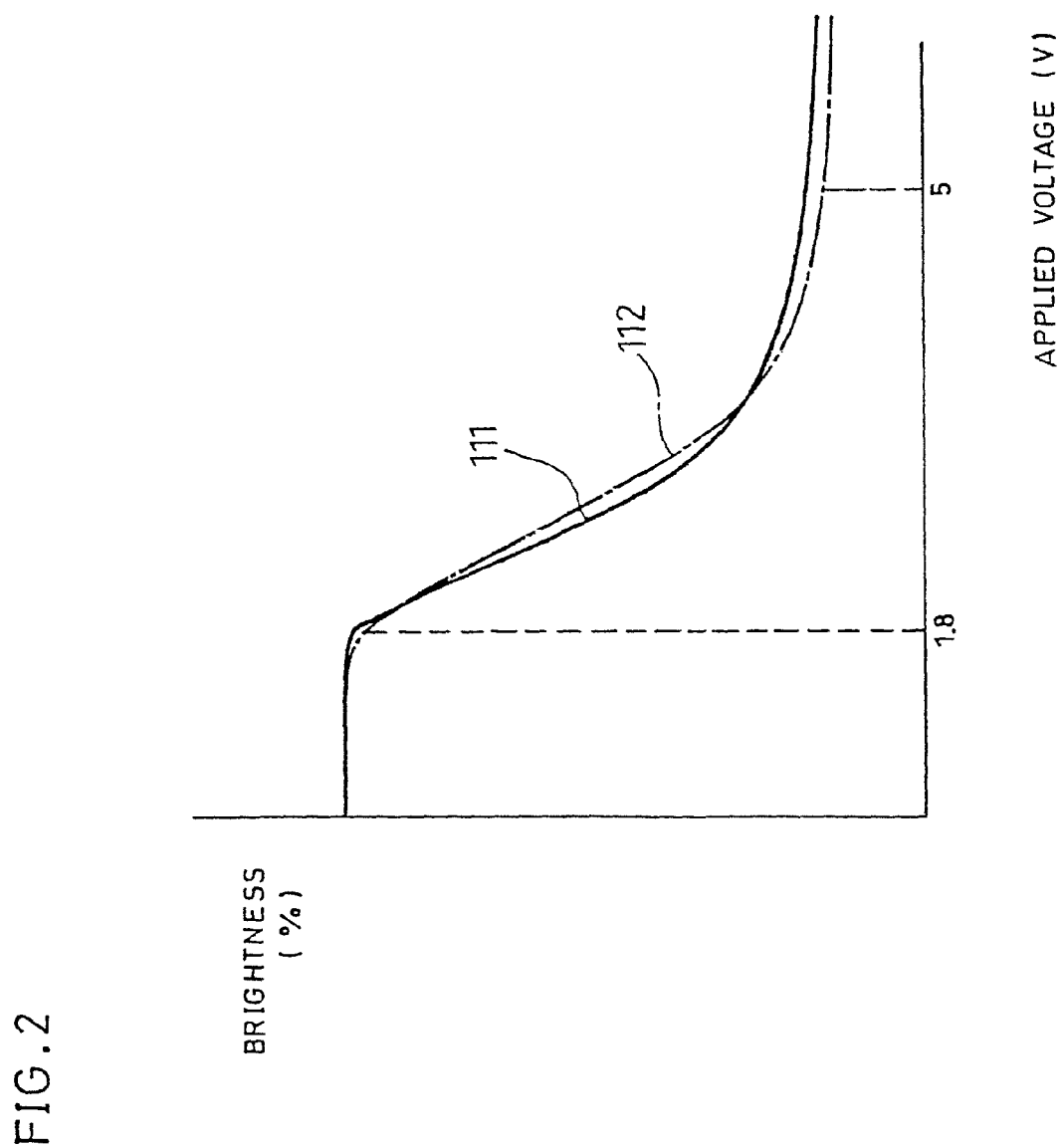
FIG. 2 is a view showing display characteristics of a liquid crystal display of Example 1.

A voltage was applied to the liquid crystal layer 1 while measuring the reflectance of the reflection display section 9 and transmittance of the transmission display section 10 of the liquid crystal display thus obtained through a microscope, and the display characteristics graphed in FIG. 2 were obtained. The voltage applied to the liquid crystal layer 1 is a rectangular pulse inverting every 17 msec. In the drawing, the horizontal axis represents a root mean square value of the applied voltage, and the vertical axis represents the brightness (reflectance or transmittance). Also, in the drawing, a curve 111 represents the voltage dependence of the reflectance in the reflection display section 9 and a curve 112 represents the voltage dependence of the transmittance in the transmission display section 10.

As the curves 111 and 112 reveal, the brightness (reflectance or transmittance) in the reflection display section 9 and transmission display section 10 of the above liquid crystal display decreases with an increasing applied voltage. That is, when the applied voltage is 1.8V, the reflectance of the reflection display section 9 and transmittance of the transmission display section 10 are 55% and 52%, respectively, and when the applied voltage is increased to 5V, both decrease to 11% and 10%, respectively.

In other words, in the above liquid crystal display, both the reflection display section 9 and transmission display section 10 can realize the display with excellent visibility, attaining high brightness exceeding 50% in the light display and a contrast ratio of about 5.

COMPARATIVE EXAMPLE 1

A comparative example with respect to Example 1 will be explained in the following. In the present comparative example, a comparative liquid crystal display adopting the GH method was assembled in the same manner as Example 1 except that the thicknesses of the liquid crystal layer were equal in the reflection display section 9 and transmission display section 10.

More specifically, in the present comparative example, the insulation film 11 formed over the substrate 5 in Example 1 was omitted, so that the liquid crystal display was assembled in such a manner that the thickness of the liquid crystal layer was 4.5 m in both the reflection display section 9 and transmission display section 10. In other words, a comparative liquid crystal cell for filling was produced, in which the reflection display section 9 and transmission display section 10 are flat on both the electrode substrates opposing and sandwiching the liquid crystal layer 1 above and beneath, and the liquid crystal composition blended with the dichroic dye 12 and chiral dopant used in Example 1 were also filled into the comparative liquid crystal cell for filling, whereby the comparative liquid crystal display was assembled.

Figure 3:
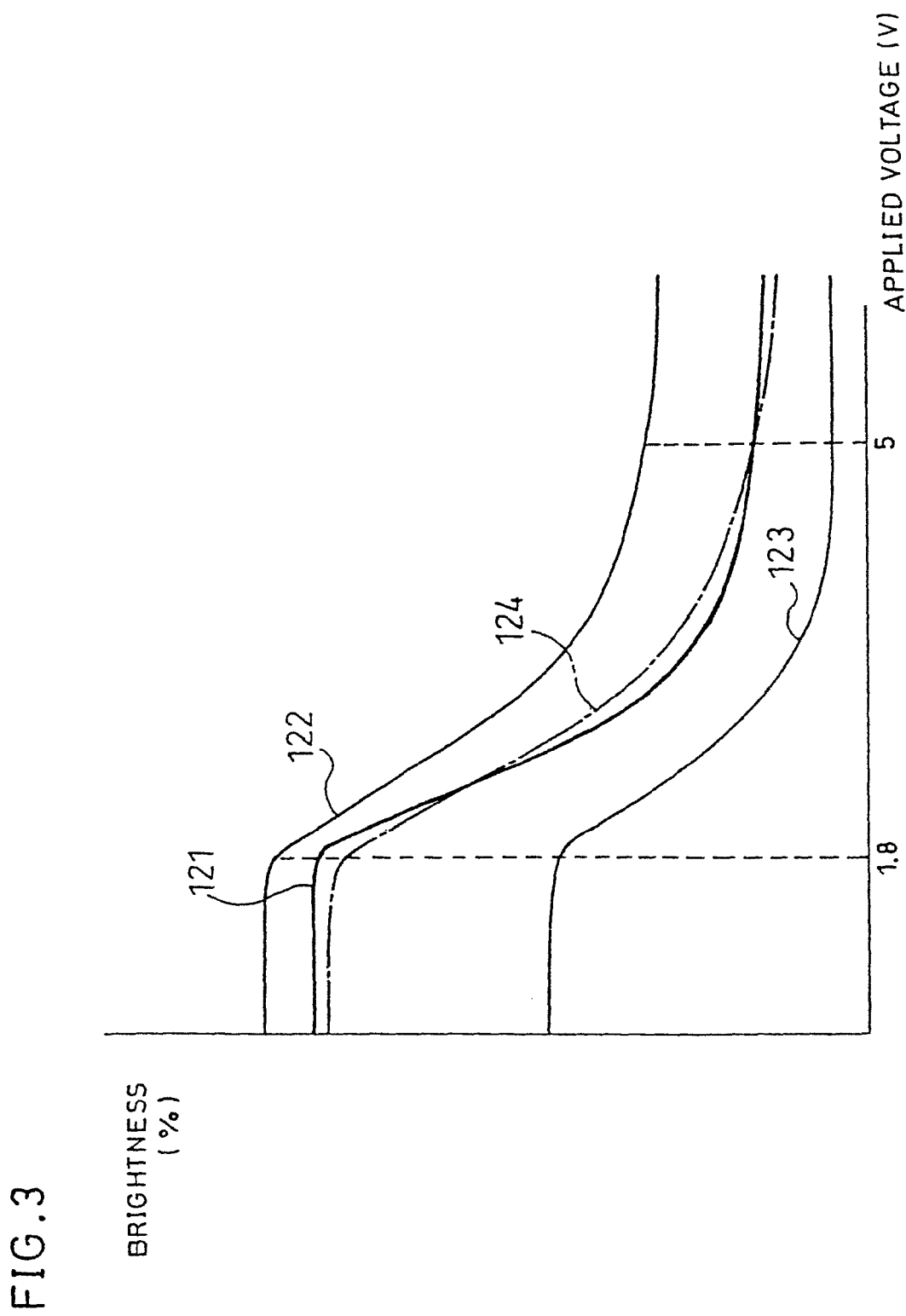
FIG. 3 is a view showing display characteristics of liquid crystal displays of Comparative Examples 2 and 3, respectively.

The reflectance of the reflection display section 9 and transmittance of the transmission display section 10 of the above comparative liquid crystal display were measured in the same manner as Example 1, and the resulting display characteristics are graphed in FIG. 3.

COMPARATIVE EXAMPLE 2

In the present comparative example, a comparative liquid crystal display was assembled in such a manner that liquid crystal composition having higher concentration of the dichroic dye 12 than the one in Comparative Example 1 was filled into a comparative liquid crystal cell for filling of the same type as the one used in Comparative Example 1, so that the brightness and contrast ratio become optimal for the transmission display section 10.

The reflectance of the reflection display section 9 and transmittance of the transmission display section 10 of the above comparative liquid crystal display were measured in the same manner as Example 1, and the resulting display characteristics are also graphed in FIG. 3.

In FIG. 3, the horizontal axis represents a root mean square value of the applied voltage, and the vertical axis represents the brightness (reflectance or transmittance). Also, in the drawing, a curve 121 represents the voltage dependence of the reflectance in the reflection display section 9 and a curve 122 represents the voltage dependence of the transmittance in the transmission display section 10 in Comparative Example 1, whereas a curve 123 represents the voltage dependence of the reflectance in the reflection display section 9 and a curve 124 represents the voltage dependence of the transmittance in the transmission display section 10 in Comparative Example 2.

As the curves 121 and 122 reveal, the brightness (reflectance and transmission) in the reflection display section 9 and transmission display section 10 of the comparative liquid crystal display of Comparative Example 1 decreases with an increasing applied voltage. That is, when the applied voltage is 1.8V, the reflectance in the reflection display section 9 and transmittance in the transmission display section 10 are 55% and 66%, respectively. When the applied voltage is increased to 5V, both decrease to 11% and 22%, respectively.

In other words, in the comparative liquid crystal display of Comparative Example 1, high brightness exceeding 50% and a satisfactory contrast ratio of about 5 were attained in the reflection display section 9, whereas in the transmission display section 10, high brightness was attained but a contrast ratio was as low as 3, thereby deteriorating the display quality. This happens because the thickness of the liquid crystal layer 1 is equal in the reflection display section 9 and transmission display section 10.

Also, as the curves 123 and 124 reveal, the brightness (reflectance and transmission) of the reflection display section 9 and transmission display section 10 of the comparative liquid crystal display of Comparative Example 2 decreases with an increasing applied voltage. That is, when the applied voltage is 1.8V, the reflectance of the reflection display section 9 and the transmittance of the transmission display section 10 are 29% and 51%, respectively. When the applied voltage is increased to 5V, both decrease to 3% and 10%, respectively.

In other words, in the comparative liquid crystal display of Comparative Example 2, high brightness exceeding 50% and a satisfactory contrast ratio of about 5 were attained in the transmission display section 10, whereas in the reflection display section 9, a contrast ratio as high as 10 was attained but the brightness was below 30%, and the display shown thereon was dark. This happens because the thickness of the liquid crystal layer 1 is equal in the reflection display section 9 and transmission display section 10.

The above comparison of Example 1 with Comparative Examples 1 and 2 reveals that, with the liquid crystal display adopting the GH method, it is effective to set the thickness of the liquid crystal layer 1 larger in the transmission display section 10 than in the reflection display section 9 to make the contrast ratio of the transmission display section 10 as high as or higher than the contrast ratio of the reflection display section 9.

Embodiment 2

The liquid crystal display of Embodiment 1 adopts the GH method, but liquid crystal displaying methods other than the GH method are also applicable. For example, another applicable method is shown in FIG. 4, in which the substrates 4 and 5 are sandwiched by polarization plates 14 and 15, so that the retardation or optical rotatory polarization (which are collectively referred to as polarization converting function) of the liquid crystal layer 1 is used for the display.

In the present embodiment, a liquid crystal display using the polarization converting function will be explained with reference to FIG. 4 mainly. Hereinafter, like components are labeled with like reference numerals with respect to Embodiment 1, and, for ease of explanation, the description of these components is not repeated here.

Figure 4:
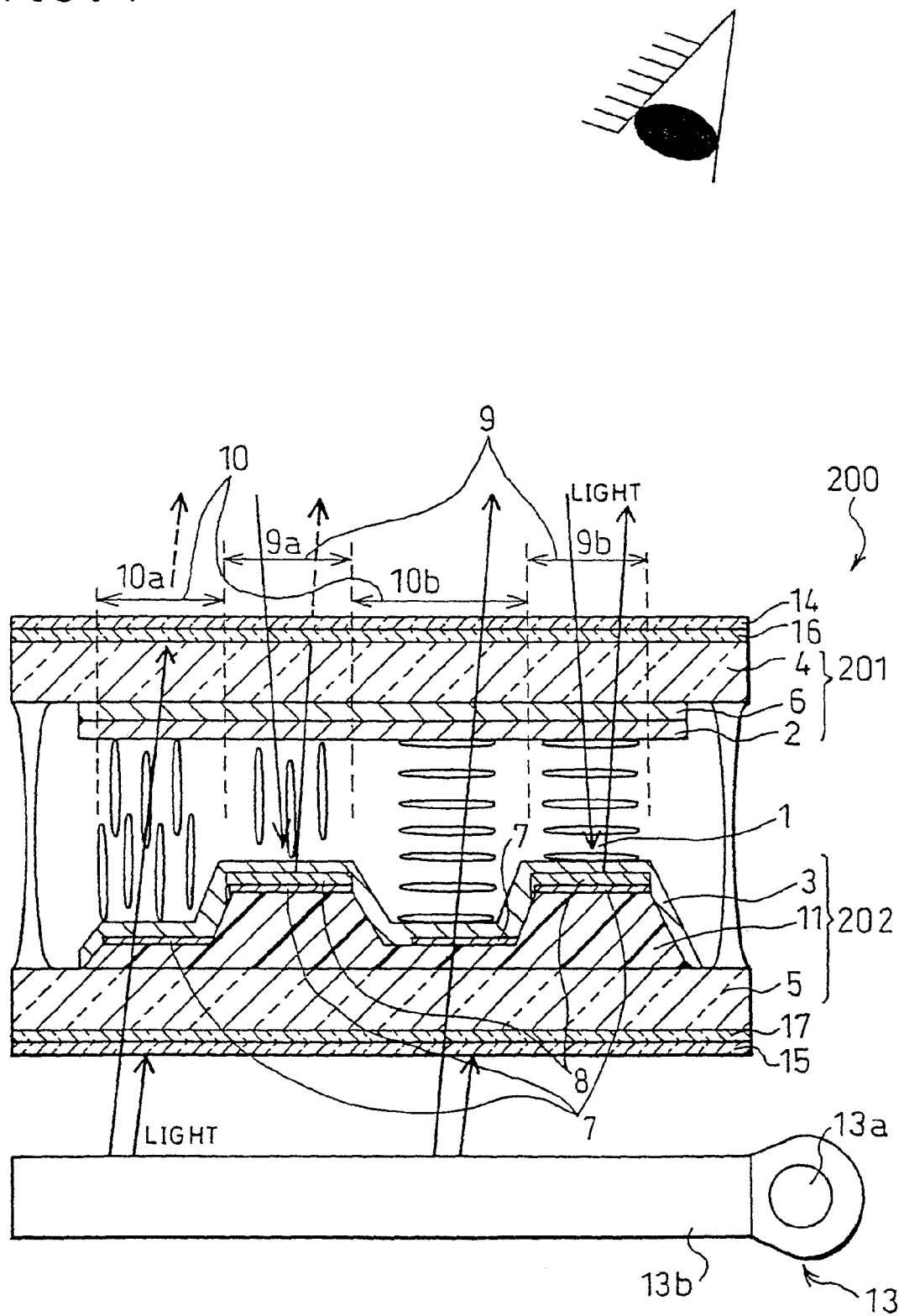
FIG. 4 is a cross section showing a major portion of a liquid crystal display in accordance with Embodiment 2 of the present invention.

FIG. 4 is a cross section showing a major portion of the liquid crystal display of the present embodiment. The liquid crystal display of FIG. 4 includes a liquid crystal cell 200 (liquid crystal element), and optionally, the back light 13 (lighting device), which are sequentially provided in this order from the viewer's (user's) side.

As shown in FIG. 4, the liquid crystal cell 200 includes the liquid crystal layer 1 sandwiched by an electrode substrate 201 (first substrate) and another electrode substrate 202 (second substrate). The electrode substrate 201 has the alignment film 2 on a surface touching the liquid crystal layer 1 (an interface between the first substrate and the liquid crystal layer 1), and the electrode substrate 202 has the alignment film 3 on a surface touching the liquid crystal layer 1 (an interface between the second substrate and the liquid crystal layer 1). Further, the liquid crystal cell 200 includes a phase difference compensation plate 16 and the polarization plate 14 at the outside of the electrode substrate 201 (the opposite side from the side facing the electrode substrate 202), and a phase difference compensation plate 17 and the polarization plate 15 at the outside of the electrode substrate 202 (the other side across the side opposing the electrode substrate 201). The phase difference compensation plates 16 and 17 are used only when necessary.

Phase difference compensation plates of various kinds, such as a stretched polymer film, a polymer film of fixed orientation of its liquid crystalline phase, and a liquid crystal polymer film, can be used as the phase difference compensation plates 16 and 17 used optionally in the present embodiment. The optical functions of the phase difference compensation plates 16 and 17 are used to (1) prevent the coloring often caused when the phase difference compensation plates 16 and 17 are omitted, (2) change the dependence of the brightness on the potential difference between the electrodes 6 and 7, (3) change the viewing angle characteristics, etc.

Also, the electrode substrate 201 is composed of the substrate 4 made of, for example, a light-transmitting glass substrate on which is formed the electrode 6 for applying a voltage to the liquid crystal layer 1, and the electrode 6 is covered with the alignment film 2 to which the rubbing treatment has been applied.

On the other hand, the other electrode substrate 202 provided to oppose the electrode substrate 201 through the liquid crystal layer 1 is composed of the light-transmitting substrate 5 on which are formed the electrodes 7 for applying a voltage to the liquid crystal layer 1 as counter electrodes opposing the electrode 6 through the insulation film 11. Note that, however, the liquid crystal display of FIG. 4 is arranged in such a manner that the electrodes 7 in the reflection display section 9 and the electrodes 7 in the transmission display section 10 are electrically isolated, so that a voltage is applied to each separately from outside the liquid crystal cell. The reflection film 8 is formed on the electrode substrate 202 at a region corresponding to the reflection display section 9, and the liquid crystal alignment film 3 to which the rubbing treatment has been applied is formed to cover the electrodes 7 and reflection film 8. The insulation film 11 is formed thinner in a region corresponding to the transmission display section 10 than in a region corresponding to the reflection display section 9.

As shown in FIG. 4, the electrode substrates 201 and 202 are bonded to each other by a sealing agent or the like while opposing each other with their respective alignment films 2 and 3 inside, and the liquid crystal composition is filled in a space therebetween, whereby the liquid crystal layer 1 is formed.

In the light display shown on the above liquid crystal display, the liquid crystal layer 1 made of the above-described liquid crystal composition is provided continuously across the reflection display section 9 and transmission display section 10. In FIG. 4, the liquid crystal in the liquid crystal layer 1 effects the polarization converting function to the light passing through the liquid crystal layer 1 when aligned in parallel with the display surface as shown in the reflection display section 9b and transmission display section 10b, and as a consequence, for example, the dark display is shown. On the other hand, the liquid crystal in the liquid crystal layer 1 hardly effects the polarization converting function when aligned perpendicularly to the display surface as shown in the reflection display section 9a and transmission display section 10a, and as a consequence, for example, the light display is shown.

Thus, the light display and dark display can be shown by using the change in the alignment in the reflection display sections 9a and 9b and the transmission display sections 10a and 10b as the change in luminance of the display light by the linearly polarized light selective transmission function effected by the polarization plate 14 on the display surface side and the polarization plate 15 on the back light 13 side sandwiching the liquid crystal layer 1. In this case, as previously mentioned, the phase difference compensation plates 16 and 17 as shown in FIG. 4 may be used to compensate the wavelength dependence of a difference of the refractive index of the liquid crystal layer 1, to change the voltage dependence of the brightness modulated by the liquid crystal layer 1, or to change the viewing angle characteristics, as the case may be.

When using the optical anisotropy for the display in the above manner, the initial director configuration of the liquid crystal is not especially limited, and for example, the liquid crystal layer 1 can be aligned either in parallel with or perpendicular to the display surface when no voltage is applied. In the former case (aligned parallel when no voltage is applied), liquid crystal having the positive dielectric constant anisotropy is used, while in the latter case (aligned perpendicular when no voltage is applied), liquid crystal having the negative dielectric constant anisotropy is used.

As has been explained, the initial director configuration of the liquid crystal is not especially limited when the optical anisotropy is used for the display, but it is effective to adjust a thickness of the insulation film 11 in such a manner as to secure a suitable thickness of the liquid crystal layer for the director configuration of the liquid crystal to be used.

In order to realize the dark display in the reflection display section 9, light is first converted to linearly polarized light by the polarization plate 14. Then, the polarization state is changed by the phase difference compensation plate 16 when necessary, and the polarization state is further changed by the liquid crystal layer 1 in the reflection display section 9 which is thinner than the transmission display section 10. Here, the necessary condition for the idea dark display is to covert the polarization state on the reflection film 8 to circularly polarized light whether right or left in the end. Also, the necessary condition to realize the idea light display in the reflection display section 9 is to convert the polarization state on the reflection film 8 to the linearly polarized light. If the director configuration of the liquid crystal can be controlled electrically between the dark display and light display, the display states can be switched.

In other words, there must be substantially a difference of ¼ wavelength (approximately 90) between the phase difference (phase difference of the display light on the reflection film 8) imparted to the travelling light by the liquid crystal layer 1 before it reaches the reflection film 8 when realizing the dark display, and a phase difference (phase difference of the display light on the reflection film 8) imparted to the travelling light by the liquid crystal layer 1 before it reaches the reflection film 8 when realizing the light display, and the director configuration of the liquid crystal realizing the above condition has to be controlled electrically, that is, the director configuration of the liquid crystal has to be controlled between the ones, one gives the circularly polarized light in the dark display, and the other gives the linearly polarized light in the light display, on the reflection film 8. Here, the linearly polarized light on the reflection film 8 to realize the light display can take any direction of polarization.

In the transmission display section 10, incident light is converted to the linearly polarized light by the polarization plate 15, and its polarization state is changed by the phase difference compensation plate 17 when necessary, and the polarization state is converted further by the liquid crystal layer 1 formed thicker than in the reflection display section 9. Finally, the polarization state is changed by the phase difference compensation plate 16 when necessary, and the light exits through the polarization plate 14, whereby the display is shown.

In the reflection display section 9, it is the change of the polarization state of the light immediately before it enters the polarization plate 14 that is used for the display. Thus, to show the light display, the polarization state of the light immediately before it enters the polarization plate 14 is adjusted to be linearly polarized light having an oscillating direction along the transmission axis orientation of the polarization plate 14. On the other hand, to show the dark display, the polarization state of the light immediately before it enters the polarization plate 14 is adjusted to be linearly polarized light having an oscillation plane along the absorption axis orientation of the polarization plate 14.

In other words, the display can be switched if a change of the director configuration of the liquid crystal 1 can be controlled electrically with the voltage application over a range such that can make a difference of substantially ½ wavelength (approximately 180) between the phase difference (phase difference of the display light going out through the liquid crystal layer 1) imparted to the light passing through the liquid crystal layer 1 in the transmission display section 10 for the light display, and the phase difference (phase difference of the display light going out through the liquid crystal layer 1) imparted to the light passing through the liquid crystal layer 1 in the transmission display section 10 for the dark display.

The phase control of ½ wavelength means to control the polarizing orientation of the linearly polarized light immediately before it enters the polarization plate 14 from liquid crystal layer 1, and polarization conversion function which includes not only the control of the phase difference caused by the retardation whose major axis of the refractive index is aligned uniformly parallel, but also the polarization rotation phenomenon, in which the major axis of the refractive index of the liquid crystal layer 1 is twisted along the twist of the director configuration of the liquid crystal, and the polarizing orientation of the linearly polarized light changes in response to the twist of the director, which varies with the voltage. Actual polarization converting function to realize the above control is the one controlling over two orthogonal polarization states of general kind, when the application of the phase difference compensation plates 16 and 17 is concerned.

Examples of director configurations of the liquid crystal which realize the polarization converting function realizing the control of the polarization state (phase control of light) described above are: director configuration uniformly parallel to the substrates 4 and 5 (parallel to the display surface) (homogenous alignment); director configuration parallel to the substrates 4 and 5 (parallel to the display surface) and twisted between the substrates 4 and 5 (an interval between the substrates sandwiching the liquid crystal layer 1 above and beneath) (twist alignment); and director configuration perpendicular to the substrates 4 and 5 (perpendicular to the display surface) (homeotropic alignment). Further, the hybrid director configuration having planer alignment on one of the interfaces of the liquid crystal layer 1 and vertical alignment on the other interface and the like can be used as well.

In case of the twist alignment, it is preferable that the liquid crystal is twisted by an angle in a range between 60 and 100 inclusive, or 0 and 40 inclusive between the substrates 4 and 5.

This is because the conditions suitable for both the reflection display section 9 and transmission display section 10 can be satisfied without changing the directions of rubbing treatment in the two sections.

To mass-produce the liquid crystal displays, the most preferable optical design of the liquid crystal is such that monotonously increases or decreases the display brightness (reflectance or transmittance) in response to a driving voltage applied to the liquid crystal layer 1 between its upper and lower limits.

When the above driving conditions are concerned, the simplest optical design of the liquid crystal layer 1 is the one such that can attain electro-optical characteristics which allow the display control, under which the display brightness monotonously increases or decreases when the liquid crystal aligned substantially perpendicular to the display surface is re-aligned to be substantially parallel to the display surface and vice versa.

In particular, when the parallel aligning alignment film is used to align the liquid crystal in parallel with the display surface when no voltage is applied, there are specific conditions suitable for the reflection display; on the other hand, there are specific conditions suitable for the transmission display as well. Thus, these conditions were computed by the Jones matrix method to find optimal twist angles.

The result of the above computation was that, to obtain satisfactory reflection display, the twist angle must be set to a range between 0 and 100 inclusive.

To be more specific, the inventors of the present invention discovered that, if satisfactory reflection display is to be shown by means of the liquid crystal layer 1, the liquid crystal layer 1 must have an optical property to convert the circularly polarized light to the linearly polarized light efficiently when the liquid crystal is aligned to effect the polarization converting function (when the parallel aligning alignment film is used, the liquid crystal is aligned substantially in the same manner when no voltage is applied). To evaluate the above function, the reflectance when the circularly polarized light enters the liquid crystal layer 1 was computed by the above-specified computation method. The reflectance computed herein is the reflectance of the light that enters the liquid crystal cell 200 in order of the polarization plate 14, phase difference compensation plate 16 for imparting a phase difference of 90 to the light, liquid crystal layer 1, and reflection film 8, and then exits from the liquid crystal cell 200 in reversed order.

Then, it turned out that when the twist angle is in a range between 0 and 70 inclusive, the circularly polarized light can be converted to the linearly polarized light perfectly by adjusting the product (nd) of a difference of refractive index (n) of the liquid crystal in the liquid crystal layer 1 and a thickness (d) thereof for each twist angle of the liquid crystal layer 1. Also, the inventors of the present invention discovered that when the twist angle is in a range between 70 exclusive and 100 inclusive, although the circularly polarized light can not be converted to the linearly polarized light perfectly, the resulting display is satisfactorily. Thus, satisfactory reflectance can be obtained with light having a particular wavelength by adjusting n d of the liquid crystal layer 1 for each twist angle: the reflectance is 97% at the twist angle of 80, 83% at 90, and 72% at 100, when the maximum reflectance of the light having a visible wavelength at the twist angle up to 70 is scaled as 100%. However, if the twist angle exceeds 100, the circularly polarized light can not be converted to the linearly polarized light because the reflectance is reduced to 54% and 37% at the twist angles of 110 and 120, respectively. In short, it is necessary to set the twist angle of the liquid crystal layer 1 to a range between 0 and 100 inclusive in the reflection display section 9.

In the above explanation, the circularly polarized light was used for the computation to evaluate the polarization converting function of the liquid crystal layer 1 in the reflection display section 9. However, in the actual display, the incident light on the liquid crystal layer 1 in the reflection display section 9 is not necessarily the circularly polarized light, and satisfactory display can also be obtained in the reflection display section 9 if the linearly polarized light enters the above-designed liquid crystal layer 1 instead.

On the other hand, to obtain the satisfactory display in the transmission display section 10, the liquid crystal must be aligned either at a small twist angle (in a range between 0 and 40 inclusive) or a large twist angle (in a range between 60 and 110 inclusive)

The polarization converting function necessary to obtain satisfactory display in the transmission display section 10 must satisfy two types of conditions: one is a basic optical function (first conditions), and the other is a practical optical function (second conditions) which is determined by a relation between the basic optical function (first conditions) and the reflection display section 9.

The reason why is as follows. For example, to satisfy the first conditions when the liquid crystal is aligned to effect the polarization converting function (when the parallel aligning alignment film is used, the liquid crystal is aligned substantially in the same manner when no voltage is applied), the liquid crystal layer 1 in the transmission display section 10 must efficiently convert particular polarized light to another polarized light that is orthogonal to that particular polarized light. To be more specific, in case that the particular polarized light is the linearly polarized light, it is converted to another linearly polarized light with which their respective planes containing light oscillating electric fields intersect at right angles; in case that the particular polarized light is the circularly polarized light, it is converted to another circularly polarized light having an inverse rotation direction; and in case that the particular polarized light is elliptically polarized light in a specific state, it is converted to another elliptically polarized light having an inverse rotation direction and the same ellipticity while their major axis orientations intersecting at right angles.

Thus, the inventors of the present invention calculated the polarization converting function by the above-specified method (Jones matrix method) to evaluate the above function as the indispensable properties of the transmission display section 10, and discovered that the twist angle is not especially limited.

The second conditions become necessary due to a common optical film (polarization plate 14 and phase difference compensation plate 16) used in both the reflection display section 9 and transmission display section 10 on the display front surface. The optical film on the front surface used both in the reflection display section 9 and transmission display section 10 is designed to show satisfactory reflection display. Another optical film set on a back surface of the display can be set to the opposite surface of the liquid crystal display from the display surface, and it is preferable to provide the same at a direction such that realizes satisfactory display in the reflection display section 10 together with the polarization plate 14 and phase difference compensation plate 16 (serving as the optical film on the display front surface), and the liquid crystal layer 1 in the transmission display section 10 region. To do so, it is important that the polarization converting function of the liquid crystal layer 1 in the transmission display section 10 not only satisfies the first conditions, but also converts the circularly polarized light to another circularly polarized light with a reversed rotation direction, or the incident linearly polarized light to another polarized light intersecting at right angles with the incident linearly polarized light in a satisfactory manner.

The luminance of the light, which will be converted from circularly polarized light to a reversed rotation direction when it passes through the liquid crystal layer 1 in the form of circularly polarized light, was found by the above computation method to evaluate specific conditions satisfying the second conditions for the liquid crystal layer 1 in the transmission display section 10. The transmittance computed herein is the transmittance of the light that sequentially passes through the polarization plate 15 (serving as a first polarization plate), phase difference compensation plate 17 (serving as a first phase difference compensation plate for imparting the phase difference of 90 to the light), liquid crystal layer 1, phase difference compensation plate 16 (serving as a second phase difference compensation plate having the slow axis intersecting at right angles with a slow axis of the first phase difference compensation plate for imparting the phase difference of 90 to the light), and polarization plate 14 (serving as a second polarization plate that intersects at right angles with the first polarization plate).

Then, the inventors of the present invention discovered that circularly polarized light can be converted to another circularly polarized light with a reversed rotation direction in a satisfactory manner when the twist angle is in a range between 0 and 40 inclusive by adjusting n d of the liquid crystal layer 1 for each twist angle. More specifically, the transmittance decreases with an increasing twist angle when the polarization converting function that converts circularly polarized light to another circularly polarized light with an inverse rotation direction is evaluated in the form of transmittance: the transmittance at the twist angle of 30 is 88.6%, and is 80.8%, 72.0%, and 62.4% at the twist angles of 40, 50, and 60, respectively, when the transmittance of the light having a visible wavelength at the twist angle of 0 is scaled as 100%. Consequently, the inventors of the present invention achieved the conclusion that it is appropriate to set the upper limit of the twist angle at approximately 40.

On the other hand, in setting twist angle in the transmission display section 10 which is able to efficiently convert linearly polarized light to another linearly polarized light that intersects at the right angles with the incident polarized light, satisfactory transmittance can be obtained efficiently at an arbitrary twist angle of 0 or above if the wavelength of the light is limited to one specific wavelength. However, to obtain high transmittance with visible light in a broad range of wavelength, the twist angle must be set to an optimal value. More specifically, a band-width of a wavelength range, in which the transmittance of 90% or above can be attained, is found by omitting the upper and lower limits of the wavelength when n d of the liquid crystal layer 1 is adjusted by changing the twist angle in such a manner that the transmittance achieves the maximum of 100% at a wavelength of 550 nm, which is the wavelength at the center of the visible wavelength range. The transmittance computed herein is the transmittance of the light that passes through the polarization plate 15 as the first polarization plate, liquid crystal layer 1, and polarization plate 14 as the second polarization plate that intersects at right angles with the first polarization plate, during which the liquid crystal at the center of the liquid crystal layer 1 in its layer thickness is aligned to form an angle of 45 with respect to the transmission axes of the polarization plates 14 and 15.

Then it turned out that the band-width (range of wavelength) is 230 nm at the twist angle of 0, 235 nm at 10, 240 nm at 20, 245 nm at 30, 250 nm at 40, 255 nm at 50, 265 nm at 60, 280 nm at 70, 310 nm at 80, 330 nm at 90, 305 nm at 100, 255 nm at 110, and 210 nm at 120.

In view of the foregoing, it is understood that when the twist angle is in a range between 60 and 110 inclusive, high transmittance can be attained in a broad range of wavelength (wavelength width), and the polarization converting function is effected in a satisfactory manner, thereby realizing satisfactory display. Thus, the twist angle of the liquid crystal in the transmission display section 10 which satisfies the second conditions is limited to a range between 0 and 40 inclusive or a range between 60 and 110 inclusive, due to the polarization converting function effected on circularly polarized light or linearly polarized light.

As has been discussed, it turned out that satisfactory display can be obtained when the twist angle of liquid crystal layer 1 is in a range between 0 and 100 inclusive in the reflection display section 9, and in a range between 0 and 40 inclusive or in a range between 60 and 110 inclusive in the transmission display section 10.

Of all the examples explained below, when the twist angle of the liquid crystal layer 1 is equal in the reflection display section 9 and transmission display section 10 (Examples 2 through 9 and 11), Example 11 is a typical case using the circularly polarized light at the twist angle of 0 (the liquid crystal is aligned perpendicular to the display surface); Example 3 is a typical case using the linearly polarized light at the twist angle of 0 (the liquid crystal display is arranged to show satisfactory light display by using the phase difference compensation plate); and Example 5 is a typical case using the linearly polarized light at the twist angle of approximately 70 (the liquid crystal display is arranged to show satisfactory light display by using the phase difference compensation plate).

Thus, the twist angle of the liquid crystal layer 1 to realize satisfactory display on both the reflection display 9 and transmission display 10 is in a range between 0 and 40 inclusive or in a range between 60 and 100 inclusive.

In the above explanation, the twist angle is indicated by positive degrees. However, it should be appreciated that the same explanation can be applied if the twist angle is indicated by negative degrees of the same absolute value (the twist direction is reversed in this case).

In any case, when a small twist angle is set, a change of the polarization state is expressed as a function of the product (nd) of a difference of refractive index (n) and a thickness (d) of the liquid crystal layer, and moreover, the incident light passes through the liquid crystal layer 1 and returns through the same in the reflection display section 9 while the incident light passes through the liquid crystal layer 1 only once in the transmission display section 10. Therefore, it is preferable to make the liquid crystal layer thicker in the transmission display section 10 than in the reflection display section.

It should be appreciated that normal optical rotatory polarization used in the TN liquid crystal display can be used for the light display and dark display exploiting the aforementioned polarization converting function, because, in case that the TN liquid crystal display has a thin liquid crystal layer 1, the optical rotatory polarization and a change in the polarization state caused by the retardation can not be distinguished and elliptically polarized light is generally used for the display. The polarization converting function of the present invention includes the modulation of the luminance of the transmitted light using the above optical rotatory polarization.

Further, as has been described above, in the above polarization converting function, the change of the director configuration of the liquid crystal which can change the polarization state includes: the control of the director configuration of the liquid crystal to be parallel or perpendicular to the substrates 4 and 5; as in the surface stabilized ferroelectric liquid crystal or anti-ferroelectric liquid crystal, the change of the director direction alone while keeping the director direction substantially in parallel with the substrates 4 and 5; and, using nematic liquid crystal, the change of the director direction of the liquid crystal, while keeping the director direction in a plane parallel to the display surface, by changing the electrode structure.

In the above liquid crystal display, the position (lamination orientation) of the polarization plates 14 and 15 can be set in any suitable manner. For example, if the polarization plate 14 is set to a position corresponding to the position of the reflection display section 9, then the polarization plate 15 is set to a position corresponding to the polarization plate 14, because the polarization plate 14 naturally affects the display light passing through the transmission display section 10 as well.

As has been explained, in case of using the non-twisted director configuration of the liquid crystal, when the reflection display section 9 shows, for example, the dark display, so does the transmission display section 10. However, for example, when only the polarization plate 15 is turned 90 while leaving the orientation of the polarization plate 14 intact, the display is inverted between in the reflection display section 9 and in the transmission display section 10, thereby making it impossible to obtain satisfactory display. Thus, to prevent such unwanted inversion of the display, the polarization plate 15 is returned to the initial position, or the electrodes are provided to the reflection display section 9 and transmission display section 10 individually to invert the electrical driving itself either in the reflection display section 9 or transmission display section 10 alone, so that both the display sections shows either the light or dark display simultaneously.

Next, the display principle in the reflection display section 9 and transmission display section 10 of the liquid crystal display of FIG. 4 will be explained in further detail.

To begin with, the display principle in the reflection display section 9 will be explained. Assume, for ease of explanation, that the phase difference compensation plates 16 and 17 are omitted and the director configuration of the liquid crystal in the liquid crystal layer 1 is not twisted in the reflection display section 9b nor transmission display section 10b. Also, assume that the thicknesses of the liquid crystal layer 1 in the reflection display section 9 and transmission display section 10 are adjusted in such a manner that the reflection display section 9b and transmission display section 10b respectively cause phase differences of ¼ wavelength and ½ wavelength when the light having a wavelength of 550 nm passes through the liquid crystal layer 1 only once. Also, the liquid crystal composition has positive dielectric constant anisotropy and the liquid crystal is aligned substantially in parallel with the substrates 4 and 5 when no voltage is applied, and the alignment orientation and the absorption axis orientation of the polarization plate 14 form 45 within display plane.

In this case, the director configuration of the liquid crystal in the reflection display section 9 and transmission display section when no voltage is applied is the director configuration of the liquid crystal shown in the reflection display section 9b and transmission display section 10b, and upon application of a voltage, the director configuration of the liquid crystal in the reflection display section 9 and transmission display section 10 is changed to the one shown in the reflection display section 9a and transmission display section 10a.

In the reflection display section 9b, the product (nd) of a difference of refractive index (n) of the liquid crystal composition and a thickness (d) of the liquid crystal layer satisfies the ¼ wavelength condition. Thus, the ambient light is converted to linearly polarized light by the polarization plate 14 when it enters the liquid crystal layer 1, and converted further to circularly polarized light by the retardation of the liquid crystal layer 1 before it reaches the reflection film 8. The incident light inverts its direction of propagation on the reflection film 8, while the circularly polarized light inverts its direction of propagation alone while keeping the rotational direction of the oscillating electric field. Hence, the circularly polarized light is converted to circularly polarized light orthogonal to the polarized light at the time of incidence, in other words, circularly polarized light is inverted from right to left. Then, the resulting circularly polarized light is converted to linearly polarized light parallel to the absorption axis orientation of the polarization plate 14 after it has passed through the liquid crystal layer 1 in the reflection display section 9b again, and absorbed by the polarization plate 14, thereby showing the dark display.

Here, in the transmission display section 10b, the product (n d) of a difference of refractive index (n) of the liquid crystal composition and a thickness (d) of the liquid crystal layer satisfies the ½ wavelength condition. Thus, the liquid crystal layer 1 has a function of converting the orientation of the oscillation plane of the linearly polarized incident light symmetrically with respect to a line along the alignment direction of the liquid crystal. Thus, the orientation of the absorption axis of the polarization plate 15 on the light incident side in the transmission display section 10b is determined to become parallel to the transmission axis orientation of the polarization plates 14 and 15, so that the light passing through the polarization plate 14 is absorbed therein by the aforementioned function of the liquid crystal layer 1, thereby showing the dark display.

As mentioned above, it has been discovered that, when the polarization plates 14 and 15 are provided in such a manner that their transmission axis orientations are parallel to each other, and the alignment direction of the liquid crystal and the transmission axis orientation forms angle of 45 in the above manner, both the reflection display section 9b and transmission display section 10b show the dark display.

Next, the following will explain a function when the director configuration of the liquid crystal is changed to be substantially perpendicular to the display surface as shown in the reflection display section 9a and transmission display section 10a by supplying a potential difference between the electrodes 6 and 7 from the state where no voltage is applied (initial director configuration of the liquid crystal) as shown in the reflection display section 9b and transmission display section 10b.

In this case, in the reflection display section 9a, the ambient light is converted to linearly polarized light by the polarization plate 14, and since the liquid crystal layer 1 does not have the retardation for the linearly polarized light, the incident light reaches the reflection film 8 while maintaining its polarization state. After the direction of propagation is inverted, the light passes through the liquid crystal layer 1 again, and exits through the polarization plate 14 while maintaining its direction of polarization which intersect at right angles with the absorption axis orientation of the polarization plate 14.

Also, like in the reflection display section 9*a*, in the transmission display section 10*a*, the incident light is converted to linearly polarized light by the polarization plate 15, and passes through the polarization plate 14 while keeping its polarization state substantially the same.

When using the above polarization converting function exploiting the optical anisotropy for the display, an amount of the polarization converting function is determined, for example, when the liquid crystal is aligned in parallel with the display surface and no voltage is applied to the liquid crystal layer 1, by an angle of twist of the director configuration of the liquid crystal layer 1, and the product (nd) of a thickness (d) of the liquid crystal layer and a difference of refractive index (n) of the liquid crystal composition. Thus, providing a thicker liquid crystal layer in the transmission display section 10 than in the reflection display section 9, as in the present invention, is effective for a liquid crystal display using both the transmitted light and reflected light for the display to obtain satisfactory brightness and contrast ratio for the display in both the reflection display section 9 and transmission display section 10. The angle of twist may be different in the reflection display section 9 and transmission display section 10.

When the liquid crystal display includes the phase difference compensation plates 16 and 17, satisfactory brightness and contrast ratio can be attained in a reliable manner with respect to light having more than one wavelength in the range of visible light, thereby making it possible to realize even more satisfactory display.

Also, if the liquid crystal composition and director configuration of the liquid crystal layer 1 are identical to one in the above explanation, a change in the display can be inverted by the function of the phase difference compensation plates 16 and 17. More specifically, when ¼ wavelength plates are used as the phase difference compensation plates 16 and 17, in the reflection display section 9*b*, the ambient light is converted to circularly polarized light by the phase difference compensation plate 16 upon incidence on the liquid crystal layer 1, and converted further to linearly polarized light by the polarization converting function exploiting the optical anisotropy of the liquid crystal layer 1 before it reaches the reflection film 8. Then, after its direction of propagation is inverted at the reflection film 8, the linearly polarized light becomes the transmission components of the polarization plate 14 and exits through the same, thereby showing the light display. On the other hand, when the director configuration of the liquid crystal is changed as shown in the reflection display section 9*a*, the ambient light reaches the reflection film 8 as the circularly polarized light, thereby showing the dark display.

The foregoing explained a case where the dark display changes to the light display with an increasing potential difference between the electrodes 6 and 7 was explained. However, it should be appreciated such a change in display is not limited to the above disclosure. For example, as has been explained, the display can be inverted by using a liquid crystal composition having negative dielectric constant anisotropy in the liquid crystal layer 1, or giving the liquid crystal vertical alignment in the initial stage.

Here, setting the initial director configuration of the liquid crystal perpendicular to the display surface can offer technical characteristics such that the polarization converting function of the initial director configuration is not greatly affected by a manufacturing accuracy of the thickness of the liquid crystal layer. Thus, taking advantage of the above characteristics it is highly productive to assign the initial director configuration to black display, thereby stabilizing black display, which affects display quality considerably. In particular, to do so, black must be shown at a state where the polarization converting function of the perpendicularly aligned liquid crystal layer 1 is almost completely lost, and the phase difference compensation plate 16 must have satisfactory circularly polarizing function. In short, it is important that the phase difference compensation plate 16 is arranged in such a manner as to convert the incident light to circularly polarized light in a wavelength range as broad as possible.

When the phase difference compensation plates 16 and 17 are provided to have their respective slow axis orientations intersecting at right angles and the polarization plates 14 and 15 are provided to have their respective absorption axis orientations intersecting at right angles, the transmission display section 10 shows the light display with the director configuration of the liquid crystal shown in the transmission display section 10*b* and the dark display with the director configuration of the liquid crystal shown in the transmission display section 10*a*.

In the liquid crystal display of the present invention, whether the liquid crystal layer 1 is aligned in parallel with or perpendicular to the display surface, in case that the thicknesses of the liquid crystal layer are different in the reflection display section 9 and transmission display section 10, to obtain satisfactory brightness and contrast ratio both in the reflection display section 9 and transmission display section 10, when the reflection display section 9 shows the display by letting the incident light from the display surface side pass through the liquid crystal layer 1 and go out to the display surface side through the liquid crystal layer 1 again, and the transmission display section 10 shows the display by letting the incident light from behind (back light 13 side) pass through the liquid crystal layer 1 only once and go out to the display surface side, it is very effective to make the liquid crystal layer thicker in the transmission display section 10 than in the reflection display section 9, and therefore, to satisfy the aforementioned conditions.

In the following, of all the liquid crystal displays of the present embodiment, those using the change of the polarization state caused by the polarization converting function of the liquid crystal layer 1 with the polarization plates 14 and 15 will be explained by way of examples and comparative examples with reference to FIGS. 4 through 8 for purposes of explanation only, without any intention as a definition of the limits of the invention.

EXAMPLES 2-4

In each of Examples 2 through 4, liquid crystal cells for filling are assembled in the same manner as Example 1. Here, the thicknesses (d) of the liquid crystal layer in the transmission display section 10 and reflection display section 9 are 7.5 m and 4.5 m, respectively. In other words, in Examples 2 through 4, the liquid crystal layer 1 is made thicker in the transmission display section 10 than in the reflection display section 9 by patterning the insulation film 11 in such a manner as to leave no photosensitive resin in the transmission display section 10 and form a 3 m-thick layer of the photosensitive resin in the reflection display section 9. However, in Examples 2 through 4, as shown in FIG. 4, the electrode pattern is formed in such a manner that the electrode 7 of the reflection display section 9 and the electrode 7 of the transmission display section 10 are electrically isolated, so that a voltage is applied to each separately from outside the liquid crystal cell.

Further, in Examples 2 through 4, the liquid crystal layer 1 is produced by filling liquid crystal composition with no chiral dopant, having positive dielectric constant anisotropy and a difference of refractive index (n) of 0.065 by means of vacuum injection.

Then, the liquid crystal displays are assembled by laminating the phase difference compensation plates 16 and 17 and polarization plates 14 and 15 to the outside of the respective electrode substrates of the liquid crystal cell produced in the above manner. Here, the phase difference compensation plate 17 is composed of two phase difference compensation plates in Examples 2 through 4, while the phase difference compensation plate 16 is composed of two phase difference compensation plates in Examples 2 and 4, and a single phase difference compensation plate in Example 3. The lamination orientation of the phase difference compensation plates 16 and 17 and polarization plates 14 and 15 is determined correspondingly to the alignment direction (alignment orientation) of the liquid crystal.

In Example 2, homogeneous alignment is used as the director configuration of the liquid crystal, and the NB (Normally Black) mode is used for the display mode. In Example 3, the homogenous alignment is used as the director configuration of the liquid crystal, and the NW (Normally White) mode is used for the display mode. In Example 4, a combination of these modes are used (the NB mode is used for the reflection display, and the NW mode is used for the transmission display).

In Examples 2 through 4, parallel aligning alignment films are used as the alignment films 2 and 3, so that the liquid crystal is aligned in parallel with the display surface when no voltage is applied to the liquid crystal layer 1, and the alignment treatment is applied to these alignment films 2 and 3 to form a crossed rubbing angle of 180.

Figure 5:
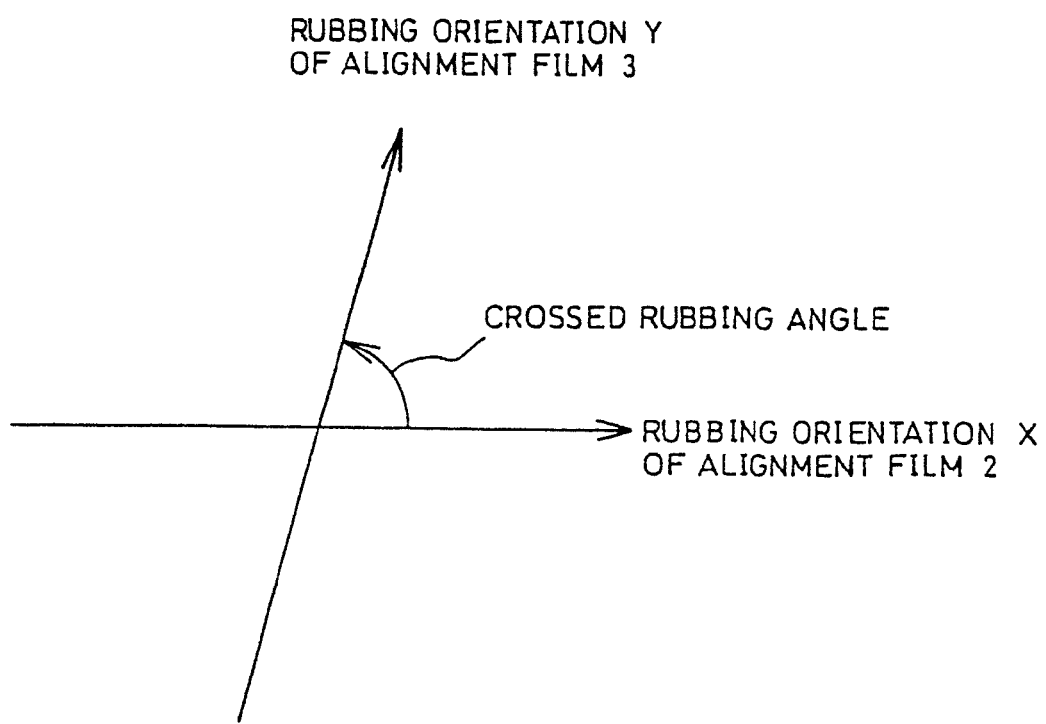
FIG. 5 is a view explaining a definition of a crossed rubbing angle.

Here, the crossed rubbing angle is defined, as shown in FIG. 5, in the liquid crystal cell for filling composed of a pair of electrode substrates sandwiching the liquid crystal layer 1, as an angle of the rubbing direction Y of the alignment treatment orientation of the alignment film 3 (the alignment film 3 on the substrate 5 side) on the electrode substrate in a let direction with respect to the rubbing direction X of the alignment treatment orientation of the other alignment film 2 (alignment film 2 on the substrate 4 side) on the electrode substrate on the viewer's side.

The director configuration of the liquid crystal molecules in the liquid crystal layer 1 sandwiched by the alignment treated alignment films 2 and 3 is determined by the alignment properties of the alignment films 2 and 3, a concentration of the chiral dopant for imparting a natural twist to the liquid crystal, and the crossed rubbing angle, when neither electric field nor magnetic field exists.

When the crossed rubbing angle is 180, the liquid crystal composition aligns itself without twisting when no chiral dopant is added. When the chiral dopant induces a left-handed twist, the director configuration of the liquid crystal remains intact until a predetermined amount of the chiral dopant is added, and when an amount added exceeds the predetermined amount, the liquid crystal twists 180 to the left (180 left twist alignment), and with a further increasing amount of the chiral dopant, the liquid crystal twists by an angle of an integral multiple of 180.

Thus, in the present embodiment, given x as the rubbing orientation X of the alignment film 2 provided on the electrode substrate above the liquid crystal layer 1, then the alignment orientation of the liquid crystal on the alignment film 3 realized by the crossed rubbing angle (180) is x when no chiral dopant is added, and the alignment orientation is (180+x) when the liquid crystal is twisted 180 to the left between the electrode substrates above and beneath the liquid crystal layer 1 with an increasing amount of the chiral dopant.

In case that the nematic liquid crystal having positive dielectric constant anisotropy and no chiral dopant is used when the alignment films 2 and 3 are the parallel aligning alignment films that align the liquid crystal in parallel with their film surfaces, when no voltage is applied, the liquid crystal molecules take an director configuration substantially parallel to the electrode substrates sandwiching the liquid crystal layer 1 above and beneath with no twist (that is, the homogenous alignment), and upon voltage application, the alignment starts to change from the central portion of the liquid crystal layer 1 in the layer thickness direction.

The optical of the polarization plates 14 and 15, phase difference compensation plates 16 and 17, and the liquid crystal layer 1 (that is, the lamination orientation of the polarization plates 14 and 15, and phase difference compensation plates 16 and 17, and the alignment orientation of the liquid crystal) in the liquid crystal displays in Examples 2 through 4 is set forth in Table 1 below for ready comparison with reference to a common orientation in any example.

The optical set forth in Table 1 is the position of each optical element on the display surface when the viewer observes the display surface, and when the phase difference compensation plate 16 or 17 is composed of more than one phase difference compensation plate, each phase difference compensation plate forming the phase difference compensation plate 16 or 17 is set forth in accordance with the actual position from the viewer's side.

Since the liquid crystal layer 1 is aligned without any twist, the alignment orientation (alignment orientation of the major axis of the liquid crystal molecules) of the entire liquid crystal layer 1 when no voltage is applied is set forth in Table 1 below, and this alignment orientation is the orientation of the rubbing treatment applied to the alignment film 2 on the substrate 4 side.

Each orientation is expressed in degrees from the reference orientation set arbitrarily on the display surface, and the retardation (product of a difference of in-plane refractive index and a thickness of the phase difference compensation plate) of each phase difference compensation plate is expressed in nm with respect to a beam of monochrome light having the wavelength of 550 nm.

TABLE 1

| | | EXAMPLE | 2 | 3 | 4 |
|---|---|---|---|---|---|
| PLATE 14 | | TRANSMISSION AXIS ORIENTATION (°) | 0 | 0 | 0 |
| PLATE 16 | PLATE | SLOW AXIS ORIENTATION (°) | 15 | 15 | 15 |
| | | RETARDATION (nm) | 270 | 270 | 270 |
| | PLATE | SLOW AXIS ORIENTATION (°) | 165 | — | 165 |
| | | RETARDATION (nm) | 135 | — | 135 |
| LC LAYER 1 | | ALIGNMENT ORIENTATION (°) | 75 | 75 | 75 |

TABLE 1-continued

| | EXAMPLE | | 2 | 3 | 4 |
|---|---|---|---|---|---|
| PLATE 17 | PLATE | SLOW AXIS ORIENTATION (°) | 165 | 165 | 165 |
| | | RETARDATION (nm) | 70 | 220 | 90 |
| | PLATE | SLOW AXIS ORIENTATION (°) | 135 | 135 | 105 |
| | | RETARDATION (nm) | 270 | 270 | 270 |
| PLATE 15 | | TRANSMISSION AXIS ORIENTATION (°) | 60 | 60 | 90 |

PLATES 14 × 15: POLARIZATION PLATES
PLATES 16 × 17: PHASE DIFFERENCE COMPENSATION PLATES

Figure 6:
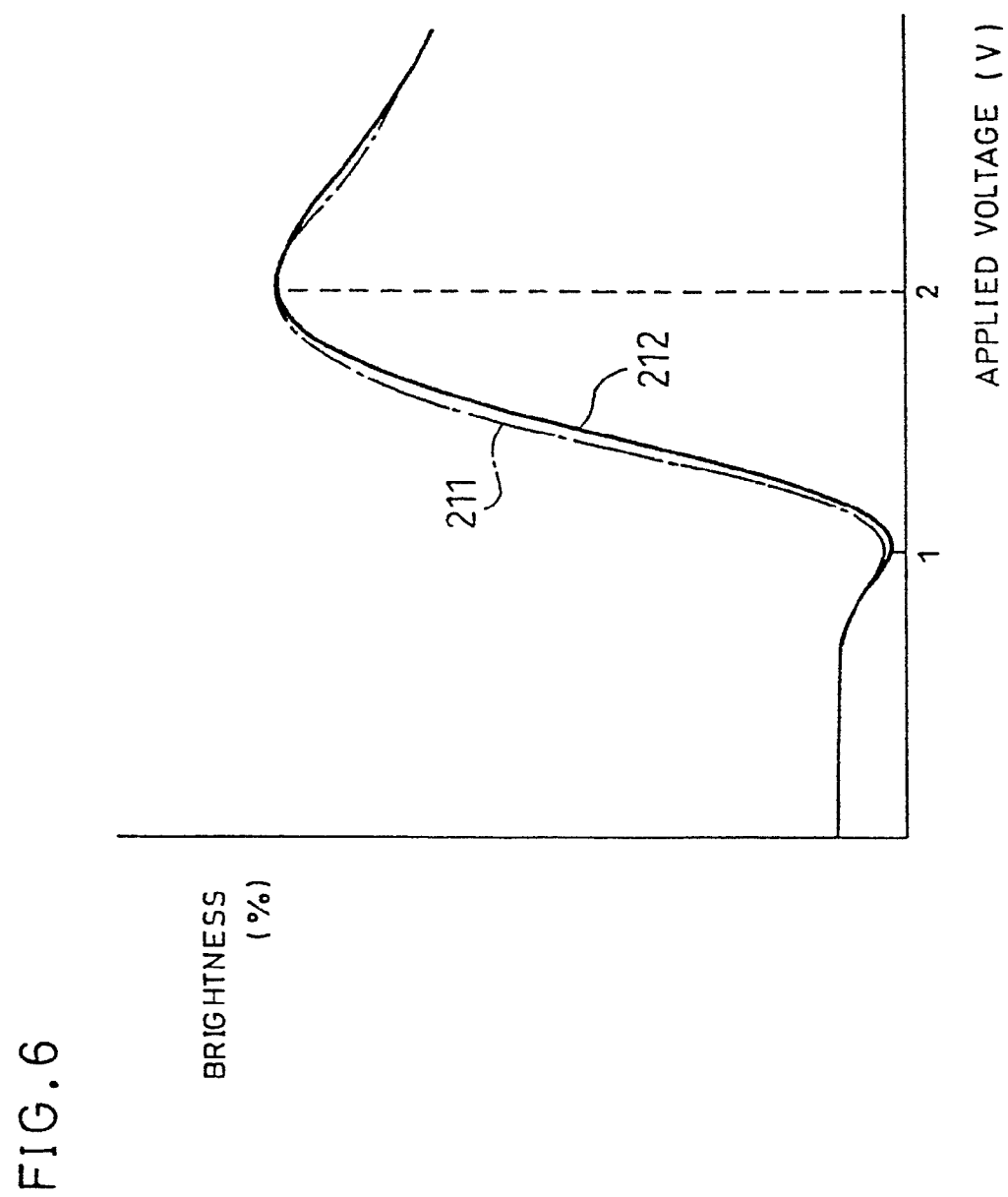
FIG. 6 is a view showing display characteristics of a liquid crystal display of Example 2.
Figure 7:
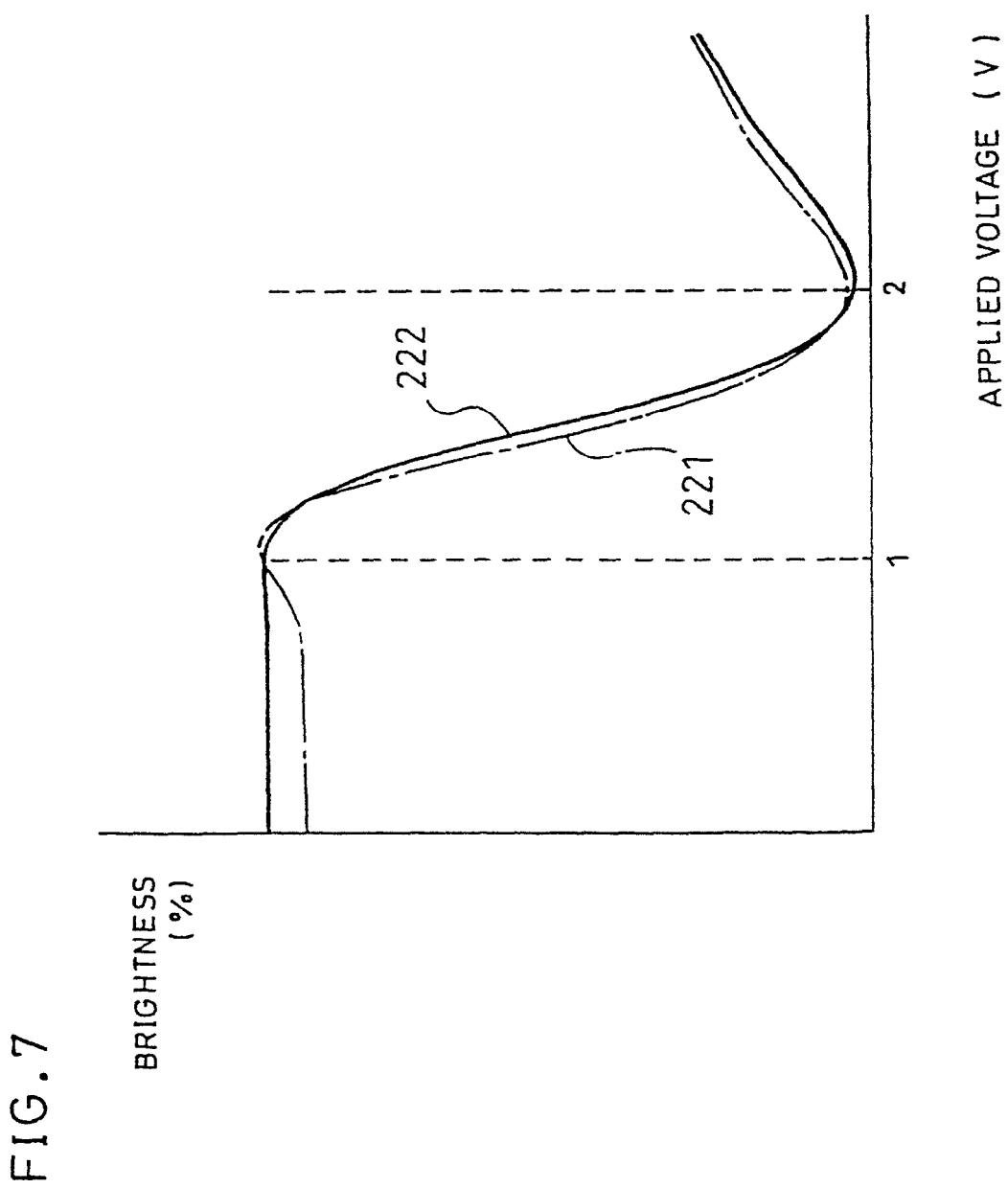
FIG. 7 is a view showing display characteristics of a liquid crystal display of Example 3.
Figure 8:
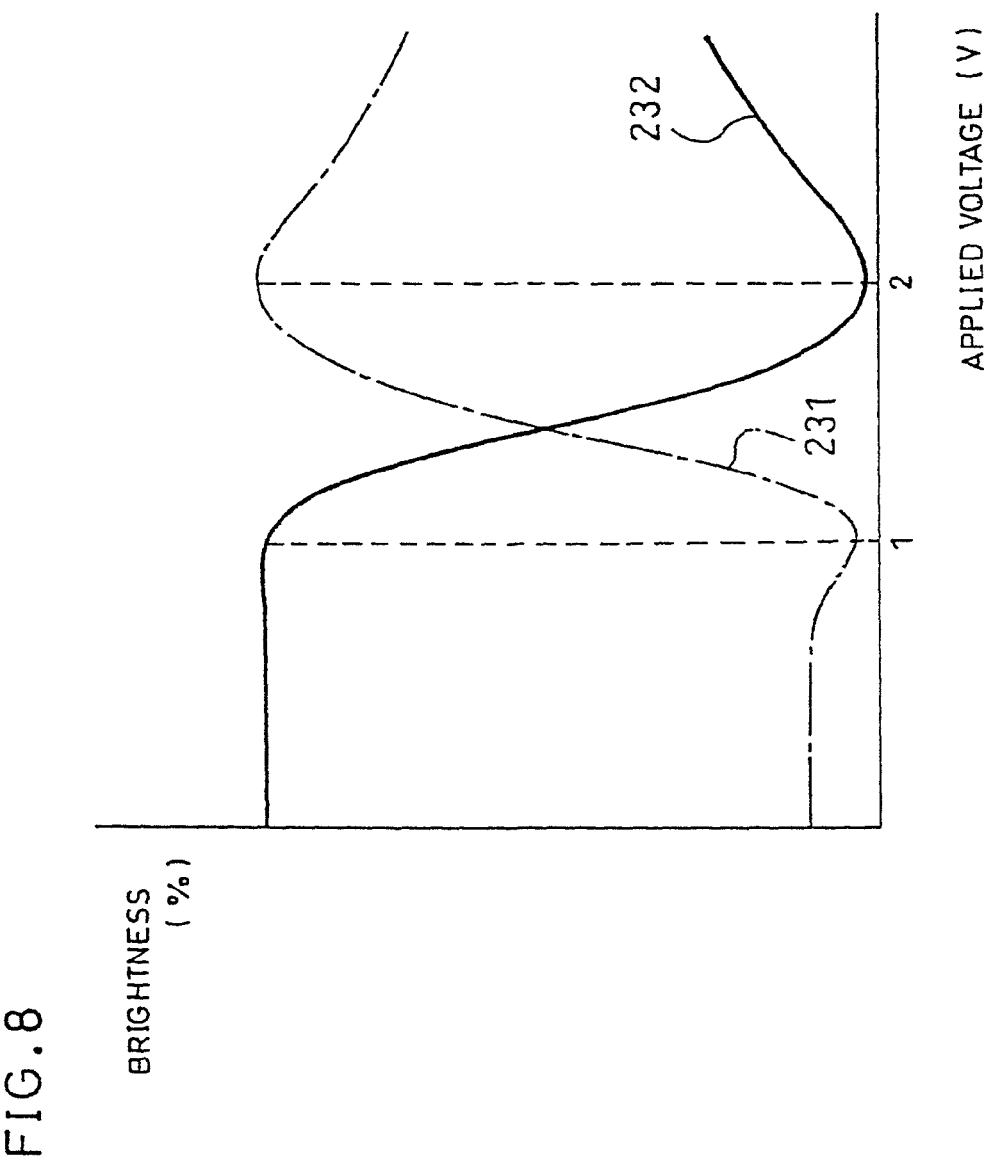
FIG. 8 is a view showing display characteristics of a liquid crystal display of Example 4.

The display characteristics of the liquid crystal displays assembled in Examples 2 through 4 are graphed in FIGS. 6 through 8, respectively. These display characteristics were measured in the same manner as Example 1, and in these drawings, the horizontal axis represents a root mean square value of the applied voltage, and the vertical axis represents the brightness (reflectance or transmittance). Here, the transmittance of the transmission display section 10 when the polarization plates 14 and 15 are not provided is scaled as 100%, and the reflectance of the reflection display section before the polarization plate 14 is provided is scaled as 100%.

In FIG. 6, a curve 211 represents the voltage dependence of the reflectance of the reflection display section 9 versus a voltage across the electrodes 6 and 7, and a curve 212 represents the voltage dependence of the transmittance of the transmission display section 10 versus a voltage across the electrodes 6 and 7 in the liquid crystal display assembled in Example 2.

FIG. 6 reveals that, in Example 2, while the applied voltage is in a range between 1V and 2V, both the reflectance and transmittance increase with an increasing applied voltage. That is, when the applied voltage is 1V, the reflectance of the reflection display section 9 and the transmittance of the transmission display section 10 are 3% and 2%, respectively, and when the applied voltage is increased to 2V, both increase to 40%.

In FIG. 7, a curve 221 represents the voltage dependence of the reflectance of the reflection display section 9 versus a voltage across the electrodes 6 and 7, and a curve 222 represents the voltage dependence of the transmittance of the transmission display section 10 versus a voltage across the electrodes 6 and 7 in the liquid crystal display assembled in Example 3.

FIG. 7 reveals that, in Example 3, while the applied voltage is in a range between 1V and 2V, both the reflection and transmittance decrease with an increasing applied voltage. That is, when the applied voltage is 1V, both the reflectance of the reflection display section 9 and the transmittance of the transmission display section 10 are 40%, and when the applied voltage is increased to 2V, both decrease to 3% and 2%, respectively.

In FIG. 8, a curve 231 represents the voltage dependence of the reflectance of the reflection display section 9 versus a voltage across the electrodes 6 and 7, and a curve 232 represents the voltage dependence of the transmittance of the transmission display section 10 versus a voltage across the electrodes 6 and 7 in the liquid crystal display assembled in Example 4.

FIG. 8 reveals that, in Example 4, while the applied voltage is in a range between 1V and 2V, the reflectance increases while the transmittance decreases with an increasing applied voltage. That is, when the applied voltage is 1V, the reflectance of the reflection display section 9 and the transmittance of the transmission display section 10 are 3% and 40%, respectively, and when the applied voltage is increased to 2V, the reflectance of the reflection display section 9 increases to 40%, while the transmittance of the transmission display section 10 decreases to 2%.

As has been explained, in all the liquid crystal displays assembled in Examples 2 through 4, the transmittance and reflectance change in response to a change in the applied voltage, and each can show both the reflection display and transmission display.

Further, the changes were checked visually. Then, in Examples 2 and 3, it was confirmed that the changes between the light display and dark display is equal and the display was not inverted (from light to dark and vice versa) in the reflection display section 9 and transmission display section 10. This is because the display is shown by applying the same voltage to the electrode 7 of the reflection display section 9 and the electrode 7 of the transmission display section 10 to keep the applied voltage to the liquid crystal layer 1 equal in the reflection display section 9 and transmission display section 10 by means of the electrodes 6 and 7. In addition, no change in the content of the display was observed when the luminance of the ambient light was changed during the observation. In other words, when the reflection display section 9 shows the dark display, so does the transmission display section 10, and when the reflection display section 9 shows the light display, so does the transmission display section 10. For this reason, even when the reflection display section 9 and transmission display section 10 are driven by the same electrode 7 as is shown in FIG. 1, the display is not inverted.

By contrast, in Example 4, when the voltage is applied in the same manner as Examples 2 and 3, that is, when a voltage of 1V is applied, the transmission display section 10 shows the light display while the reflection display section 9 shows the dark display. Then, when a voltage of 2V is applied, the transmission display section 10 shows the dark display while the reflection display section 9 shows the light display. Hence, the displays are inverted in the reflection display section 9 and transmission display section 10. Thus, when the display is shown under the circumstance where the ambient light is weak, and the display is shown by the reflection display by brightening the ambient light when the user is mainly observing the transmission display section 10, the display is inverted (from light to dark and vice versa), and as a consequence, it becomes difficult to see the display content. Thus, when, as in Example 4, the same voltage was applied to the electrode 7 in the reflection display section 9 and the electrode 7 in the transmission display section 10, it was confirmed that the displays of the reflection display section 9 and transmission display section 10 were inverted considerably in a combination mode of the NB and NW, thereby deteriorating the visibility.

However, in Example 4, the problem of such unwanted inversion of the dark display and light display can be resolved and a display state as satisfactory as those in Examples 2 and 3 can be obtained by applying different voltages to the electrode 7 in the reflection display section 9 and the electrode 7 in the transmission display section 10, so that when the reflection display section 9 shows the light display, so does the transmission display section 10, and when the reflection display section 9 shows the dark display, so does the transmission display section 10. More specifically, by means of the electrodes 6 and 7 (alignment mechanism), when a voltage of 1V is applied to the reflection display section 9 to let the same show the dark display, a voltage of 2V is applied to the transmission display section 10 to let the same show the dark display too, but when a voltage of 2V is applied to the reflection display section 9 to let the same show the light display, a voltage of 1V is applied to the transmission display section 10 to let the same show the light display too.

In view of the foregoing, the liquid crystal display in any of Examples 2 through 4 can attain satisfactory brightness and contrast ratio for the light display in both the reflection display section 9 and transmission display section 10. Moreover, the liquid crystal display in any of Examples 2 through 4 can match the dark/light display in the reflection display section 9 and transmission display section 10, thereby realizing display with excellent visibility. Further, the liquid crystal display in any of Examples 2 through 4 has a higher contrast ratio in the transmission display section 10 than in the reflection display section 9. Consequently, the display quality can be further improved and more satisfactory display can be shown.

Next, of all the liquid crystal displays of the present embodiment, a liquid crystal display using the polarization converting function of the liquid crystal layer 1 effected by the twist alignment thereof will be explained by way of examples and comparative examples with reference to FIGS. 9 and 10 for purposes of explanation only, without any intention as a definition of the limits of the invention.

EXAMPLE 5

In the present example, a liquid crystal cell for filling is assembled in the same manner as Example 1. Here, the thicknesses (d) of the liquid crystal layer in the transmission display section 10 and reflection display section 9 are 7.5 m and 4.5 m, respectively. In other words, in the present example too, the thickness of the liquid crystal layer is made thicker in the transmission display section 10 than in the reflection display section 9 by patterning the insulation film 11 in such a manner as to leave no photosensitive resin in the transmission display section 10 and form a 3 m-thick layer of the photosensitive resin in the reflection display section 9.

However, in the present example, like in Examples 2 through 4 as shown in FIG. 4, the electrode pattern is formed in such a manner that the electrode 7 of the reflection display section 9 and the electrode 7 of the transmission display section 10 are electrically isolated, so that a voltage is applied to each separately from outside the liquid crystal cell.

Further, the phase difference compensation plates 16 and 17 and polarization plates 14 and 15 are laminated to the outside of the respective electrode substrates of the above liquid crystal cell. Here, the phase difference compensation plate 17 is composed of a single phase difference compensation plate, while the phase difference compensation plate 16 is composed of two phase difference compensation plates. The lamination orientation of the phase difference compensation plates 16 and 17 and polarization plates 14 and 15 is determined correspondingly to the alignment direction (alignment orientation) of the liquid crystal.

In the present example, the liquid crystal display is assembled in such a manner that the twist director configuration of the liquid crystal layer 1 (angle of twist of the director configuration of the liquid crystal (twist angle)) is 70. More specifically, parallel aligning alignment films are used as the alignment films 2 and 3, so that the director configuration of the liquid crystal is parallel to the display surface when no voltage is applied, and the alignment treatment is applied to these alignment films 2 and 3 by means of rubbing in such a manner as to form the crossed rubbing angle of 250. The crossed rubbing angle is defined as above. Then, the liquid crystal layer 1 is produced by using vacuum injection to full a space between the electrode substrates of the above liquid crystal cell with a liquid crystal composition having a difference of refractive index (n) of 0.065 and positive dielectric constant anisotropy. The above alignment treatment and the function of the chiral dopant added to the liquid crystal composition impart an angle of twist (twist angle) of 70 to the director configuration of the liquid crystal. The liquid crystal layer 1 aligned in this manner starts to change its alignment upon application of the voltage from the central portion thereof in the layer thickness direction.

The optical of the polarization plates 14 and 15, phase difference compensation plates 16 and 17, and the liquid crystal layer 1 (that is, the lamination orientation of the polarization plates 14 and 15, and phase difference compensation plates 16 and 17, and the alignment orientation of the liquid crystal) in the liquid crystal display of the present example is set forth in Table 2 below for ready comparison with reference to a common orientation.

EXAMPLE 6

In the present example, like in Example 5, a liquid crystal cell for filling is assembled in the same manner as Example 1. Here, the thicknesses (d) of the liquid crystal layer in the transmission display section 10 and reflection display section 9 are 7.5 m and 4.5 m, respectively. Also, as shown in FIG. 4, the electrode pattern is formed in such a manner that the electrode 7 of the reflection display section 9 and the electrode 7 of the transmission display section 10 are electrically isolated, so that a voltage is applied to each separately from outside the liquid crystal cell.

Further, the phase difference compensation plates 16 and 17 and polarization plates 14 and 15 are laminated to the outside of the respective electrode substrates of the above liquid crystal cell. Here, each of the phase difference compensation plates 16 and 17 is composed of a single phase difference compensation plate. The lamination orientation of the phase difference compensation plates 16 and 17 and polarization plates 14 and 15 is determined correspondingly to the alignment direction (alignment orientation) of the liquid crystal.

In the present example, the liquid crystal display is assembled in such a manner that the twist director configuration of the liquid crystal layer 1 (twist angle) is 90. More specifically, parallel aligning alignment films are used as the alignment films 2 and 3, so that the director configuration of the liquid crystal becomes parallel to the display surface when no voltage is applied, and the alignment treatment is applied to these alignment films 2 and 3 by means of rubbing in such a manner as to form the crossed rubbing angle of 270. The crossed rubbing angle is defined as above. Then, the liquid crystal layer 1 is produced by filling the liquid crystal composition having a difference of refractive index (n) of 0.065 and the positive dielectric constant anisotropy into a space between the electrode substrates of the liquid crystal cell for filling by means of vacuum injection. The above alignment treatment and the function of the chiral dopant added to the liquid crystal composition impart the angle of twist (twist angle) of 90 to the director configuration of the liquid crystal. The liquid crystal layer 1 aligned in this manner starts to change its alignment upon application of the voltage from the central portion thereof in the layer thickness direction.

The optical of the polarization plates 14 and 15, phase difference compensation plates 16 and 17, and the liquid crystal layer 1 (that is, the lamination orientation of the polarization plates 14 and 15, and phase difference compensation plates 16 and 17, and the alignment orientation of the liquid crystal) in the liquid crystal display of the present example is set forth in Table 2 below for ready comparison with a reference to common orientation.

The optical set forth in Table 2 is the position of each optical element on the display surface when the viewer observes the display surface, and when the phase difference compensation plate 16 or 17 is composed of more than one phase difference compensation plate, each phase difference compensation plate forming the phase difference compensation plate 16 or 17 is set forth in accordance with the actual position from the viewer's side.

The alignment orientation of the liquid crystal layer 1 (the alignment orientation of the major axis of the liquid crystal molecules) on the substrate 4 side is identical with the orientation of the rubbing treatment applied to the alignment film 2 on the substrate 4, and on the substrate 5 side is identical with the orientation of the rubbing treatment applied to the alignment film 3 on the substrate 5. Note that, however, when the alignment orientation of the liquid crystal touching the alignment film 2 is traced toward the alignment film 3, the alignment orientation is twisted 90 to the left. In case that the director configuration of the liquid crystal is traced in the above manner, on the assumption that the orientation of the rubbing treatment applied to the alignment film 2 is the alignment orientation on the substrate 4 side (hereinafter, referred to as the substrate 4 alignment orientation), the rubbing orientation of the alignment film 3 is inverted by 180 from the orientation traced along the twist of the director configuration of the liquid crystal. In the following, the alignment orientation on the substrate 5 side (hereinafter, referred to as the substrate 5 alignment orientation) is defined as the director configuration of the liquid crystal on the substrate 5 traced along the twist of the director configuration of the liquid crystal from the substrate 4 alignment orientation.

Each orientation is expressed in degrees from the reference orientation set arbitrarily on the display surface, and the retardation of each phase difference compensation plate is expressed in nm with respect to a beam of monochrome light having the wavelength of 550 nm.

TABLE 2

|  |  |  | EXAMPLE | |
|---|---|---|---|---|
|  |  |  | 5 | 6 |
| PLATE 14 |  | TRANSMISSION AXIS ORIENTATION (°) | 0 | 0 |
| PLATE 16 | PLATE | SLOW AXIS ORIENTATION (°) | 18 | 12 |
|  |  | RETARDATION (nm) | 270 | 135 |
|  | PLATE | SLOW AXIS ORIENTATION (°) | 126 | — |
|  |  | RETARDATION (nm) | 135 | — |
| LC LAYER 1 |  | SUBSTRATE 4 ALIGNMENT ORIENTATION (°) | 16 | −11 |
|  |  | SUBSTRATE 5 ALIGNMENT ORIENTATION (°) | 86 | 79 |
| PLATE 17 | PLATE | SLOW AXIS ORIENTATION (°) | −4 | 135 |
|  |  | RETARDATION (nm) | 260 | 260 |
| PLATE 15 |  | TRANSMISSION AXIS ORIENTATION (°) | 152 | 90 |

PLATES 14 × 15: POLARIZATION PLATES
PLATES 16 × 17: PHASE DIFFERENCE COMPENSATION PLATES

Figure 9:
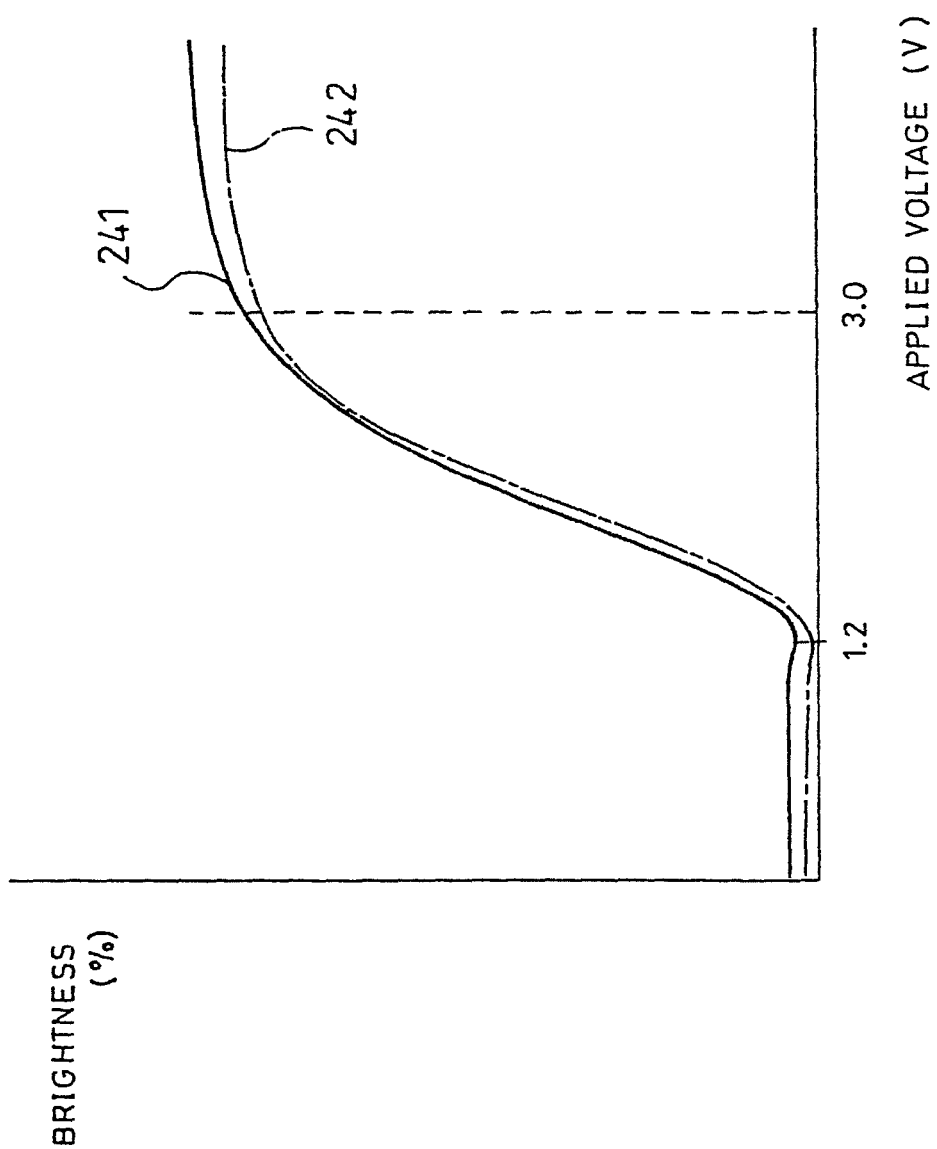
FIG. 9 is a view showing display characteristics of a liquid crystal display of Example 5.
Figure 10:
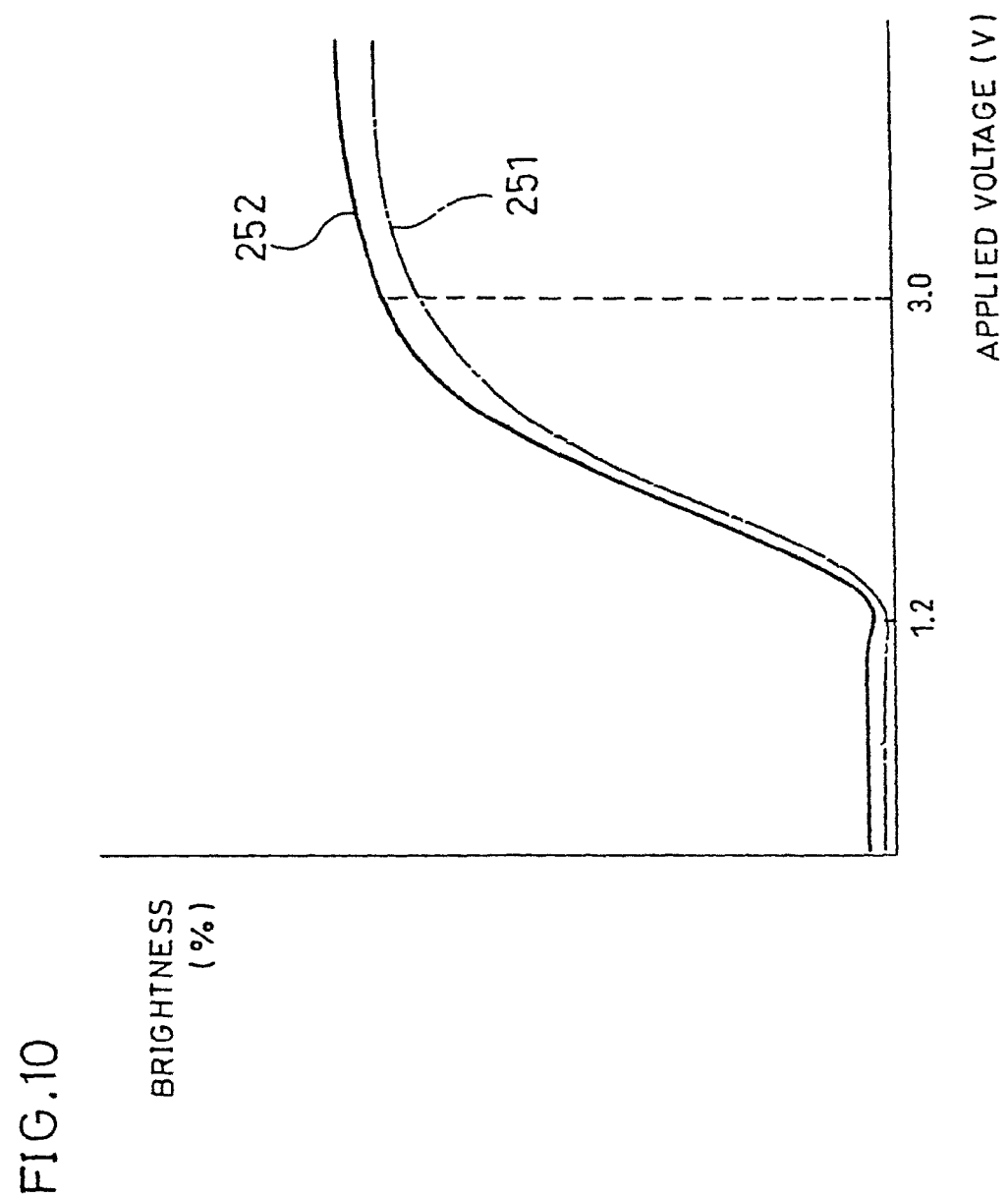
FIG. 10 is a view showing display characteristics of a liquid crystal display of Example 6.

The display characteristics of the liquid crystal displays assembled in Examples 5 and 6 are graphed in FIGS. 9 and 10, respectively. These display characteristics were measured in the same manner as Example 1, and in each drawing, the horizontal axis represents a root mean square value of the applied voltage, and the vertical axis represents the brightness (reflectance or transmittance). Here, the transmittance of the transmission display section 10 when the polarization plates 14 and 15 are not provided is scaled as 100%, and the reflectance of the reflection display section 9 before the polarization plate 14 is provided is scaled as 100%.

In FIG. 9, a curve 241 represents the voltage dependence of the reflectance of the reflection display section 9 versus a voltage across the electrodes 6 and 7, and a curve 242 represents the voltage dependence of the transmittance of the transmission display section 10 versus a voltage across the electrodes 6 and 7 in the liquid crystal display assembled in Example 5.

FIG. 9 reveals that, in Example 5, while the applied voltage is 1.2V or higher, both the reflectance and transmittance increase with an increasing applied voltage. That is, when the applied voltage is 1V, the reflectance of the reflection display section 9 and the transmittance of the transmission display section 10 are 3% and 2%, respectively, and when the applied voltage is increased to 4V, both increase to 41% and 40%, respectively.

In FIG. 10, a curve 251 represents the voltage dependence of the reflectance of the reflection display section 9 versus a voltage across the electrodes 6 and 7, and a curve 252 represents the voltage dependence of the transmittance of the transmission display section 10 versus a voltage across the electrodes 6 and 7 in the liquid crystal display assembled in Example 6.

FIG. 10 reveals that, in Example 6, like in Example 5, while the applied voltage is 1.2V or higher, both the reflectance and transmittance increase with an increasing applied voltage. That is, when the applied voltage is 1V, the reflectance of the reflection display section 9 and the transmittance of the transmission display section 10 are 3% and 2%, respectively, and when the applied voltage is increased to 4V, both increase to 35% and 37%, respectively.

As has been explained, in each of the liquid crystal displays assembled in Examples 5 and 6, the transmittance and reflectance change in response to a change in the applied voltage, and each can show both the reflection display and transmission display.

Further, the changes were checked visually. Then, in Examples 5 and 6, it was confirmed that the changes between the light display and dark display were equal and the display was not inverted (from light to dark and vice versa) in the reflection display section 9 and transmission display section 10, even when the display is shown by applying the same voltage to the electrode 7 of the reflection display section 9 and the electrode 7 of the transmission display section 10 to keep the applied voltage to the liquid crystal layer 1 equal in the reflection display section 9 and transmission display section 10 by the electrodes 6 and 7. In addition, a change in the content of the display is not observed when the luminance of the ambient light is changed during the observation. In other words, when the reflection display section 9 shows the dark display, so does the transmission display section 10, and when the reflection display section 9 shows the light display, so does the transmission display section 10. For this reason, even when the reflection display section 9 and transmission display section 10 are driven by the same electrode 7 as is shown in FIG. 1, the display is not inverted in Example 5 nor 6.

In view of the foregoing, the liquid crystal displays in Examples 5 and 6 can attain satisfactory brightness and contrast ratio for the light display in both the reflection display section 9 and transmission display section 10. Moreover, the liquid crystal displays in Examples 5 and 6 can match the dark/light display in the reflection display section 9 and transmission display section 10, thereby realizing display with excellent visibility. Further, the liquid crystal displays in Examples 5 and 6 have a higher contrast ratio in the transmission display section 10 than in the reflection display section 9. Consequently, the display quality can be further improved and more satisfactory display can be shown.

Also, both the liquid crystal displays of Examples 5 and 6 have good visibility, and can show a high-resolution color display while using both the reflected light and transmitted light, but the liquid crystal display of Example 6 is less expensive compared with its counterpart of Example 5, because the former uses fewer phase difference compensation plates.

Explained in the present embodiment was the liquid crystal display which can show satisfactory reflection display and transmission display by changing the thickness of the liquid crystal layer in the reflection display section and transmission display section. The following will explain a liquid crystal display, which can show satisfactory reflection display and transmission display even though the thicknesses of the liquid crystal layer in the reflection display section and transmission display section are equal.

Embodiment 3

Explained in the present embodiment is a liquid crystal display which has the equal thickness of the liquid crystal layer in the reflection display section and transmission display section but can show satisfactory reflection display and transmission display by changing the director configuration of the liquid crystal by applying different voltages to the reflection display section and transmission display section.

In the present embodiment, a liquid crystal display, which has the polarization plates 14 and 15 of Embodiment 2 and the equal thickness of the liquid crystal layer in the reflection display section and transmission display section and uses the retardation of the liquid crystal layer 1 for the display, will be explained by way of examples and comparative examples with reference to FIGS. 4 and 11 through 16 for purposes of explanation only, without any intention as a definition of the limits of the invention.

Hereinafter, like components are labeled with like reference numerals with respect to Embodiments 1 and 2, and, for ease of explanation, the description of these components is not repeated here. Also, the arrangement of the entire liquid crystal display of the present embodiment is identical with its counterpart of Embodiment 2 except that the thickness of the liquid crystal layer is equal in the reflection display section 9 and transmission display section 10, and the description of which is not repeated either for ease of explanation.

To give the liquid crystal layer 1 equal thicknesses in the reflection display section 9 and transmission display section 10 like in the present embodiment, the insulation film 11 is omitted and the electrode 7 is formed directly on the substrate 5, for example.

EXAMPLE 7

In the present example, a liquid crystal cell for filling, having the liquid crystal layer having a thickness (d) of 4.5 m both in the reflection display section 9 and transmission display section 10 is produced in the same manner as Example 1 except that the insulation film 11 made of the insulation photosensitive resin is not formed on the substrate 5, and that, as shown in FIG. 4, the electrode pattern is formed in such a manner that the electrode 7 of the reflection display section 9 and the electrode 7 of the transmission display section 10 are electrically isolated, so that a voltage is applied to each separately from outside the liquid crystal cell.

Then, the liquid crystal layer 1 is produced by filling the liquid crystal composition having a difference of refractive index (n) of 0.065 and positive dielectric constant anisotropy into the liquid crystal cell for filling by means of vacuum injection.

Further, the phase difference compensation plates 16 and 17 and polarization plates 14 and 15 are laminated to the outside of the respective electrode substrates of the above liquid crystal cell. Here, each of the phase difference compensation plates 16 and 17 is composed of two phase difference compensation plates. The lamination orientation of the phase difference compensation plates 16 and 17 and polarization plates 14 and 15 is determined correspondingly to the alignment direction (alignment orientation) of the liquid crystal.

In the present example, the liquid crystal in the liquid crystal layer 1 is aligned in parallel with the substrates 4 and 5 (parallel to the display surface) with no twist, and the birefringence mode using the retardation of the liquid crystal layer 1 for the display is adopted as the liquid crystal display method.

Also, in the present example, the retardation suitable for the reflection display is used for the transmission display section 10. Here, the reflection display section 9 is arranged in the same manner as its counterpart of Example 2 in Embodiment 2, while the transmission display section 10 is arranged differently from its counterpart of Example 2 in that it has the liquid crystal layer as thick as the one in the reflection display section 9. Thus, to assemble the liquid crystal display of the present example, the liquid crystal display of Example 2 is re-designed optically to determine the optical of the polarization plates 14 and 15 and phase difference compensation plates 16 and 17. In the present example, the optical of the polarization plates 14 and 15 and phase difference compensation plates 16 and 17 is determined in such a manner that the transmission display section 10 can show satisfactory dark display.

In the present example, like in Example 2, parallel aligning alignment films are used as the alignment films 2 and 3 to align the liquid crystal in parallel with the display surface when no voltage is applied to the liquid crystal layer 1, and the alignment treatment is applied to these alignment films 2 and 3 in such a manner as to form the crossed rubbing angle of 180.

In the above alignment treatment, the angle of twist of the director configuration of the liquid crystal (twist angle) is 0, and the alignment starts to change upon the voltage application from the central portion of the liquid crystal in the layer thickness direction of the liquid crystal layer 1.

The optical of the polarization plates 14 and 15, phase difference compensation plates 16 and 17, and the liquid crystal layer 1 (that is, the lamination orientation of the polarization plates 14 and 15, and phase difference compensation plates 16 and 17, and the alignment orientation of the liquid crystal) in the liquid crystal display of the present example is set forth in Table 3 below for ready comparison with reference to a common orientation.

COMPARATIVE EXAMPLE 3

In the present comparative example with respect to Example 7 above, a comparative liquid crystal display is assembled in the same manner as Example 7 except that the phase difference compensation plate 16 is composed of two phase difference compensation plates while the phase difference compensation plate 17 is composed of a single phase difference compensation plate, and that the optical of the polarization plates 14 and 15 and phase difference compensation plates 16 and 17 is set in such a manner that the transmission display section 10 can show satisfactory light display. The lamination orientation of the phase difference compensation plates 16 and 17 and polarization plates 14 and 15 is determined correspondingly to the alignment direction (alignment orientation) of the liquid crystal.

In the present comparative example, like in Example 7, parallel aligning alignment films are used as the alignment films 2 and 3 to align the liquid crystal in parallel with the display surface when no voltage is applied to the liquid crystal layer 1, and the alignment treatment is applied to these alignment films 2 and 3 in such a manner as to form the crossed rubbing angle of 180.

In the above alignment treatment, the angle of twist of the director configuration of the liquid crystal (twist angle) is 0, and the alignment starts to change upon the voltage application from the central portion of the liquid crystal in the layer thickness direction of the liquid crystal layer 1.

The optical of the polarization plates 14 and 15, phase difference compensation plates 16 and 17, and the liquid crystal layer 1 (that is, the lamination orientation of the polarization plates 14 and 15, and phase difference compensation plates 16 and 17, and the alignment orientation of the liquid crystal) in the comparative liquid crystal display of the present comparative example is set forth in Table 3 below for ready comparison with reference to a common orientation.

EXAMPLE 8

A liquid crystal display of the present example is assembled in the same manner as Example 7 except that the thickness (d) of the liquid crystal layer in both the reflection display section 9 and transmission display section 10 is 7.5 m, and that the optical of the polarization plates 14 and 15 and phase difference compensation plates 16 and 17 is set in such a manner that reflection display section 9 can show satisfactory reflection display by using the retardation suitable for the transmission display.

To be more specific, in the present example, a liquid crystal cell for filling, including the liquid crystal layer having a thickness (d) of 7.5 m in both the reflection display section 9 and transmission display section 10, is produced in the same manner as Example 1 except that the insulation film 11 made of the insulation photosensitive resin is not formed on the substrate 5, and that, as shown in FIG. 4, the electrode pattern is formed in such a manner that the electrode 7 of the reflection display section 9 and the electrode 7 of the transmission display section 10 are electrically isolated, so that a voltage is applied to each separately from outside the liquid crystal cell.

Then, the liquid crystal layer 1 is produced by filling the liquid crystal composition having a difference of refractive index (n) of 0.065 and the positive dielectric constant anisotropy but the chiral dopant into the above liquid crystal cell for filling by means of vacuum injection.

Further, the phase difference compensation plates 16 and 17 and polarization plates 14 and 15 are laminated to the outside of the respective electrode substrates of the above liquid crystal cell. Here, each of the phase difference compensation plates 16 and 17 is composed of two phase difference compensation plates. The lamination orientation of the phase difference compensation plates 16 and 17 and polarization plates 14 and 15 is determined correspondingly to the alignment direction (alignment orientation) of the liquid crystal.

In the present example, the liquid crystal in the liquid crystal layer 1 is aligned in parallel with the substrates 4 and 5 (parallel to the display surface) with no twist, and the birefringence mode using the retardation of the liquid crystal layer 1 for the display is adopted as the liquid crystal display method.

Also, in the present example, the retardation suitable for the transmission display is used for the reflection display section 9. Here, the transmission display section 10 is arranged in the same manner as its counterpart of Example 2 in Embodiment 2, while the reflection display section 9 is arranged differently from its counterpart of Example 2 in that it has the liquid crystal layer as thick as the one in the transmission display section 10. Thus, to assemble the liquid crystal display of the present example, the liquid crystal display of Example 2 is re-designed optically to determine the optical of the polarization plates 14 and 15 and phase difference compensation plates 16 and 17. In the present example, the optical of the polarization plates 14 and 15 and phase difference compensation plates 16 and 17 is determined in such a manner that satisfactory reflection display can be shown.

In the present example, like in Example 2, parallel aligning alignment films are used as the alignment films 2 and 3 to align the liquid crystal in parallel with the display surface when no voltage is applied to the liquid crystal layer 1, and the alignment treatment is applied to these alignment films 2 and 3 in such a manner as to form the crossed rubbing angle of 180.

In the above alignment treatment, the angle of twist of the director configuration of the liquid crystal (twist angle) is 0, and the alignment starts to change upon the voltage application from the central portion of the liquid crystal in the layer thickness direction of the liquid crystal layer 1.

The optical of the polarization plates 14 and 15, phase difference compensation plates 16 and 17, and the liquid crystal layer 1 (that is, the lamination orientation of the polarization plates 14 and 15, and phase difference compensation plates 16 and 17, and the alignment orientation of the liquid crystal) in the liquid crystal display of the present example is set forth in Table 3 below for ready comparison with reference to a common orientation.

The optical shown in Table 3 below is the position of each optical element on the display surface when the viewer observes the display surface, and when the phase difference compensation plate 16 or 17 is composed of more than one phase difference compensation plate, each phase difference compensation plate forming the phase difference compensation plate 16 or 17 is set forth in accordance with the actual position from the viewer's side.

Since the liquid crystal layer 1 is aligned without any twist, the alignment orientation set forth in Table 3 below is the alignment orientation (alignment orientation of the major axis of the liquid crystal molecules) in the entire liquid crystal layer 1 when no voltage is applied, and it is identical with the orientation of the rubbing treatment applied to the alignment film 2 on the substrate 4 side.

Each orientation is expressed in degrees from the reference direction set arbitrarily on the display surface, and the retardation of each phase difference compensation plate is expressed in nm with respect to a beam of monochrome light having the wavelength of 550 nm.

the outside of the respective electrode substrates of the above liquid crystal cell. Here, each of the phase difference compensation plates 16 and 17 is composed of two phase difference compensation plates. The lamination orientation of the phase difference compensation plates 16 and 17 and polarization plates 14 and 15 is determined correspondingly to the alignment direction (alignment direction) of the liquid crystal.

Further, in the present comparative example, parallel aligning alignment films are used as the alignment films 2 and 3, so that the director configuration of the liquid crystal is parallel to the display surface when no voltage is applied, and the rubbing treatment is applied these alignment films 2 and 3 in such a manner as to form the crossed rubbing angle of 250. The crossed rubbing angle is defined as above. Then, the liquid crystal layer 1 is produced by filling the liquid crystal composition having a difference of refractive index (n) of 0.065 and positive dielectric constant anisotropy into a space between the electrode substrates of the liquid crystal cell for filling by means of vacuum injection. The above alignment treatment and the function of the chiral dopant added to the liquid crystal composition impart the angle of twist (twist angle) of 70 to the director configuration of the liquid crystal. A concentration of the chiral dopant is adjusted to impart the above specified twist angle. The liquid crystal layer 1 aligned

TABLE 3

| | EXAMPLE | | 7 | 3* | 8 |
|---|---|---|---|---|---|
| PLATE 14 | TRANSMISSION AXIS ORIENTATION (°) | | 0 | 0 | 0 |
| PLATE 16 | SLOW AXIS ORIENTATION (°) | | 15 | 15 | 15 |
| | PLATE | RETARDATION (nm) | 270 | 270 | 270 |
| | PLATE | SLOW AXIS ORIENTATION (°) | 165 | 165 | 165 |
| | | RETARDATION (nm) | 135 | 135 | 135 |
| LC LAYER 1 | ALIGNMENT ORIENTATION (°) | | 75 | 75 | 75 |
| PLATE 17 | PLATE | SLOW AXIS ORIENTATION (°) | 75 | 105 | 165 |
| | | RETARDATION (nm) | 135 | 270 | 70 |
| | PLATE | SLOW AXIS ORIENTATION (°) | 135 | — | 135 |
| | | RETARDATION (nm) | 270 | — | 270 |
| PLATE 15 | TRANSMISSION AXIS ORIENTATION (°) | | 60 | 0 | 60 |

3*: COMPARATIVE EXAMPLE 3
PLATES 14 × 15: POLARIZATION PLATES
PLATES 16 × 17: PHASE DIFFERENCE COMPENSATION PLATES

COMPARATIVE EXAMPLE 4

A comparative liquid crystal display of the present comparative example is assembled in the same manner as Example 7 except that the liquid crystal in the liquid crystal layer 1 is aligned in parallel with the substrates 4 and 5 (parallel to the display surface) and twisted by 70, and that the polarization converting function of the liquid crystal layer 1 effected by the twisted director configuration of the liquid crystal layer 1 is used for the display.

To be more specific, in the present comparative example, a liquid crystal cell for filling, including the liquid crystal layer having a thickness (d) of 4.5 m in both the reflection display section 9 and transmission display section 10, is produced in the same manner as Example 1 except that the insulation film 11 made of the insulation photosensitive resin is not formed on the substrate 5, and that, as shown in FIG. 4, the electrode pattern is formed in such a manner that the electrode 7 of the reflection display section 9 and the electrode 7 of the transmission display section 10 are electrically isolated, so that a voltage is applied to each separately from outside the liquid crystal cell. Further, the phase difference compensation plates 16 and 17 and polarization plates 14 and 15 are laminated to in this manner starts to change its alignment upon application of the voltage from the central portion thereof in its layer thickness direction.

Also, in the present comparative example, the product (nd) of a difference of the refractive index (n) of the liquid crystal composition and a thickness (d) of the liquid crystal layer suitable for the reflection display is used for the transmission display section 10. Here, the reflection display section 9 is arranged in the same manner as its counterpart of Example 5 in Embodiment 2, while the transmission display section 10 is arranged differently from its counterpart of Example 5 in Embodiment 2 in that it has the same liquid crystal layer thickness as the one in the reflection display section 9. Thus, to assemble the comparative liquid crystal display of the present comparative example, the liquid crystal display of Example 5 is re-designed optically to determine the optical of the polarization plates 14 and 15 and phase difference compensation plates 16 and 17. In the present comparative example, the optical of the polarization plates 14 and 15 and phase difference compensation plates 16 and 17 is determined in such a manner that the transmission display section 10 can show satisfactory dark display.

The optical of the polarization plates 14 and 15, phase difference compensation plates 16 and 17, and the liquid crystal layer 1 (that is, the lamination orientation of the polarization plates 14 and 15, and phase difference compensation plates 16 and 17, and the alignment orientation of the liquid crystal) in the comparative liquid crystal display of the present comparative example is set forth in Table 4 below for ready comparison with a reference to a common orientation.

COMPARATIVE EXAMPLE 5

In the present comparative example, a comparative liquid crystal display is assembled in the same manner as Comparative Example 4 except that the polarization plates 14 and 15 and phase difference compensation plates 16 and 17 are optically positioned in such a manner that the transmission display section 10 can show satisfactory light display. To be more specific, a comparative liquid crystal display is assembled in the same manner as Example 7 except that: (1) the polarization plates 14 and 15 and phase difference compensation plates 16 and 17 are optically positioned in such a manner that the transmission display section 10 can show satisfactory light display, (2) the liquid crystal in the liquid crystal layer 1 is aligned in parallel with the substrates 4 and 5 (parallel to the display surface) and twisted by 70, and (3) the polarization converting function of the liquid crystal layer 1 effected by the twisted alignment thereof is used for the display.

The optical of the polarization plates 14 and 15, phase difference compensation plates 16 and 17, and the liquid crystal layer 1 (that is, the lamination orientation of the polarization plates 14 and 15, and phase difference compensation plates 16 and 17, and the alignment orientation of the liquid crystal) in the comparative liquid crystal display of the present comparative example is set forth in Table 4 below for ready comparison with reference to a common orientation.

EXAMPLE 9

In the present example, a liquid crystal display is assembled in the same manner as Example 8 except that (1) the phase difference compensation plate 16 is composed of two phase difference compensation plates while the phase difference compensation plate 17 is composed of a single phase difference compensation plate, (2) the liquid crystal in the liquid crystal layer 1 is aligned in parallel with the substrates 4 and 5 (parallel to the display surface) and twisted by 70, and (3) the polarization converting function of the liquid crystal layer 1 effected by the twisted alignment thereof is used for the display.

To be more specific, in the present example, a liquid crystal cell for filling, including the liquid crystal layer having a thickness (d) of 7.5 m both in the reflection display section 9 and transmission display section 10, is produced in the same manner as Example 1 except that the insulation film 11 made of the insulation photosensitive resin is not formed on the substrate 5, and that, as shown in FIG. 4, the electrode pattern is formed in such a manner that the electrode 7 of the reflection display section 9 and the electrode 7 of the transmission display section 10 are electrically isolated, so that a voltage is applied to each separately from outside the liquid crystal cell.

Further, the phase difference compensation plates 16 and 17 and polarization plates 14 and 15 are laminated to the outside of the respective electrode substrates of the above liquid crystal cell. Here, the phase difference compensation plate 17 is composed of a single phase difference compensation plate, while the phase difference compensation plate 16 is composed of two phase difference compensation plates. The lamination orientation of the phase difference compensation plates 16 and 17 and polarization plates 14 and 15 is determined correspondingly to the alignment direction (alignment orientation) of the liquid crystal.

In the present example, the liquid crystal display is assembled in such a manner that the twist director configuration of the liquid crystal layer 1 (angle of twist of the director configuration of the liquid crystal (twist angle)) is 70. More specifically, parallel aligning alignment films are used as the alignment films 2 and 3, so that the director configuration of the liquid crystal is parallel to the display surface when no voltage is applied, and the alignment treatment is applied to these alignment films 2 and 3 by means of rubbing in such a manner as to form the crossed rubbing angle of 250. The crossed rubbing angle is defined as above. Then, the liquid crystal layer 1 is produced by filling the liquid crystal composition having a difference of refractive index (n) of 0.065 and positive dielectric constant anisotropy into a space between the electrode substrates of the liquid crystal cell for filling by means of vacuum injection. The above alignment treatment and the function of the chiral dopant added to the liquid crystal composition impart the angle of twist (twist angle) of 70 to the director configuration of the liquid crystal. A concentration of the chiral dopant is adjusted in such a manner as to impart the above specified twist angle to the director configuration of the liquid crystal. The liquid crystal layer 1 aligned in this manner starts to change its alignment upon the voltage application from the central portion thereof in its layer thickness direction.

In the present example, the product (nd) of a difference of the refractive index (n) of the liquid crystal composition and a thickness (d) of the liquid crystal layer suitable for the transmission display is used for the reflection display section 9. Here, the transmission display section 10 is arranged in the same manner as its counterpart of Example 5 in Embodiment 2, while the reflection display section 9 is arranged differently from its counterpart of Example 5 in that it has the same liquid crystal layer thickness as the one in the transmission display section 10. Thus, to assemble the liquid crystal display of the present example, the liquid crystal display of Example 5 is re-designed optically to determine the optical of the polarization plates 14 and 15 and phase difference compensation plates 16 and 17. In the present example, the optical of the polarization plates 14 and 15 and phase difference compensation plates 16 and 17 is determined in such a manner that satisfactory reflection display can be shown.

The optical of the polarization plates 14 and 15, phase difference compensation plates 16 and 17, and the liquid crystal layer 1 (that is, the lamination orientation of the polarization plates 14 and 15, and phase difference compensation plates 16 and 17, and the alignment orientation of the liquid crystal) in the liquid crystal display of the present example is set forth in Table 4 below for ready comparison with reference to a common orientation.

The optical shown in Table 4 is the position of each optical element on the display surface when the viewer observes the display surface, and when the phase difference compensation plate 16 or 17 is composed of more than one phase difference compensation plate, each phase difference compensation plate forming the phase difference compensation plate 16 or 17 is set forth in accordance with the actual position from the viewer's side. Also, in Table 4, each orientation is expressed in degrees from the reference orientation set arbitrarily on the display surface, and the retardation of each phase difference compensation plate is expressed in nm with respect to a beam of monochrome light having the wavelength of 550 nm.

TABLE 4

|  |  |  | EXAMPLE | 4* | 5* | 9 |
|---|---|---|---|---|---|---|
| PLATE 14 |  |  | TRANSMISSION AXIS ORIENTATION (°) | 0 | 0 | 0 |
| PLATE 16 | PLATE |  | SLOW AXIS ORIENTATION (°) | 18 | 18 | 18 |
|  |  |  | RETARDATION (nm) | 270 | 270 | 127 |
|  | PLATE |  | SLOW AXIS ORIENTATION (°) | 126 | 126 | 126 |
|  |  |  | RETARDATION (nm) | 135 | 135 | 135 |
| LC LAYER 1 |  |  | SUBSTRATE 4 ALIGNMENT ORIENTATION (°) | 16 | 16 | 16 |
|  |  |  | SUBSTRATE 5 ALIGNMENT ORIENTATION (°) | 86 | 86 | 86 |
| PLATE 17 | PLATE |  | SLOW AXIS ORIENTATION (°) | 36 | 36 | −4 |
|  |  |  | RETARDATION (nm) | 135 | 135 | 260 |
|  | PLATE |  | SLOW AXIS ORIENTATION (°) | 96 | 108 | — |
|  |  |  | RETARDATION (nm) | 270 | 270 | — |
| PLATE 15 |  |  | TRANSMISSION AXIS ORIENTATION (°) | 21 | 0 | 152 |

4*: COMPARATIVE EXAMPLE 4
5*: COMPARATIVE EXAMPLE 5
PLATES 14 x 15: POLARIZATION PLATES
PLATES 16 x 17: PHASE DIFFERENCE COMPENSATION PLATES

As has been explained, in the liquid crystal display of Example and the comparative liquid crystal displays of Comparative Examples 3 through 5, a thickness (d) of the liquid crystal layer is set to 4.5 m, so that satisfactory reflection display can be shown. Thus, in Example 7 and Comparative Examples 3 through 5, the optical of the polarization plate 14 and phase difference compensation plate 16, which are responsible for the reflection display alone, is set to be suitable for the reflection display. On the other hand, the thickness of the liquid crystal layer of the transmission display section 10 is set differently from the one in its counterpart of each Example in Embodiment 2. Thus, in Example 7 and Comparative Examples 3 through 5, the optical of the phase difference compensation plate 17 and polarization plate 15 is set individually in accordance with the optical characteristics of the transmission display section 10. In other words, in Example 7 and Comparative Example 4, the liquid crystal displays which can realize the satisfactory dark display are assembled, and in Comparative Examples 3 and 5, the liquid crystal displays which can realize satisfactory light display are assembled.

In contrast, in the liquid crystal displays of Examples 8 and 9, a thickness (d) of the liquid crystal layer is set to 7.5 m, so that satisfactory transmission display can be shown. For this reason, in Examples 8 and 9, the optical of the polarization plate 14, phase difference control plates 16 and 17, and polarization plate 15 is set to be suitable for the transmission display. Thus, in Examples 8 and 9, the display characteristics of the reflection display section 9 are determined by the optical of the polarization plate 14 and phase difference compensation plate 16 whose optical is set for the transmission display.

In addition, the display characteristics of the liquid crystal displays assembled in Example 7, Comparative Example 3, Example 8, Comparative Examples 4 and 5, and Example 9 are graphed in FIGS. 11 through 15, respectively. These display characteristics were measured through the microscope in the same manner as Example 1, and in each drawing, the horizontal axis represents a root mean square value of the applied voltage, and the vertical axis represents the brightness (reflectance or transmittance). Here, the transmittance of the transmitting display section 10 when the polarization plates 14 and 15 are not provided is scaled as 100%, and the reflectance of the reflection display section 9 before the polarization plate 14 is provided is scaled as 100%.

Figure 11:
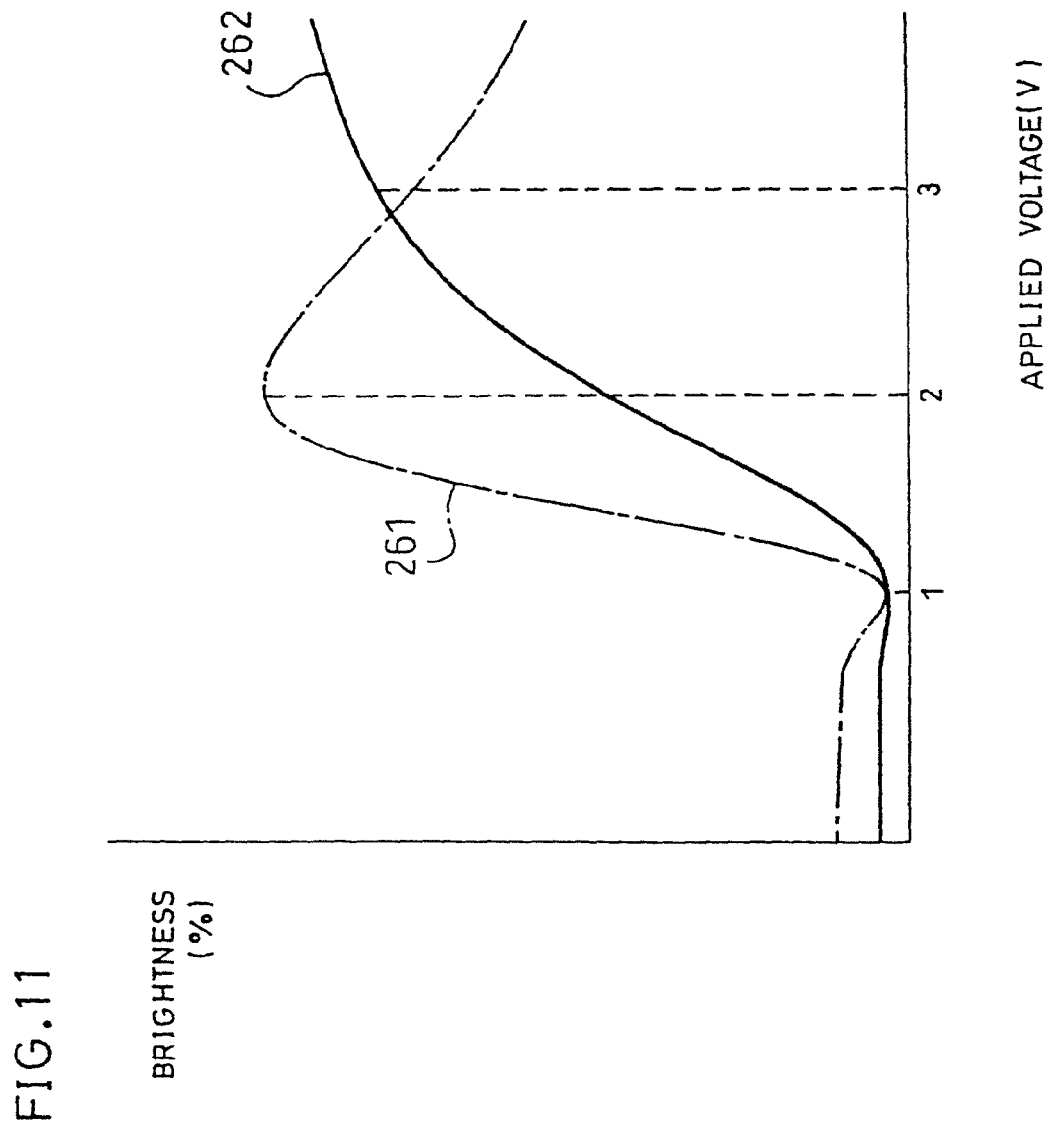
FIG. 11 is a view showing display characteristics of a liquid crystal display of Example 7.

In FIG. 11, a curve 261 represents the voltage dependence of the reflectance of the reflection display section 9 versus a voltage across the electrodes 6 and 7, and a curve 262 represents the voltage dependence of the transmittance of the transmission display section 10 versus a voltage across the electrodes 6 and 7 in the liquid crystal display assembled in Example 7.

FIG. 11 reveals that, in Example 7, while the applied voltage is in a range between 1V and 3V, the transmittance increases with an increasing applied voltage. On the other hand, the reflectance increases with an increasing applied voltage while the applied voltage is in a range between 1V and 2V, and decreases with an increasing applied voltage after the applied voltage exceeds 2V. That is, when the applied voltage is 1V, the reflectance of the reflection display section 9 and the transmittance of the transmission display section 10 are both 3%. When the applied voltage is increased to 2V, both increase to 40% and 18%, respectively, and when the applied voltage is increased further to 3V, the reflectance of the reflection display section 9 decreases to 28%, while the transmittance of the transmission display section increases further to 33%.

Figure 12:
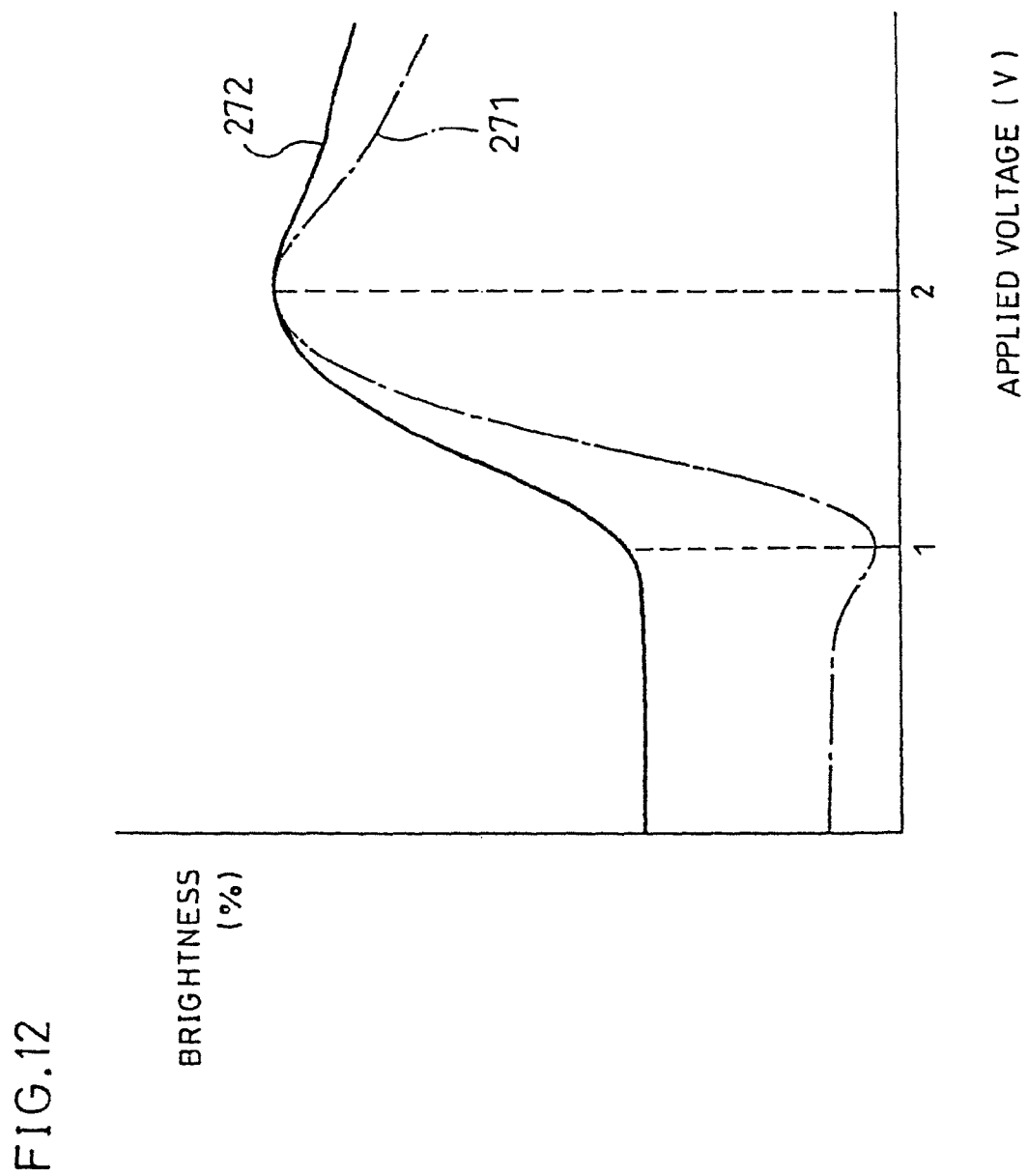
FIG. 12 is a view showing display characteristics of a liquid crystal display of Comparative Example 3.

In FIG. 12, a curve 271 represents the voltage dependence of the reflectance of the reflection display section 9 versus a voltage across the electrodes 6 and 7, and a curve 272 represents the voltage dependence of the transmittance of the transmission display section 10 versus a voltage across the electrodes 6 and 7 in the liquid crystal display assembled in Comparative Example 3.

FIG. 12 reveals that, in Comparative Example 3, while the applied voltage is in a range between 1V and 2V, both the reflectance and transmittance increase with an increasing applied voltage. That is, when the applied voltage is 1V, the reflectance of the reflection display section 9 and the transmittance of the transmission display section 10 are 3% and 18%, respectively, and when the applied voltage is increased to 2V, both increase to 40%.

Figure 13:
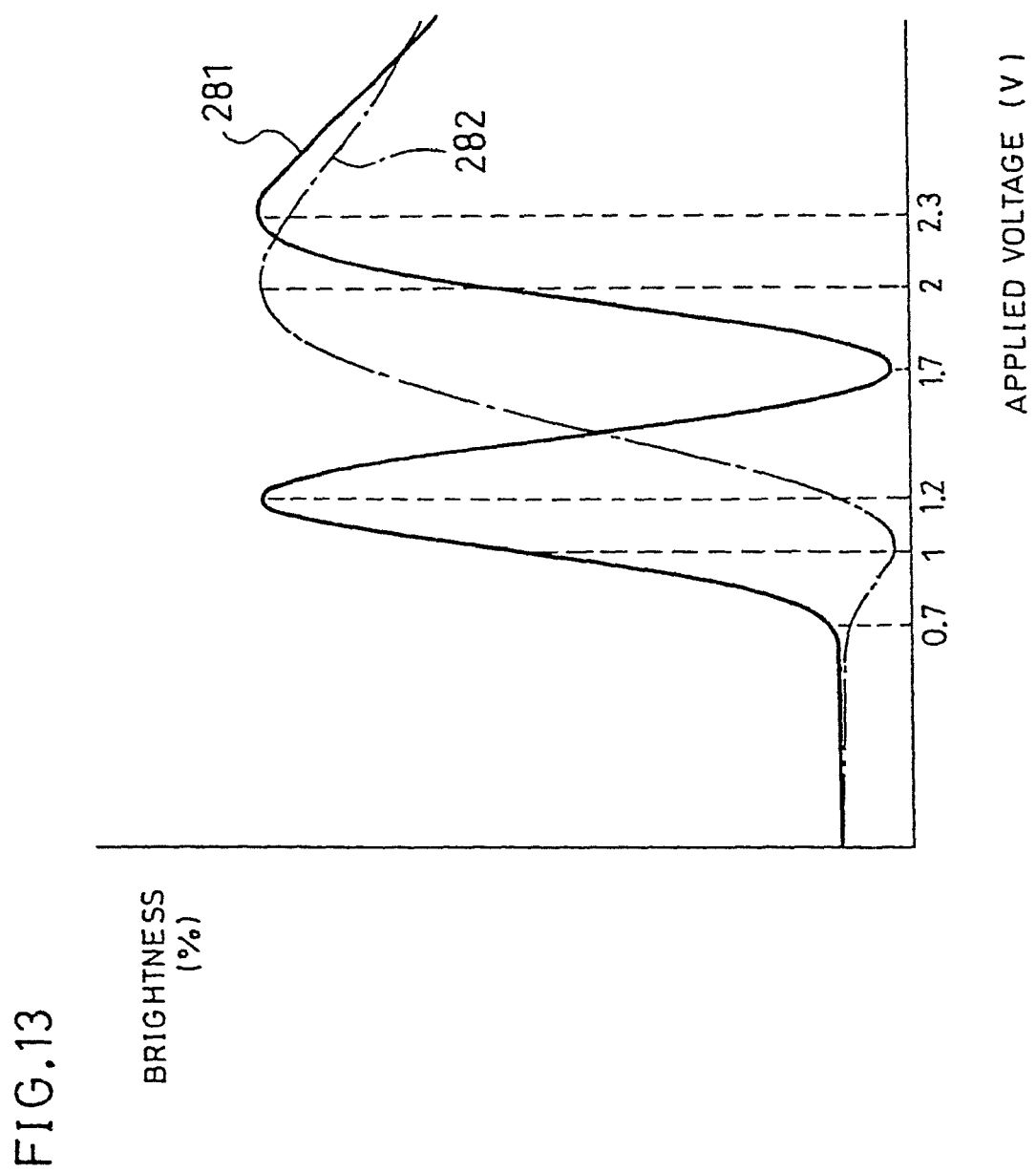
FIG. 13 is a view showing display characteristics of a liquid crystal display of Example 8.

In FIG. 13, a curve 281 represents the voltage dependence of the reflectance of the reflection display section 9 versus a voltage across the electrodes 6 and 7, and a curve 282 represents the voltage dependence of the transmittance of the transmission display section 10 versus a voltage across the electrodes 6 and 7 in the liquid crystal display assembled in Example 8.

FIG. 13 reveals that, in Example 8, while the applied voltage is in a range between 1V and 2V, the transmittance increases with an increasing applied voltage. On the other hand, the reflectance increases with an increasing applied voltage when the applied voltage is in a range between 0.7V and 1.2V, decreases with an increasing applied voltage when the applied voltage is in a range between 1.2V and 1.7V, and increases again with an increasing applied voltage when the applied voltage is in a range between 1.7V and 2.3V. That is, when the applied voltage is 1V, the reflectance of the reflection display section 9 and the transmittance of the transmission display section 10 are 24% and 3%, respectively. When the applied voltage is increased to 1.2V, the reflectance of the reflection display section 9 increases to 40%. When the applied voltage is further increased to 1.7V, the reflectance of the reflection display section 9 decreases to 3%. When the applied voltage is further increased to 2V, both the reflectance of the reflection display section 9 and the transmittance of the transmission display section 10 increase to 27% and 39%, respectively.

Figure 14:
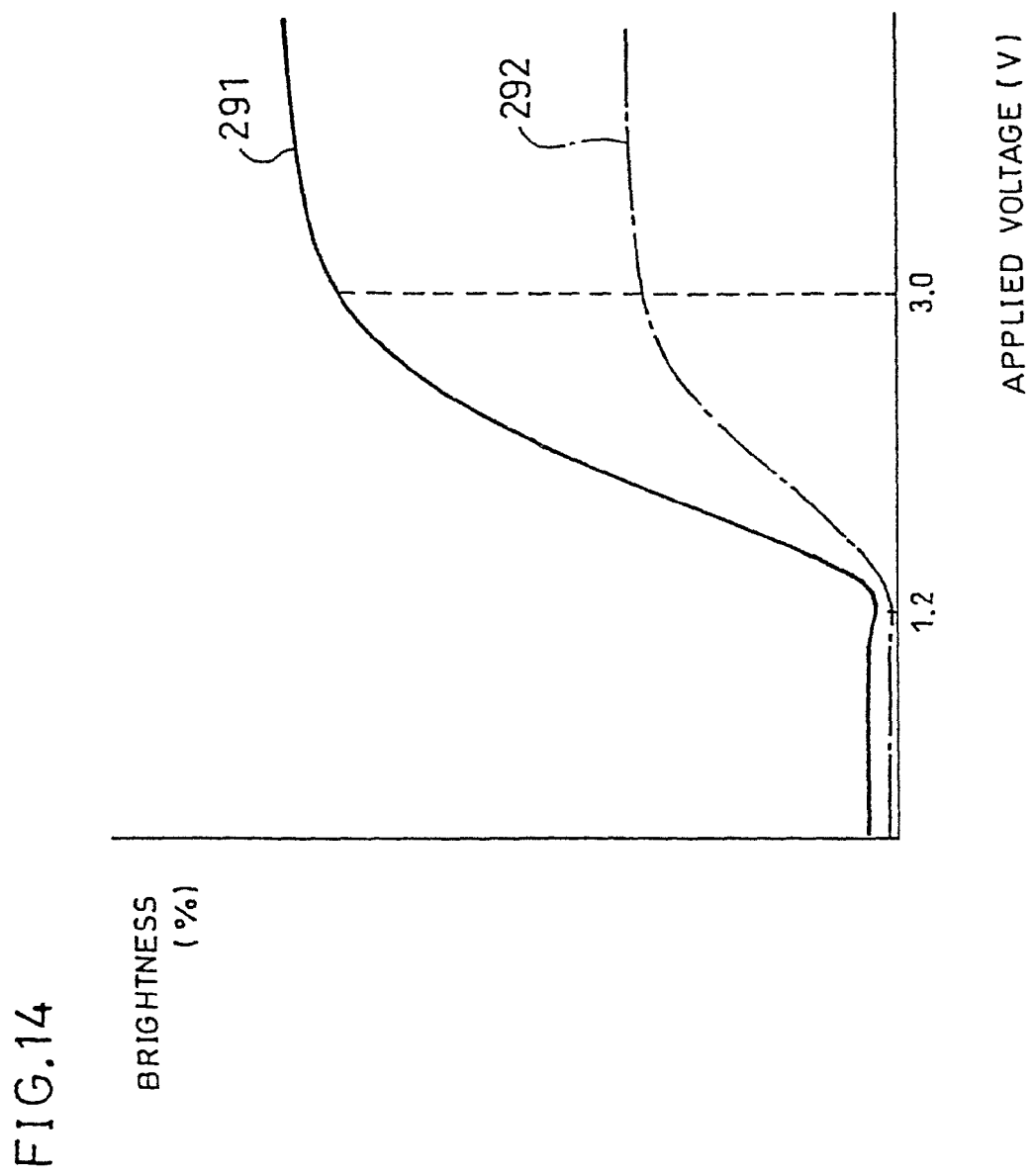
FIG. 14 is a view showing display characteristics of a liquid crystal display of Comparative Example 4.

In FIG. 14, a curve 291 represents the voltage dependence of the reflectance of the reflection display section 9 versus a voltage across the electrodes 6 and 7, and a curve 292 represents the voltage dependence of the transmittance of the transmission display section 10 versus a voltage across the electrodes 6 and 7 in the liquid crystal display assembled in Comparative Example 4.

FIG. 14 reveals that, in Comparative Example 4, while the applied voltage is in a range between 1.2V and 3V, both the reflectance and transmittance increase with an increasing applied voltage. That is, when the applied voltage is 1.2V, the reflectance of the reflection display section 9 and the transmittance of the transmission display section 10 are 3% and 1%, respectively, and when the applied voltage is increased to 3V, both increase to 36% and 16%, respectively.

Figure 15:
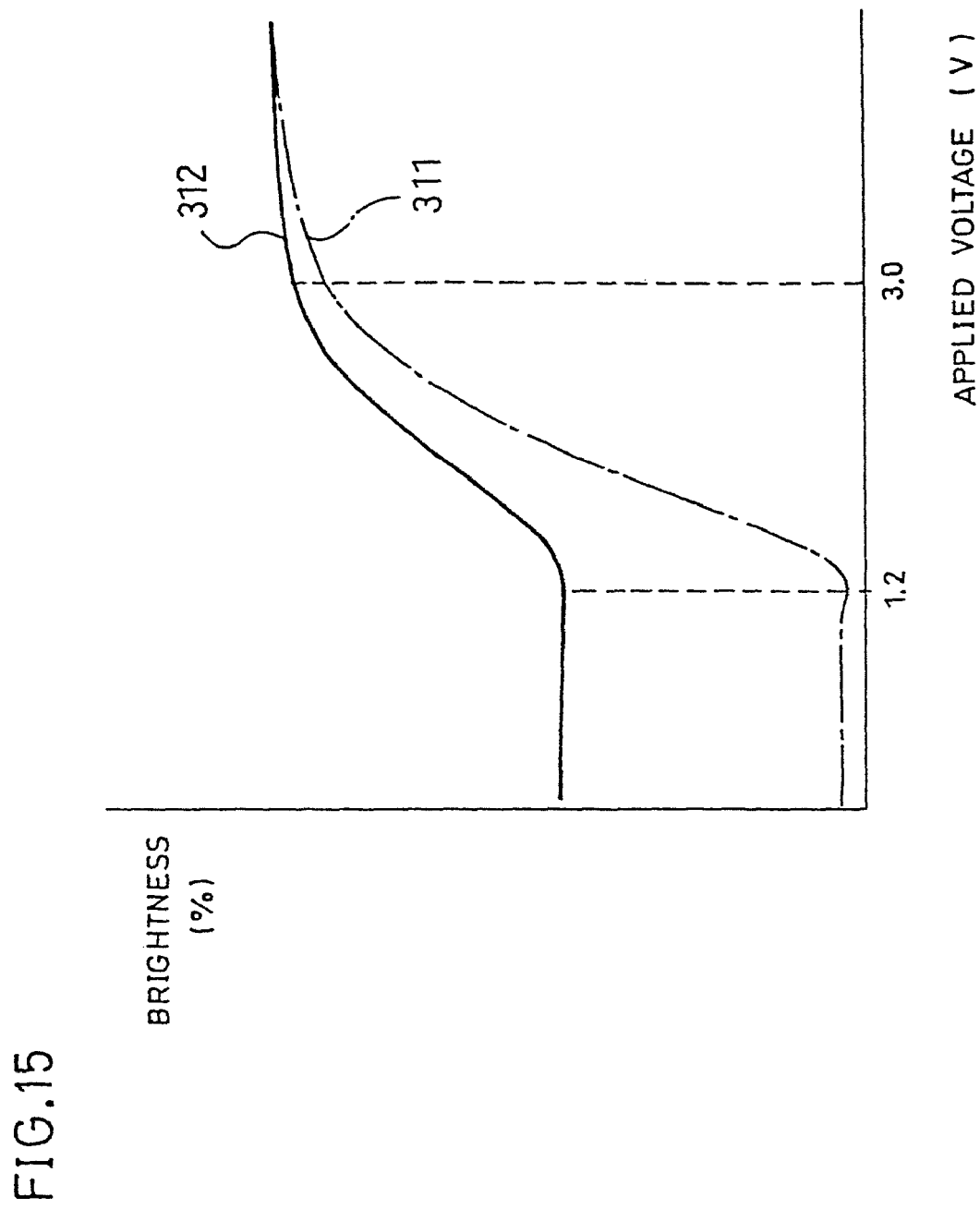
FIG. 15 is a view showing display characteristics of a liquid crystal display of Comparative Example 5.

In FIG. 15, a curve 311 represents the voltage dependence of the reflectance of the reflection display section 9 versus a voltage across the electrodes 6 and 7, and a curve 312 represents the voltage dependence of the transmittance of the transmission display section 10 versus a voltage across the electrodes 6 and 7 in the liquid crystal display assembled in Comparative Example 5.

FIG. 15 reveals that, in Comparative Example 5, while the applied voltage is in a range between 1.2V and 3V, both the reflectance and transmittance increase with an increasing applied voltage. That is, when the applied voltage is 1.2V, the reflectance of the reflection display section 9 and the transmittance of the transmission display section 10 are 3% and 21%, respectively, and when the applied voltage is increased to 3V, both increase to 39% and 35%, respectively.

Figure 16:
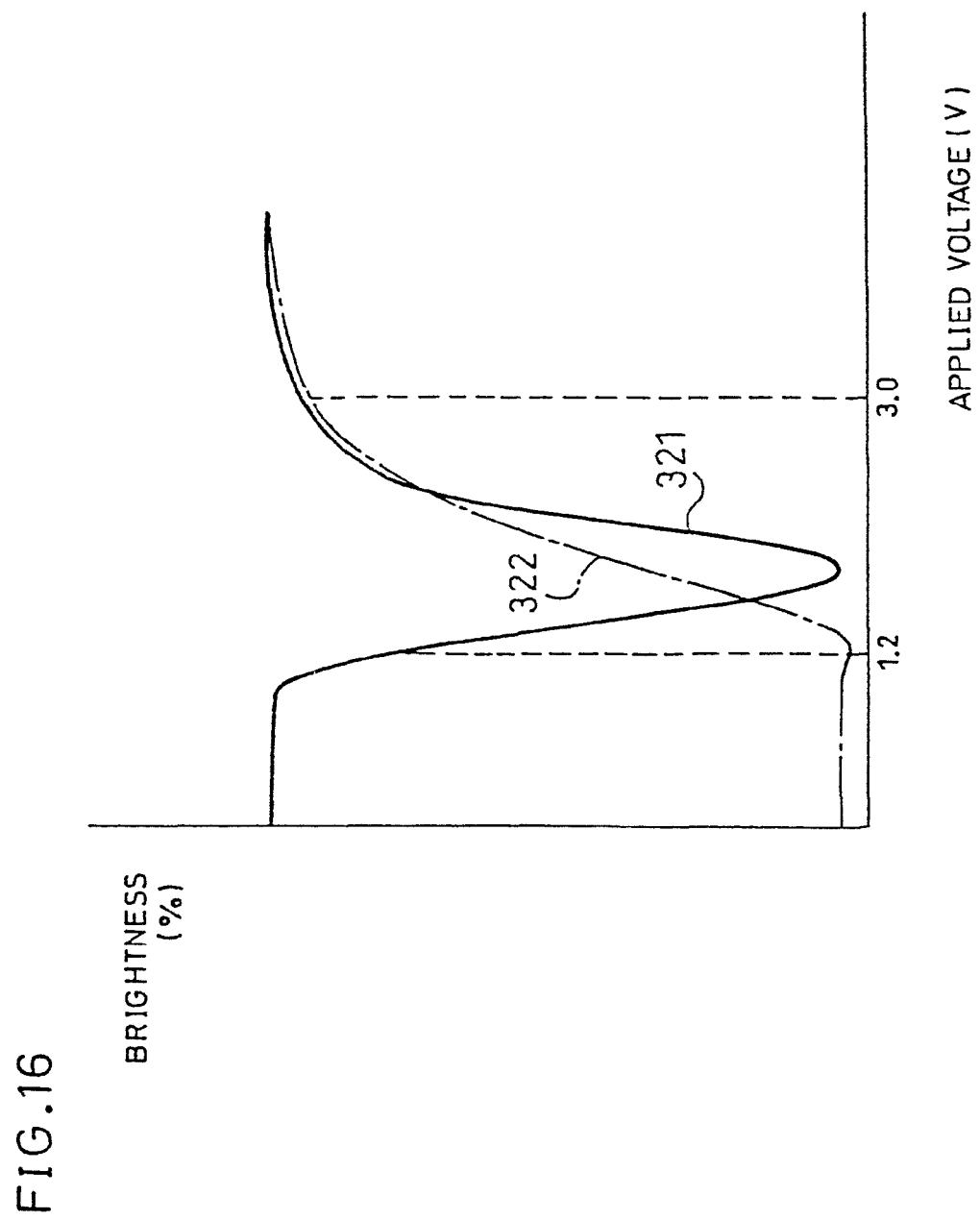
FIG. 16 is a view showing display characteristics of a liquid crystal display of Example 9.

In FIG. 16, a curve 321 represents the voltage dependence of the reflectance of the reflection display section 9 versus a voltage across the electrodes 6 and 7, and a curve 322 represents the voltage dependence of the transmittance of the transmission display section 10 versus a voltage across the electrodes 6 and 7 in the liquid crystal display assembled in Example 9.

FIG. 16 reveals that, in Example 9, while the applied voltage is in a range between 1.2V and 3V, the transmittance increases with an increasing applied voltage. On the other hand, when the applied voltage is in a range between 0.9 and 1.7V, the reflectance decreases with an increasing applied voltage, and then increases with an increasing applied voltage. That is, when the applied voltage is 1.2V, the reflectance of the reflection display section 9 and the transmittance of the transmission display section 10 are 7% and 32%, respectively, and when the applied voltage is increased to 1.7V, the reflectance of the reflection display section 9 decreases to 3%, and when the applied voltage is further increased to 3V, both the reflectance of the reflection display section 9 and the transmittance of the transmission display section 10 increase to 37% and 36%, respectively.

The above Examples and Comparative Examples discussed a liquid crystal display exploiting the change in the polarization state caused by the polarization converting function of the liquid crystal layer 1, such as retardation and optical rotatory polarization, provided with the polarization plates 14 and 15, and having equal thicknesses of the liquid crystal layer 1 in the reflection display section 9 and transmission display section 10. In this case, when the same voltage is applied to the respective electrodes 7 of the reflection display section 9 and transmission display 10 (when the reflection display section 9 and transmission display section 10 are driven by the same voltage), if, as in Example 7 and Comparative Examples 3 through 5, a voltage which can attain satisfactory brightness and contrast ratio for the light display in the reflection display section 9 is applied, the brightness and contrast ratio for the light display in the transmission display section 10 are not satisfactory, and if, as in Example 7 and Comparative Examples 3 through 5, a voltage which can attain satisfactory brightness and contrast ratio for the light display in the transmission display section 10 is applied, the brightness in the reflection display section 9 and the brightness in the transmission display section 10 do not change in the same manner, thereby making satisfactory display impossible.

However, the liquid crystal displays of Examples 7 through 9 can solve the above problem and show satisfactory display by applying different voltages to the respective electrodes 7 in the reflection display section 9 and transmission display section 10 (by driving the reflection display section 9 and transmission display section 10 using different respective voltages).

In other words, any of the liquid crystal displays of Examples 7 through 9 can attain satisfactory brightness and contrast ratio for the light display both in the reflection display section 9 and transmission display section 10 by applying different respective voltages to the electrode 7 of the transmission display section 10 and the electrode 7 of the reflection display section 9. At the same time, the reflection display section 9 and transmission display section 10 can show the same display state, that is, either the light or dark display, thereby realizing the display with excellent visibility.

It is understood from the comparison of the present embodiment and Embodiment 2 that it is effective to make the liquid crystal layer 1 thicker in the transmission display section 10 than in the reflection display section 9 to attain the satisfactory brightness and contrast ratio for the light display both in the reflection display section 9 and transmission display section 10 of the liquid crystal display using the polarization converting function, such as the retardation and optical rotatory polarization of the liquid crystal layer 1, with the use of the polarization plates 14 and 15.

In the liquid crystal display mode adopted in each example of the present embodiment and Embodiment 2, the director configuration of the liquid crystal when no voltage is applied is parallel to the plane surface direction of the display surface. It should be appreciated that, however, other modes, such as vertical alignment mode and hybrid alignment mode, are also applicable by using the liquid crystal materials of different kinds from those disclosed in the above examples or using the alignment film having different properties from those of the alignment film disclosed above.

Further, it should be appreciated that satisfactory optical characteristics can be attained by the present invention using any liquid crystal display mode which exploits the retardation or optical rotatory polarization of the liquid crystal layer 1, provided that, in the display mode used, the thickness of the liquid crystal layer affects the optical characteristics, and that a liquid crystal layer thickness which is thinner in the reflection display section 9 than in the transmission display section 10 is suitable for the display mode used.

Furthermore, it is understood that the liquid crystal displays of Examples 4 and 7 through 9 can show the satisfactory display when supplied with different voltages to the reflection display section 9 and transmission display section 10 by means of the electrodes 6 and 7 (alignment mechanism). In this case, the liquid crystal displays of Examples 4 and 7 can show satisfactory display when a sufficiently high voltage is applied to the transmission display section 10. Also, the liquid crystal displays of Examples 8 and 9 can show satisfactory display by adjusting the voltage at the reflection display section 9. Thus, according to the present embodiment and Embodiment 2, satisfactory display can be shown by producing the liquid crystal cell beforehand in such a manner that different voltages can be applied to the reflection display section 9 and transmission display section 10, besides by changing the thickness of the liquid crystal layer in the reflection display section 9 and transmission display section 10.

Embodiment 4

Explained in the present embodiment is a liquid crystal display which can realize satisfactory reflection display and transmission display by providing different director configurations of the liquid crystal in the reflection display section and transmission display section by changing the alignment treatment orientation (rubbing orientation) on the substrate, which is a factor that determines the director configuration of the liquid crystal, that is, the alignment treatment orientation of the alignment film provided to each electrode substrate in the reflection display section and transmission display section.

In the present embodiment, a so-called rubbing method is adopted to align the liquid crystal layer uniformly. In the present embodiment, at least two different director configurations of the liquid crystal can be realized by covering the surface of the alignment film with the photoresist or the like before subjecting the alignment film to the rubbing treatment, so that the alignment film provided to each electrode substrate can be given different respective alignment treatment orientations in the reflection display section and transmission display section. According to the above method, the director configuration of the liquid crystal suitable for the reflection display and the director configuration of the liquid crystal suitable for the transmission display can be realized at the same time, thereby realizing satisfactory reflection display and transmission display.

In the following, the liquid crystal display of the present embodiment will be explained in detail, and hereinafter, like components are labeled with like reference numerals with respect to Embodiments 1 through 3, and, for ease of explanation, the description of these components is not repeated here.

Figure 17:
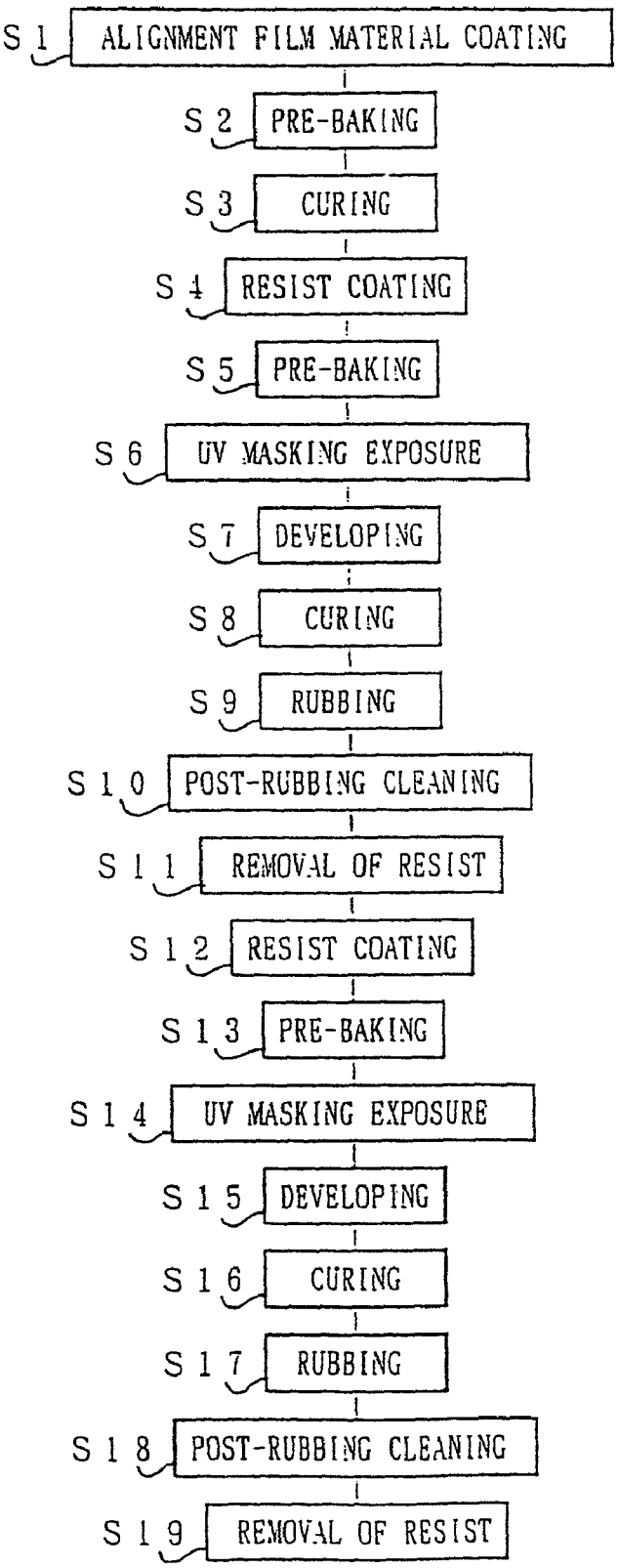
FIG. 17 is a view showing the steps of the alignment treatment applied to the substrates used for a liquid crystal display in accordance with Embodiment 4 of the present invention.
Figure 18A:
FIGS. 18(a) through 18(e) are cross sections schematically showing the alignment treatment steps of FIG. 17.
Figure 18B:
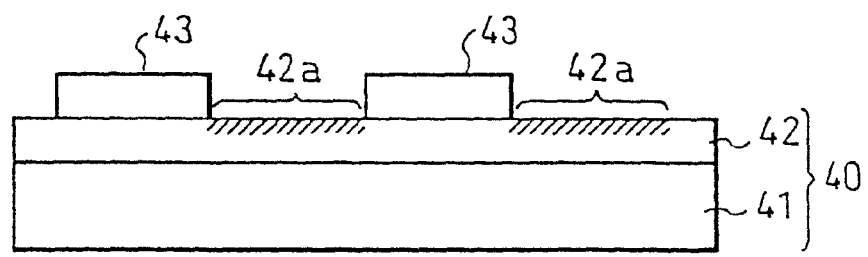
Figure 18C:
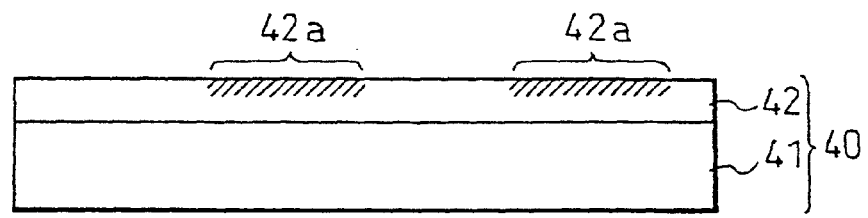
Figure 18D:
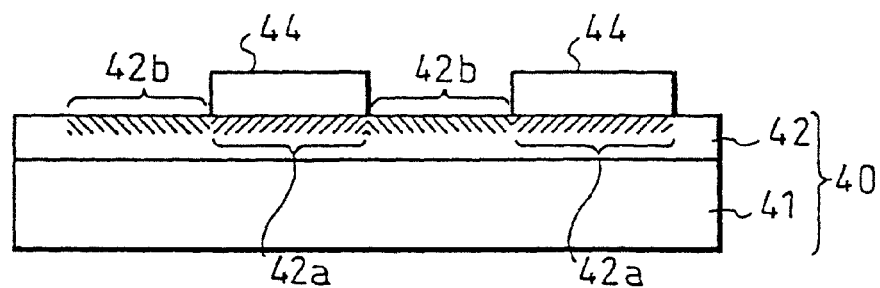
Figure 18E:
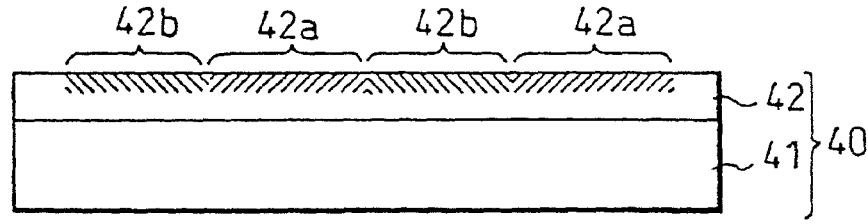

In the first place, the process of alignment treatment of the substrate (electrode substrate 40) used in the liquid crystal display of the present embodiment will be explained with reference to FIGS. 17 and 18(*a*) through 18(*e*).

As shown in FIG. 18(*a*), an alignment film material is applied over a substrate 41 (equivalent to the substrate 4 on which is formed the electrode 6 or the substrate 5 on which are formed the electrodes 7) of the liquid crystal cell on the surface thereof touching the liquid crystal layer 1 (S1). Then, the alignment film material is pre-baked (S2) and cured (S3), whereby an alignment film 42 (equivalent to the alignment film 2 or 3) is formed over the substrate 41 on the surface thereof touching the liquid crystal layer 1.

Then, the alignment film 42 is subjected to the rubbing treatment, and as a consequence, the alignment treatment is applied to the electrode substrate 40 which includes the alignment film 42 at the interface with the liquid crystal layer 1 of the substrate 41. Here, in the present embodiment, as shown in FIG. 18(*b*), screening is carried out by a screen resist 43 for the rubbing treatment, so that the rubbing treatment is applied partially. In this case, a resist material for the screen for the rubbing treatment is applied over the alignment film 42 (S4). Then, the resist material is pre-baked (S5), exposed to UV rays with masking to expose portions (first alignment treatment regions 42*a*) of the alignment film 42 (S6), developed (S7), and cured (S8), after which the rubbing treatment is applied to the first alignment treatment regions 42*a* (S9). Then, after the rubbing treated electrode substrate 40 is cleaned (S10), the resist 43 is removed as shown in FIG. 18(*c*) (S11).

Subsequently, to realize an director configuration of the liquid crystal different from the director configuration of the liquid crystal on the first alignment treatment regions 42*a*, as shown in FIG. 18(*d*), rubbed portions (first alignment treatment regions 42*a*) are protected by a screen resist 44 for the rubbing treatment, and the rubbing treatment is applied to portions which have not been rubbed. To be more specific, a resist material of the screen for the rubbing treatment is applied over the alignment film 42 from which the resist 43 was removed (S12). Then, the resist material is pre-baked (S13), exposed to UV rays with masking in such a manner that portions (second alignment treatment regions 42*b*) other than the first alignment treatment regions 42*a* on the alignment film 42 are exposed (S14), developed (S15), and cured (S16). Subsequently, the second alignment treatment regions 42*b* are subjected to the rubbing treatment in such a manner that the treatment orientations are different in the first and second alignment treatment regions 42*a* and 42*b* (S17). Then, after the rubbing treated electrode substrate 40 is cleaned (S18), the resist 44 is removed as shown in FIG. 18(*e*) (S19). Consequently, the alignment film 42 (alignment mechanism), to which the alignment treatment has been applied twice in different orientations, is obtained.

As has been explained, in the present embodiment, the alignment treatment is applied at least twice with the patterning by means of the resist. Here, at least two different director configurations of the liquid crystal (for example, various kinds of planer alignments having their respective aligning directions) can be obtained by changing the treatment orientation for each alignment treatment (in the above explanation, the alignment treatment is effected in two different orientations by applying the alignment treatment twice). If the alignment treatment orientation is changed on at least one of the substrates (electrode substrates) in the above manner, the alignments are provided to the reflection display section 9 and transmission display section 10 independently, thereby making it possible to realize satisfactory display.

Next, a liquid crystal display having different director configurations of the liquid crystal in the reflection display section 9 and transmission display section 10 and using the polarization plates 14 and 15 will be explained by way of examples for purposes of explanation only, without any intention as a definition of the limits of the invention.

EXAMPLE 10

In the present example, a liquid crystal display is assembled in the same manner as Comparative Example 5. To be more specific, a liquid crystal cell for filling, including the liquid crystal layer having a thickness (d) (cell gap) of 4.5 m both in the reflection display section 9 and transmission display section 10, is produced in the same manner as Example 1 except that the insulation film 11 made of the insulation photosensitive resin is not formed on the substrate 5, and that, as shown in FIG. 4, the electrode pattern is formed in such a manner that the electrode 7 of the reflection display section 9 and the electrode 7 of the transmission display section 10 are electrically isolated, so that a voltage is applied to each separately from outside the liquid crystal cell. Then, the phase difference compensation plates 16 and 17 and polarization plates 14 and 15 are laminated to the outside of the respective electrode substrates of the above liquid crystal cell. Here, each of the phase difference compensation plates 16 and 17 is composed of two phase difference compensation plates.

In the present example, the alignment film 3 is subjected to the rubbing treatment in different orientations in the same manner as shown in FIGS. 17 and 18(a) through 18(e). To be more specific, in the present example, the alignment film 2 on the substrate 4 side is rubbed in the same orientation both in the reflection display section 9 and transmission display section 10, whereas the alignment film 3 (alignment mechanism) on the substrate 5 side is rubbed in such a manner the alignment orientations of the liquid crystal are different in the reflection display section 9 and transmission display section 10.

liquid crystal (twist angle) is 70, and in the transmission display section 10, n d of the liquid crystal layer 1 is approximately 270 nm and the angle of twist of the liquid crystal (twist angle) is 0. Thus, the liquid crystal display assembled in the above manner can show satisfactory display both in the reflection display section 9 and transmission display section 10 while having the liquid crystal layer 1 provided continuously across the reflection display section 9 and transmission display section 10 without changing the cell gap.

The optical of the polarization plates 14 and 15, phase difference compensation plates 16 and 17, and the liquid crystal layer 1 (that is, the lamination orientation of the polarization plates 14 and 15, and phase difference compensation plates 16 and 17, and the alignment orientation of the liquid crystal) in the reflection display section 9 and transmission display section 10 in the liquid crystal display of the present example is set forth in Table 5 below for ready comparison with reference to a common orientation.

The optical shown in Table 5 is the position of each optical element on the display surface when the viewer observes the display surface, and when the phase difference compensation plate 16 or 17 is composed of more than one phase difference compensation plate, each phase difference compensation plate forming the phase difference compensation plate 16 or 17 is set forth in accordance with the actual position from the viewer's side. Also, in Table 5, each orientation is expressed in degrees from the reference orientation set arbitrarily on the display surface, and the retardation of each phase difference compensation plate is expressed in nm with respect to a beam of monochrome light having the wavelength of 550 nm.

TABLE 5

|  |  |  | EXAMPLE 10 | |
|---|---|---|---|---|
|  |  |  | SEC. 9 | SEC. 10 |
| PLATE 14 |  | TRANSMISSION AXIS ORIENTATION (°) | 0 | |
| PLATE 16 | PLATE | SLOW AXIS ORIENTATION (°) | 15 | |
|  |  | RETARDATION (nm) | 270 | |
|  | PLATE | SLOW AXIS ORIENTATION (°) | 75 | |
|  |  | RETARDATION (nm) | 135 | |
| LC LAYER 1 |  | SUBSTRATE 4 ALIGNMENT ORIENTATION (°) | −15 | −15 |
|  |  | SUBSTRATE 5 ALIGNMENT ORIENTATION (°) | 55 | −15 |
| PLATE 17 | PLATE | SLOW AXIS ORIENTATION (°) | −15 | |
|  |  | RETARDATION (nm) | 115 | |
|  | PLATE | SLOW AXIS ORIENTATION (°) | −75 | |
|  |  | RETARDATION (nm) | 270 | |
| PLATE 15 |  | TRANSMISSION AXIS ORIENTATION (°) | 90 | |

SEC. 9: SECTION 9
SEC. 10: SECTION 10
PLATES 14 × 15: POLARIZATION PLATES
PLATES 16 × 17: PHASE DIFFERENCE COMPENSATION PLATES

In the present example, the reflection display section 9 adopts a liquid crystal display mode, in which the liquid crystal is aligned in parallel with the display surface (parallel to the substrates 4 and 5) with a twist, and the transmission display section 10 adopts a liquid crystal display mode, in which the liquid crystal is aligned in parallel with the display surface (parallel to the substrates 4 and 5) without twist.

Also, in the present example, the liquid crystal display is assembled in such a manner that, in the reflection display section 9, nd of the liquid crystal layer 1 is approximately 270 nm and the angle of twist of the director configuration of the Next, the operation of each optical element in the present embodiment will be explained in the following.

First, a case where no voltage is applied to the liquid crystal layer 1 will be explained. In this case, the liquid crystal in the liquid crystal layer 1 is aligned along the alignment of the interface of the substrate touching the liquid crystal layer 1, that is, the alignment treatment orientation of the alignment films 2 and 3 provided on their respective electrode substrates. For example, when the chiral dopant is not added to the liquid crystal composition in the liquid crystal display of Example 10, the liquid crystal is twisted 70 to the left in the reflection display section 9, and 0, that is, not twisted, in the transmission display section 10.

For this reason, if no voltage is applied to the liquid crystal layer 1, given 270 nm as n d of the liquid crystal layer 1, circularly polarized light entering the liquid crystal layer 1 is converted to linearly polarized light before it exits from the reflection display section 9. Thus, light entering the liquid crystal layer 1 from the polarization plate 14 side is converted to circularly polarized light by the phase different compensation plate 16, then converted to linearly polarized light by the liquid crystal layer 1, which exits from the liquid crystal layer 1 and reaches the reflection film 8. If the linearly polarized light is reflected by the reflection film 8, the reflected light is converted again into the transmission components of the polarization plate 14. Consequently, in the above liquid crystal display, the reflection display section 9 shows light display when no voltage is applied to the liquid crystal layer 1.

On the other hand, if no voltage is applied to the liquid layer 1, given 250 nm-270 nm as n d of the liquid crystal layer 1, the liquid crystal layer 1 functions as the ½ wavelength plate in the transmission display section 10. To be more specific, circularly polarized light entering the liquid crystal layer 1 is converted to another circularly polarized light that is orthogonal to the incident circularly polarized light at right angles. For example, if the incident circularly polarized light is right, then it is converted to left circularly polarized light, and if the incident circularly polarized is left, then it is converted to right circularly polarized light. In the transmission display section 10, the incident light passes through the polarization plate 15, and enters the liquid crystal layer 1 after it is converted to circularly polarized light by the phase difference compensation plate 17. In Example 10, substantially left circularly polarized light enters the liquid crystal layer 1 from the phase difference compensation plate 17, and is converted to right circularly polarized light. Here, right circularly polarized light is converted to linearly polarized light along the transmission axis direction of the polarization plate 14 by the phase difference compensation plate 16, while left circularly polarized light is converted to linearly polarized light along the absorption axis direction of the polarization plate 14. Thus, the transmission display section 10 of the above liquid crystal display shows light display when no voltage is applied to the liquid crystal layer 1.

Next, a case where a voltage is applied to the liquid crystal layer 1 will be explained. While a voltage is applied to the liquid crystal layer 1, the liquid crystal in the liquid crystal layer 1 is aligned perpendicular to the substrates 4 and 5 in response to the applied voltage in both the reflection display section 9 and transmission display section 10, whereby the above polarization converting function becomes less effective. In other words, the incident circularly polarized light from the phase difference compensation plates 16 and 17 passes through the liquid crystal layer 1 directly. Consequently, both the reflection display section 9 and transmission display section 10 show the dark display.

In Example 10, the phase difference compensation plate 17 is composed of a phase difference compensation plate having the retardation of 115 nm. It is preferable that the phase difference compensation plate 17 has the retardation of about 135 nm to realize satisfactory circularly polarized light by the phase difference compensation plate 17 alone. However, the retardation of the liquid crystal layer 1 in the transmission display section 10 is not lost completely at a practical voltage level, and in consideration of this fact, the retardation of the phase difference compensation plate 17 is set in such a manner as to obtain satisfactory contrast.

The phase difference compensation plate 16 is furnished with a function of converting light entering the liquid crystal layer 1 in the reflection display section 9 into circularly polarized light with a wavelength in a broad range. In the above liquid crystal display, the liquid crystal layer 1 in the reflection display section 9 is twisted 70, and n d thereof is set to 270 nm. Thus, circularly polarized light enters the liquid crystal layer 1 in the reflection display section 9, and is converted to linearly polarized light by the liquid crystal layer 1 while it passes through the same and reaches the reflection film 8. Then, the linearly polarized light having reached the reflection film 8 is reflected on the mirror surface thereof, and passes through each optical element in the reversed order. Consequently, the reflected light is converted to linearly polarized light having an oscillating electric field along the transmission axis orientation of the polarization plate 14. Hence, the reflection display section 9 shows the light display.

Here, the liquid crystal composition used herein is blended with the chiral dopant for imparting a natural twist to the left to the director configuration of the liquid crystal. The chiral dopant changes the natural helical pitch of the liquid crystal composition depending on its concentration in the liquid crystal composition. Thus, by exploiting the fact that the lowest voltage at which the director configuration of the liquid crystal starts to change varies with the helical pitch, the voltage dependencies of the brightness in the reflection display section 9 and transmission display section 10 can be matched if the helical pitch is adjusted adequately.

Figure 19:
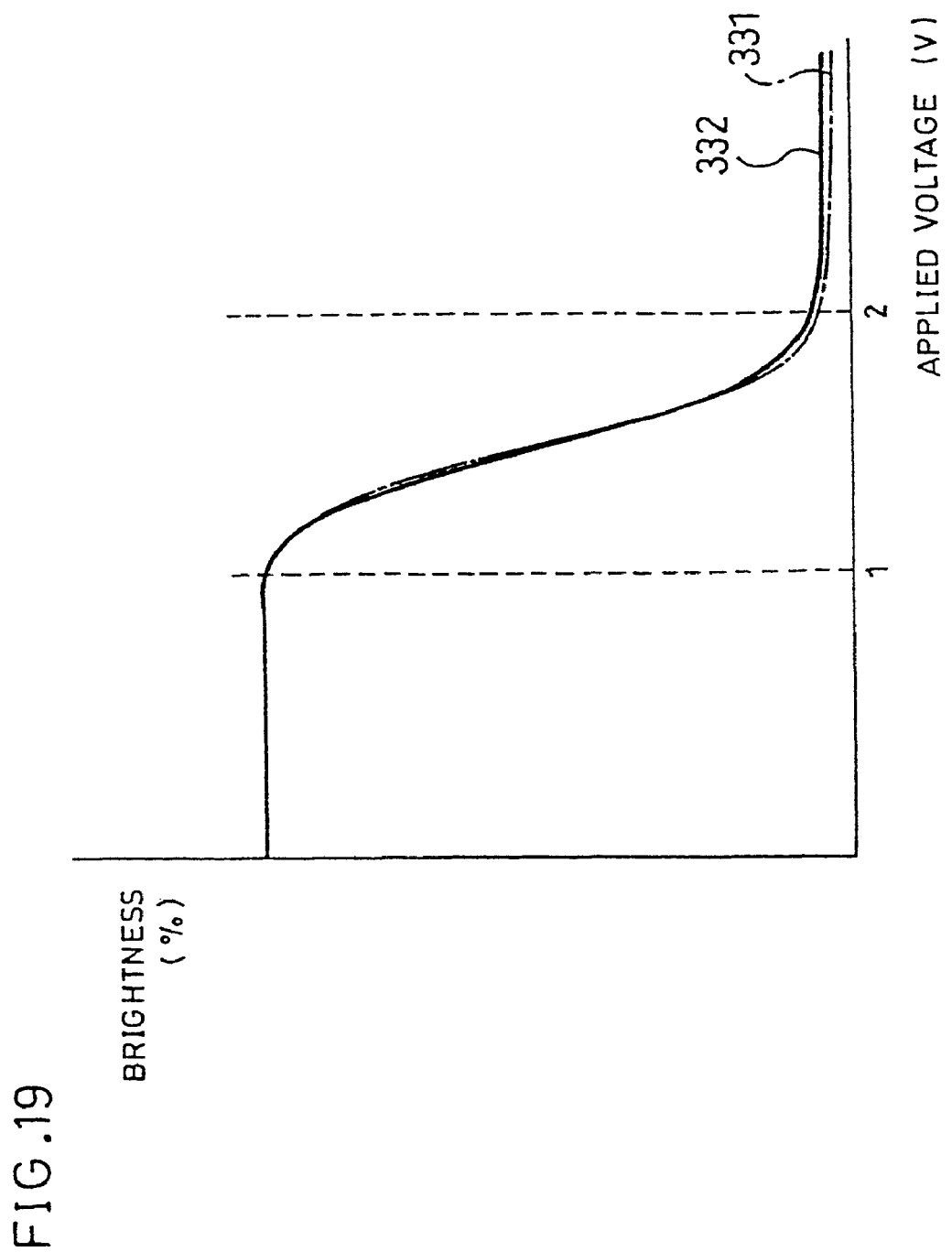
FIG. 19 is a view showing display characteristics of a liquid crystal display of Example 10.

The display characteristics of the liquid crystal display of Example 10 assembled in the above manner are graphed in FIG. 19. The display characteristics of FIG. 19 were measured in the same manner as Example 1, and in the drawing, the horizontal axis represents a root mean square value of the applied voltage and the vertical axis represents the brightness (reflectance or transmittance).

In FIG. 19, a curve 331 indicates the voltage dependence of the reflectance of the reflection display section 9, and a curve 332 indicates the voltage dependence of the transmittance of the transmission display section 10 in the liquid crystal display of Example 10.

As can be understood from FIG. 19, the liquid crystal display of Example 10 shows the light display when no voltage is applied, and it can realize the display in the so-called normally white (NW) mode, in which both the reflectance and transmittance decrease with an increasing applied voltage. In the present liquid crystal display, not only can the contrast ratio be set to substantially the same value in the reflection display section 9 and transmission display section 10, but also the reflection display section 9 and transmission display section 10 can show either the dark or light display simultaneously, thereby realizing the display with excellent visibility.

As has been explained, setting different twist angles of the liquid crystal layer 1 in the reflection display section 9 and transmission display section 10 as the means for changing the director configuration of the liquid crystal in the reflection display section 9 and transmission display section 10 is effective to realize satisfactory display both in the reflection display section 9 and transmission display section 10.

In Example 10, to change the twist angle of the liquid crystal layer 1 in the reflecting display section 9 and transmission display section 10, the rubbing treatment is applied in different orientations in the reflecting display section 9 and transmission display section 10, so that the director configuration of the liquid crystal layer 1 is twisted in the reflection display section 9 but not in the transmission display section 10. However, means for changing the twist angle of the liquid crystal layer 1 in the reflection display section 9 and transmission display section 10 is not especially limited.

For example, besides the above combination, the following combinations are applicable: (1) the director configuration of the liquid crystal layer 1 is twisted in both the reflecting display section 9 and transmission display section 10, but the twist angles or the orientations of the twist are different; (2) the director configuration of the liquid crystal layer 1 is twisted in the transmission display section 10 but not in the reflection display section 9; (3) the tilts (so-called pre-tilts) of the liquid crystal with respect to the substrates 4 and 5 are different in the reflection display section 9 and transmission display section 10; (4) the change of the director configuration of the liquid crystal at the substrate interface is combined with other means of the present invention; (5) different cell gaps are provided to the reflection display section 9 and transmission display section 10; and (6) different electric fields are generated in the reflection display section 9 and transmission display section 10.

Embodiment 5

In each example of Embodiments 2 through 4, the arrangement for realizing satisfactory reflection display and transmission display on the liquid crystal display using the liquid crystal aligned in parallel with the substrates was explained. In the present embodiment, a liquid crystal display whose alignment orientation of the liquid crystal is perpendicular to the substrates, like the one in Example 1 of Embodiment 1, will be explained. Note that, however, the dichroic dye is not blended in the liquid crystal layer, and the liquid crystal display is designed in such a manner as to show the display using the polarization plate while exploiting the birefringence or optical rotatory polarization (polarization converting function) of the liquid crystal. Hereinafter, like components are labeled with like reference numerals with respect to Embodiments 1 through 4, and, for ease of explanation, the description of these components is not repeated here.

In the liquid crystal display of the present embodiment, liquid crystal having negative dielectric constant anisotropy is used in the liquid crystal layer 1. Also, vertical aligning alignment films are used for the alignment films 2 and 3 for sandwiching the liquid crystal layer 1. In this case, the liquid crystal molecules are aligned substantially perpendicular to the substrates 4 and 5 (display surface) when no voltage is applied to the liquid crystal layer 1, and start to tilt from the normal direction of the substrates 4 and 5 upon application of the voltage, thereby effecting the polarization converting function to the light passing through the liquid crystal layer 1 in the normal direction thereof.

The difference between the liquid crystal display of the present embodiment and the counterpart using the alignment films 2 and 3 that align the liquid crystal in parallel with the substrates is that, in the liquid crystal display of the present embodiment, the liquid crystal is aligned in the normal direction of the substrates 4 and 5, up to and including a layer at the interface between the liquid crystal layer 1 and electrode substrate, even without applying a voltage. To exploit these characteristics effectively, the NB (Normally Black) mode, in which the black display is shown when no voltage is applied, is used for the liquid crystal display of the present embodiment. To be more specific, the display is shown in the reflection display section 9 by allowing circularly polarized light to go into the liquid crystal layer 1. In the transmission display section 10, circularly polarized light is also allowed to go into the liquid crystal layer 1. Circularly polarized light is also used in the transmission display section 10 because the phase difference compensation plate 16 (which is also used in reflection display) affects the polarization of the light exiting the liquid crystal layer 1, and in consideration of the fact that, in order to use electrically connected electrodes to drive the liquid crystal layer 1 in both the reflection display section 9 and transmission display section 10, and in order to realize dark display in both sections simultaneously, the liquid crystal layer 1 is aligned perpendicular to the substrates 4 and 5 in the transmission display section as well. Thus, with a combination of the polarization plates 14 and 15 and phase difference compensation plates 16 and 17, of all the phase difference compensation plates forming the phase difference compensation plate 17, the retardation of the one closest to the liquid crystal layer 1 is set to 135 nm. Consequently, the liquid crystal display of the present embodiment can realize satisfactory NB display.

Next, the setting of the liquid crystal layer 1 so as to realize satisfactory light display in the above combination of the polarization plates 14 and 15 and the phase difference compensation plates 16 and 17 will be explained.

As has been described above, in the present embodiment, the director configuration of the liquid crystal layer 1 starts to tilt from the normal direction of the substrates 4 and 5 upon voltage application. While the voltage is fully applied to the liquid crystal layer 1, it is preferable that the liquid crystal layer 1 functions to convert the circularly polarized light to the linearly polarized light in the reflection display section 9, and to convert the circularly polarized light to another circularly polarized light rotating in the reverse direction in the transmission display section 10. When the liquid crystal layer 1 effects the above converting function, satisfactory light display can be realized.

To allow the liquid crystal layer 1 to effect the above converting function, for example, it is preferable that the alignment treatment is applied to the alignment films 2 and 3 in such a manner not to twist the liquid crystal, and that no chiral dopant is added to the liquid crystal composition. To be more specific, it is preferable that, when means the wavelength of incident light, retardation of the liquid crystal layer varies by /4 in the reflection display section 9 and by /2 in the transmission display section 10 upon voltage application.

In case that the thicknesses of the liquid crystal layer 1 are different in the refection display section 9 and transmission display section 10, the liquid crystal layer 1 can be readily set in the above-described manner to effect the above converting function.

In the following, the liquid crystal display of the present embodiment will be explained by way of examples for purposes of explanation only, without any intention as a definition of the limits of the invention.

EXAMPLE 11

In the present example, a liquid crystal cell for filling having different thicknesses of the liquid crystal layer in the reflection display section 9 and transmission display section 10 is produced in the same manner as Example 1. Here, vertical aligning alignment films which align the liquid crystal perpendicular to the substrates 4 and 5 are used as the alignment films 2 and 3. The alignment treatment is applied to the alignment films 2 and 3 by means of rubbing, so that the liquid crystal is aligned slightly tilted with respect to the normal orientation (perpendicular direction) of the substrates 4 and 5.

Note that, however, the thicknesses (d) of the liquid crystal layer are set to 3 m and 6 m in the reflection display section 9 and transmission display section 10, respectively, and the liquid crystal layer 1 is made from a liquid crystal material, that is, liquid crystal having a difference of refractive index (n) of 0.06 and negative dielectric constant anisotropy. Then, the liquid crystal display is assembled by laminating the phase difference compensation plates 16 and 17 and the polarization plates 14 and 15 to the outside of the respective electrode substrates of the above liquid crystal cell. Herein, each of the phase difference compensation plates 16 and 17 is composed of two phase difference compensation plates.

The optical of the polarization plates 14 and 15, phase difference compensation plates 16 and 17, and the liquid crystal layer 1 (that is, the lamination orientation of the polarization plates 14 and 15, and phase difference compensation plates 16 and 17, and the alignment orientation of the liquid crystal) in the reflection display section 9 and transmission display section 10 in the liquid crystal display of the present example is set forth in Table 6 below for ready comparison with reference to a common orientation.

The optical shown in Table 6 is the position of each optical element on the display surface when the viewer observes the display surface, and when the phase difference compensation plate 16 or 17 is composed of more than one phase difference compensation plate, each phase difference compensation plate forming the phase difference compensation plate 16 or 17 is set forth in accordance with the actual position from the viewer's side. Also, in Table 6, each direction is expressed in degrees from the reference direction set arbitrarily on the display surface, and the retardation of each phase difference compensation plate is expressed in nm with respect to a beam of monochrome light having the wavelength of 550 nm.

Figure 20:
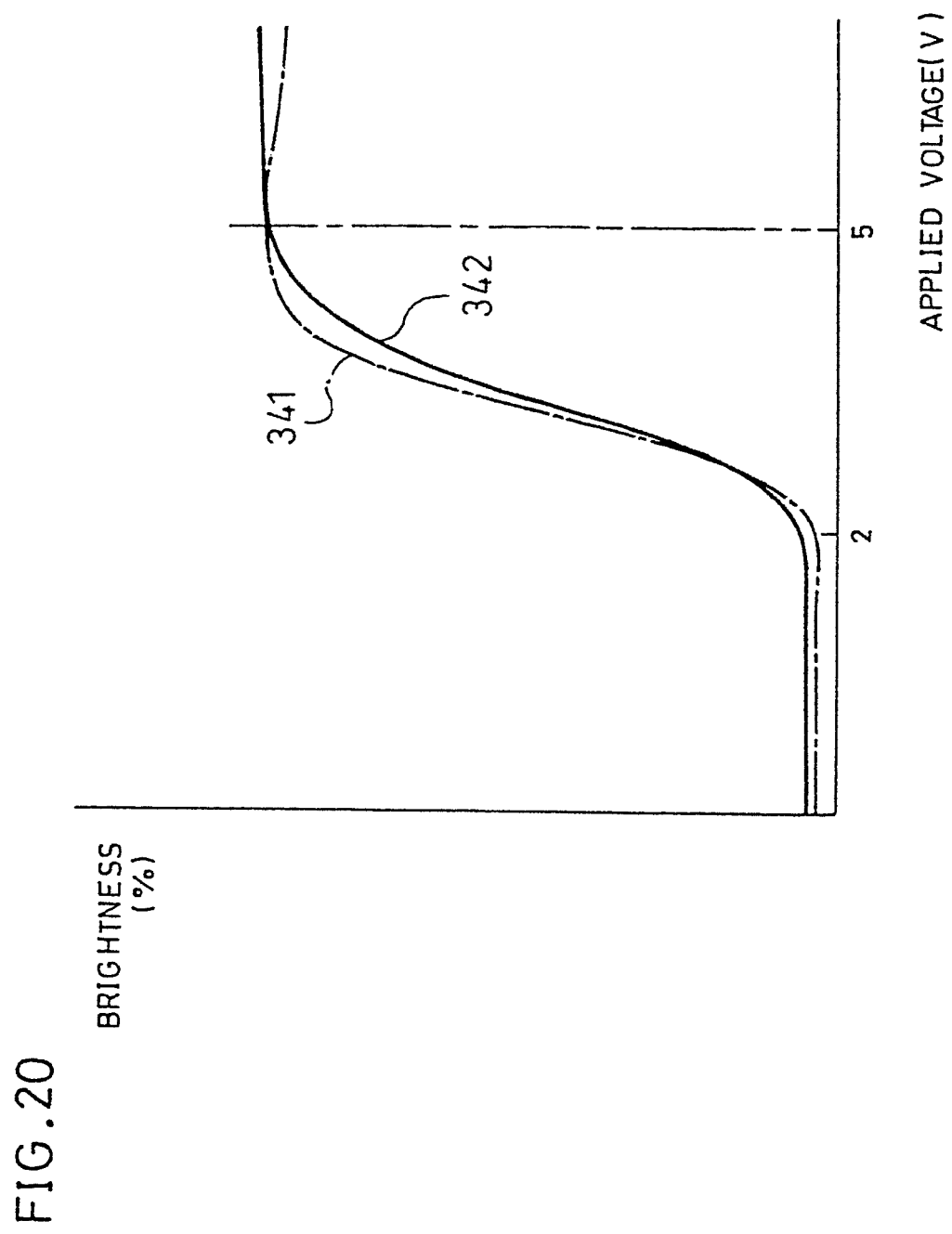
FIG. 20 is a view showing display characteristics of a liquid crystal display of Example 11.

As can be understood from FIG. 20, the liquid crystal display of Example 11 shows the dark display when no voltage is applied, and it can realize the display in the so-called normally black (NB) mode, in which the reflectance and transmittance increase with an increasing applied voltage. In the present liquid crystal display, not only can the contrast ratio be set to substantially the same value in the reflection display section 9 and transmission display section 10, but also the reflection display section 9 and transmission display section 10 show either the dark or light display simultaneously, thereby realizing the display with excellent visibility.

As has been explained, according to the present embodiment, it is confirmed that a liquid crystal display of the transflective type can show satisfactory display both in the reflection display section 9 and transmission display section 10, if alignment means (vertical aligning alignment film) that aligns the liquid crystal perpendicular to the substrate surface touching the liquid crystal (liquid crystal layer 1) is provided to at least one of the reflection display section 9 and transmission display section 10 in the liquid crystal display of the present invention, in which different director configurations of the liquid crystal are realized in the reflection display section 9 and transmission display section 10 simultaneously.

Embodiment 6

Explained in the present embodiment is a liquid crystal display which shows the display by changing the alignment orientation of the liquid crystal in response to a varying voltage while keeping the director configuration of the liquid crystal in parallel with the display surface (substrate) in at

TABLE 6

|  |  |  | EXAMPLE 11 | |
|---|---|---|---|---|
|  |  |  | SEC. 9 | SEC. 10 |
| PLATE 14 |  | TRANSMISSION AXIS ORIENTATION (°) | 0 | |
| PLATE 16 | PLATE | SLOW AXIS ORIENTATION (°) | 15 | |
|  |  | RETARDATION (nm) | 270 | |
|  | PLATE | SLOW AXIS ORIENTATION (°) | 75 | |
|  |  | RETARDATION (nm) | 135 | |
| LC LAYER 1 |  | SUBSTRATE 4 ALIGNMENT ORIENTATION (°) | −15 | −15 |
|  |  | SUBSTRATE 5 ALIGNMENT ORIENTATION (°) | −15 | −15 |
| PLATE 17 | PLATE | SLOW AXIS ORIENTATION (°) | −15 | |
|  |  | RETARDATION (nm) | 135 | |
|  | PLATE | SLOW AXIS ORIENTATION (°) | −75 | |
|  |  | RETARDATION (nm) | 270 | |
| PLATE 15 |  | TRANSMISSION AXIS ORIENTATION (°) | 90 | |

SEC. 9: SECTION 9
SEC. 10: SECTION 10
PLATES 14 × 15: POLARIZATION PLATES
PLATES 16 × 17: PHASE DIFFERENCE COMPENSATION PLATES

The display characteristics of the liquid crystal display of Example 11 assembled in the above manner are graphed in FIG. 20. The display characteristics of FIG. 20 were measured in the same manner as Example 1, and in the drawing, the horizontal axis represents a root mean square value of the applied voltage and the vertical axis represents the brightness (reflectance or transmittance).

In FIG. 20, a curve 341 indicates the voltage dependence of the reflectance of the reflection display section 9, and a curve 342 indicates the voltage dependence of the transmittance of the transmission display section 10 in the liquid crystal display of Example 11.

least one of the reflecting display section 9 and transmission display section 10. In other words, in the liquid crystal display of the present embodiment, the liquid crystal molecules start to rotate in parallel with the display surface (substrate) upon voltage application in at least one of the reflection display section and transmission display section.

In the following, the liquid crystal display of the present embodiment will be explained by way of examples for purposes of explanation only, without any intention as a definition of the limits of the invention. Hereinafter, like components are labeled with like reference numerals with respect to Embodiments 1 through 5, and, for ease of explanation, the description of these components is not repeated here.

EXAMPLE 12

Figure 21A:
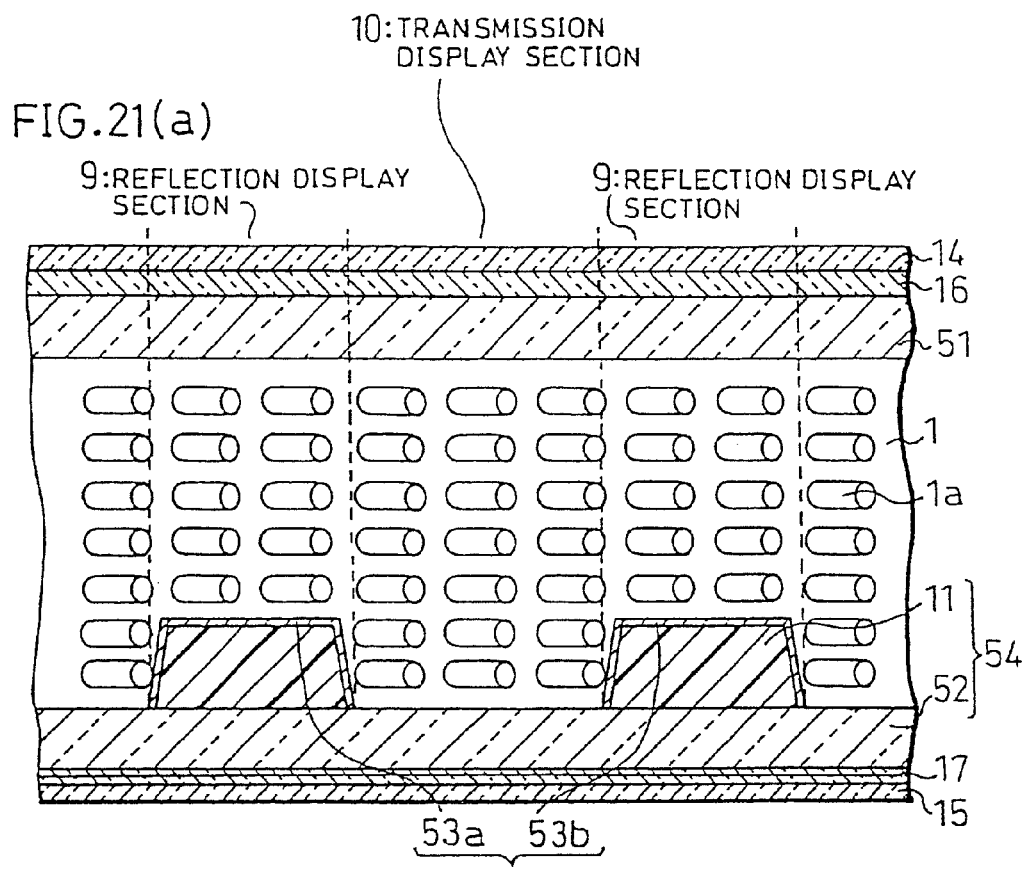
FIG. 21(a) is a cross section showing a major portion of a liquid crystal display of Example 12 when no voltage is applied.
Figure 21B:
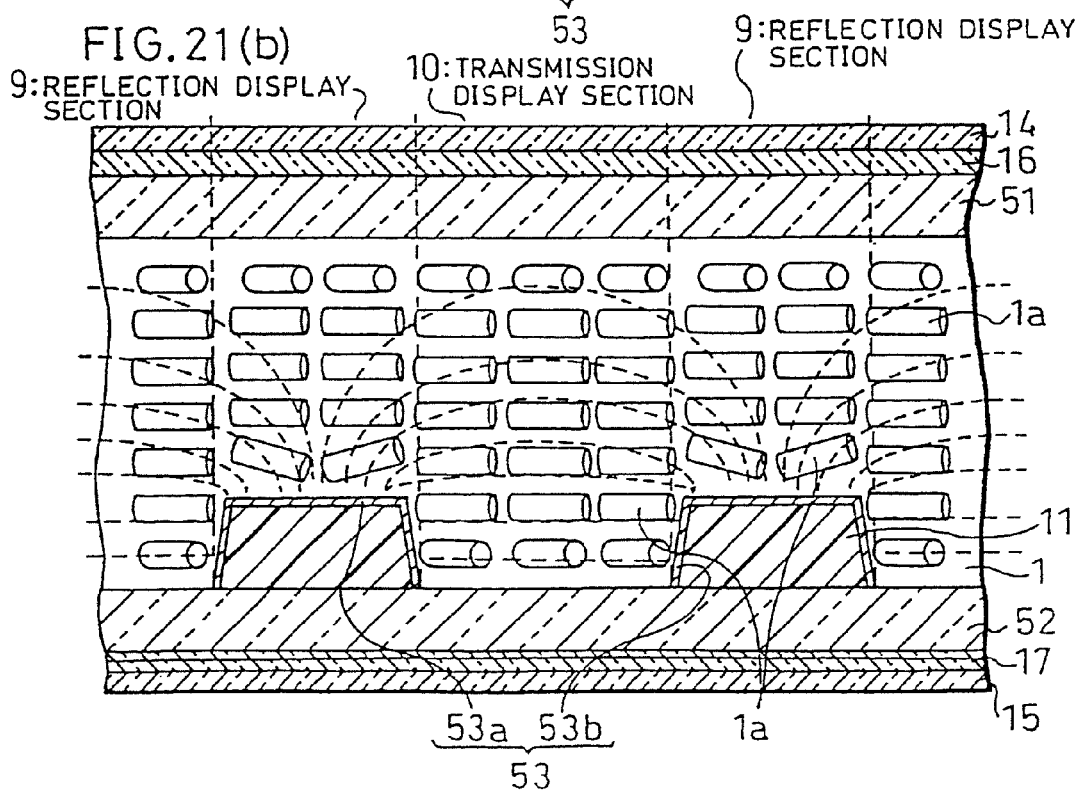
FIG. 21(b) is a cross section showing the major portion of the liquid crystal display of FIG. 21(a) when a voltage is applied.

Explained in the present example with reference to FIGS. 21(a) and 21(b) is a liquid crystal display furnished with an optical switching function, in which the liquid crystal molecules are rotated in parallel with the substrate by means of a transverse electric field (in the in-plane direction with respect to the substrate), by adopting the IPS (In-plane Switching) mode, which is used to increase viewing angle characteristics in liquid crystal displays of the transmission type, to a liquid crystal display of the transflective type.

Conventionally, the IPS mode has been used for liquid crystal displays of the transmission type. However, since the director configuration of the liquid crystal is not changed sufficiently for the transmission display on the comb-shaped electrode used in the IPS mode, the director configuration of the liquid crystal on the comb-shaped electrode does not contribute to the display, thereby failing to realize satisfactory display. In the present example, however, regions on the comb-shaped line, which could not be used in the conventional IPS system, are used to realize the reflection display, thereby making it possible to provide a liquid crystal display of the transflective type with high light efficiency.

FIG. 21(a) is a cross section of a major portion of the liquid crystal display of the present example when no voltage is applied, and FIG. 21(b) is a cross section of the major portion of the liquid crystal display of FIG. 21(a) when a voltage is applied. Both of FIGS. 21(a) and 21(b) are the cross sections when the liquid crystal cell of the present liquid crystal display is cut at a plane perpendicular to the orientation along which the electrode line (terminal) of the comb-shaped electrode provided in the liquid crystal cell extends.

In the liquid crystal display shown in FIGS. 21(a) and 21(b), the liquid crystal layer 1 is sandwiched by a light transmitting substrate 51 and a substrate 54, which is given light reflecting properties by being provided with a light reflecting comb-shaped electrode 53 (display content overwriting means, voltage applying means, alignment mechanism). Further, the phase difference compensation plate 16 and polarization plate 14 are provided to the outside of the substrate 51 (the opposite side from the surface facing the substrate 54), and the phase difference compensation plate 17 and polarization plate 15 are provided to the outside of the substrate 54 (the opposite side from the surface facing the substrate 51). Herein, the phase difference compensation plate 16 is composed of a single phase difference compensation plate 16, and the phase difference compensation plate 17 is composed of two phase difference compensation plates.

The liquid crystal display of the present example is also arranged in the following manner. That is, on the substrate 54 (electrode substrate), one of the pair of substrates sandwiching the liquid crystal layer 1, an insulation film 11 (alignment mechanism) is patterned on a glass substrate 52 by spin-coating an insulation photo-sensitive resin, irradiating the UV rays with masking, so as to leave no photo-sensitive resin in the transmission display section 10, while forming a layer of the photo-sensitive resin of a predetermined thickness in the reflection display section 9. Consequently, the liquid crystal layer 1 is made thinner in the transmission display section 10 than in the reflection display section 9.

In the liquid crystal display of the present example, the light reflecting comb-shaped electrode 53 (alignment mechanism) is formed on the glass substrate 52 to cover the insulation film 11. The comb-shaped electrode 53 is a reflective pixel electrode serving both as the liquid crystal driving electrode for driving the liquid crystal layer 1 and the reflection film (reflecting means), and it is made of metal having high light reflectance.

In the present liquid crystal display, the director configuration of liquid crystal molecules 1a is changed by the electric field applied thereon by the comb-shaped electrode 53 in the transmission display section 10. In the reflection display section 9, the liquid crystal layer 1 is driven by the electric field generated by the comb-shaped electrode 53, and the reflecting function of the comb-shaped electrode 53 is used for the display.

In the present example, the line of the comb-shaped electrode 53 is used as the reflecting means. However, projections and depressions may be provided to the surface thereof, or a light scattering film may be additionally formed on a region opposing the comb-shaped electrode 53 at the outside of the glass substrate 51 to confer light scattering properties to the comb-shaped electrode 53.

In the liquid crystal display of FIGS. 21(a) and 21(b), different potentials are given to the adjacent comb-shaped electrodes 53a and 53b, whereby an electric field develops between the comb-shaped electrodes 53a and 53b. As shown in FIG. 21(b), the transmission display section 10 corresponds to a space between the comb-shaped electrodes 53a and 53b, and the director configuration of the liquid crystal at this particular portion is changed drastically by the pair of comb-shaped electrodes (comb-shaped electrodes 53a and 53b) while keeping its orientation in parallel with the glass substrate 52. In addition, the reflection display section 9 corresponds to a portion directly above the comb-shaped electrode 53 (comb-shaped electrodes 53a and 53b). In this particular portion, the director configuration of the liquid crystal display changes not only in the orientation along the plane of the glass substrate 52, but also the orientation perpendicular to the glass substrate 52. This is because, as shown in FIG. 21(b), the lines of electric force (indicated by broken lines in the drawing) extend substantially in parallel with the glass substrate 52 in the transmission display section 10, while in the reflection display section 9, the lines of electric force have components which are perpendicular to the glass substrate 52.

The optical of the polarization plates 14 and 15, phase difference compensation plates 16 and 17, and the liquid crystal layer 1 (that is, the lamination orientation of the polarization plates 14 and 15, and phase difference compensation plates 16 and 17, and the alignment orientation of the liquid crystal) in the reflection display section 9 and transmission display section 10 in the liquid crystal display of the present example is set forth in Table 7 below for ready comparison with reference to a common orientation.

The optical shown in Table 7 is the position of each optical element on the display surface when the viewer observes the display surface, and each phase difference compensation plate forming the phase difference compensation plate 17 is set forth in accordance with the actual position from the viewer's side.

The direction of director of the liquid crystal layer 1 (the alignment orientation of the major axis of the liquid crystal molecules 1a) on the substrate 51 side is identical with the orientation of the rubbing treatment applied to the surface thereof, and the alignment orientation on the substrate 54 side is identical with the orientation of the rubbing treatment applied to the surface thereof. Hereinafter, the alignment orientation of the liquid crystal layer 1 on the substrate 51 side is referred to as the substrate 51 alignment orientation, and the direction of director of the liquid crystal layer 1 on the substrate 54 side is referred to as the substrate 54 alignment orientation.

In Table 7 below, each orientation is expressed in degrees from the reference orientation set arbitrarily on the display surface, and the retardation of each phase difference compensation plate is expressed in nm with respect to a beam of monochrome light having the wavelength of 550 nm.

Here, the direction, along which the electrode line (terminal) of the comb-shaped electrode 53 extends, forms an angle of 65 with respect to the reference orientation, and the director configuration of the liquid crystal molecules 1a initially aligned at an angle of 75 both in the reflection display section 9 and transmission display section 10 is re-aligned at a greater angle. In addition, in the present liquid crystal display, n d of the liquid crystal layer 1 is set to about 130 nm in the reflection display section 9 and about 240 nm in the transmission display section 10.

10 when no voltage is applied, and both the reflectance and transmittance increase with an increasing applied voltage. That is, when the applied voltage is 2V, both the reflectance of the reflection display section 9 and the transmittance of the transmission display section 10 are 3%, and when the applied voltage is increased to 5V, both increase to 35% and 38%, respectively. Thus, the above liquid crystal display can attain satisfactory brightness and contrast ratio for the light display both in the reflection display section 9 and transmission display section 10, thereby realizing the display with excellent visibility. Also, since the contrast ratio is higher in the transmission display section 10 than in the reflection display section 9, the above liquid crystal display can further improve the display quality and show more satisfactory display.

TABLE 7

| | | EXAMPLE 12 | |
|---|---|---|---|
| | | SEC. 9 | SEC. 10 |
| PLATE 14 | | TRANSMISSION AXIS ORIENTATION (°) | 0 |
| PLATE 16 | PLATE | SLOW AXIS ORIENTATION (°) | 15 |
| | | RETARDATION (nm) | 270 |
| LC LAYER 1 | | SUBSTRATE 51 ALIGNMENT ORIENTATION (°) | 75 | 75 |
| | | SUBSTRATE 54 ALIGNMENT ORIENTATION (°) | 75 | 75 |
| PLATE 17 | PLATE | SLOW AXIS ORIENTATION (°) | −15 |
| | | RETARDATION (nm) | 240 |
| | PLATE | SLOW AXIS ORIENTATION (°) | −75 |
| | | RETARDATION (nm) | 270 |
| PLATE 15 | | TRANSMISSION AXIS ORIENTATION (°) | 90 |

SEC. 9: SECTION 9
SEC. 10: SECTION 10
PLATES 14 × 15: POLARIZATION PLATES
PLATES 16 × 17: PHASE DIFFERENCE COMPENSATION PLATES

In the liquid crystal display set as above, both the reflection display section 9 and transmission display section 10 show the dark display when no voltage is applied to the liquid crystal layer 1. If a voltage is applied to the liquid crystal layer 1 under these conditions, the liquid crystal molecules 1a change their director directions to deviate from the orientation (herein, 65 orientation) along which the electrode line (terminal) of the comb-shaped electrode 53 extends. Thus, the present liquid crystal display can realize the light display by changing the director configuration of the liquid crystal with an increasing applied voltage.

Figure 22:
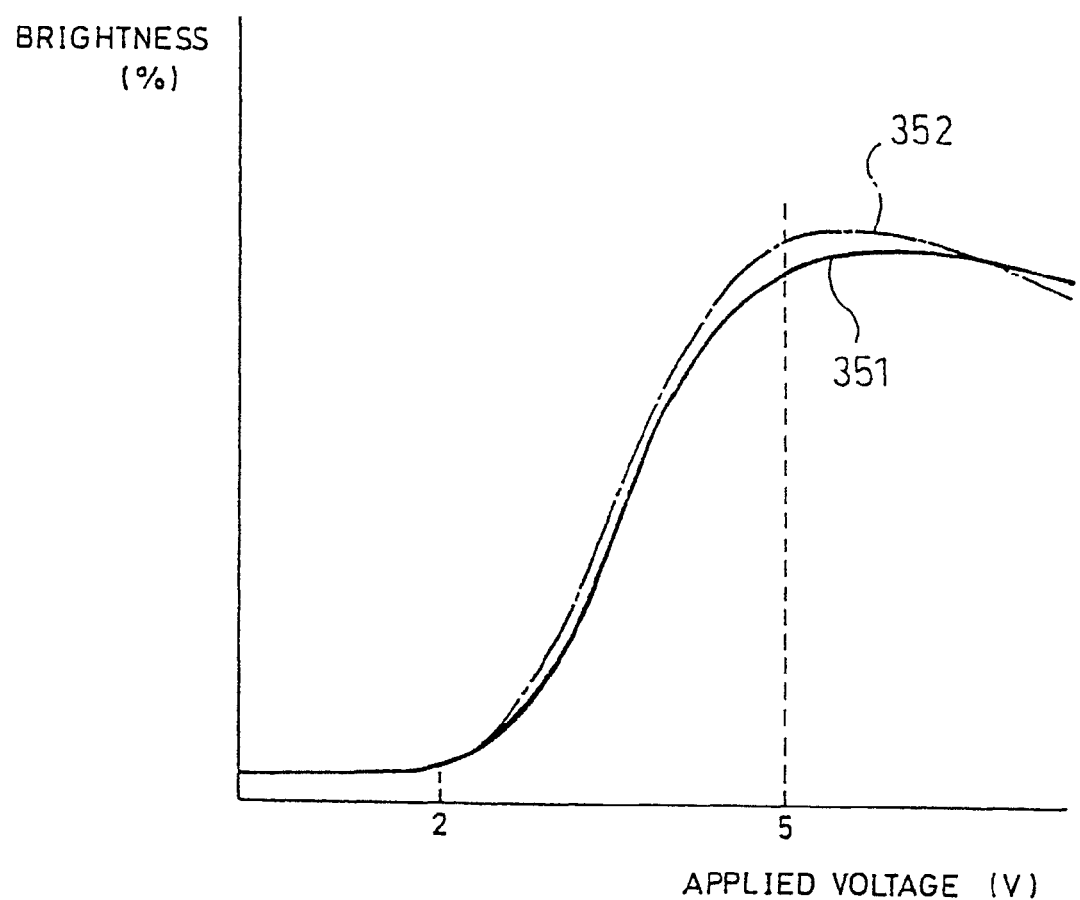
FIG. 22 is a view showing display characteristics of a liquid crystal display of Example 12.
Figure 23:
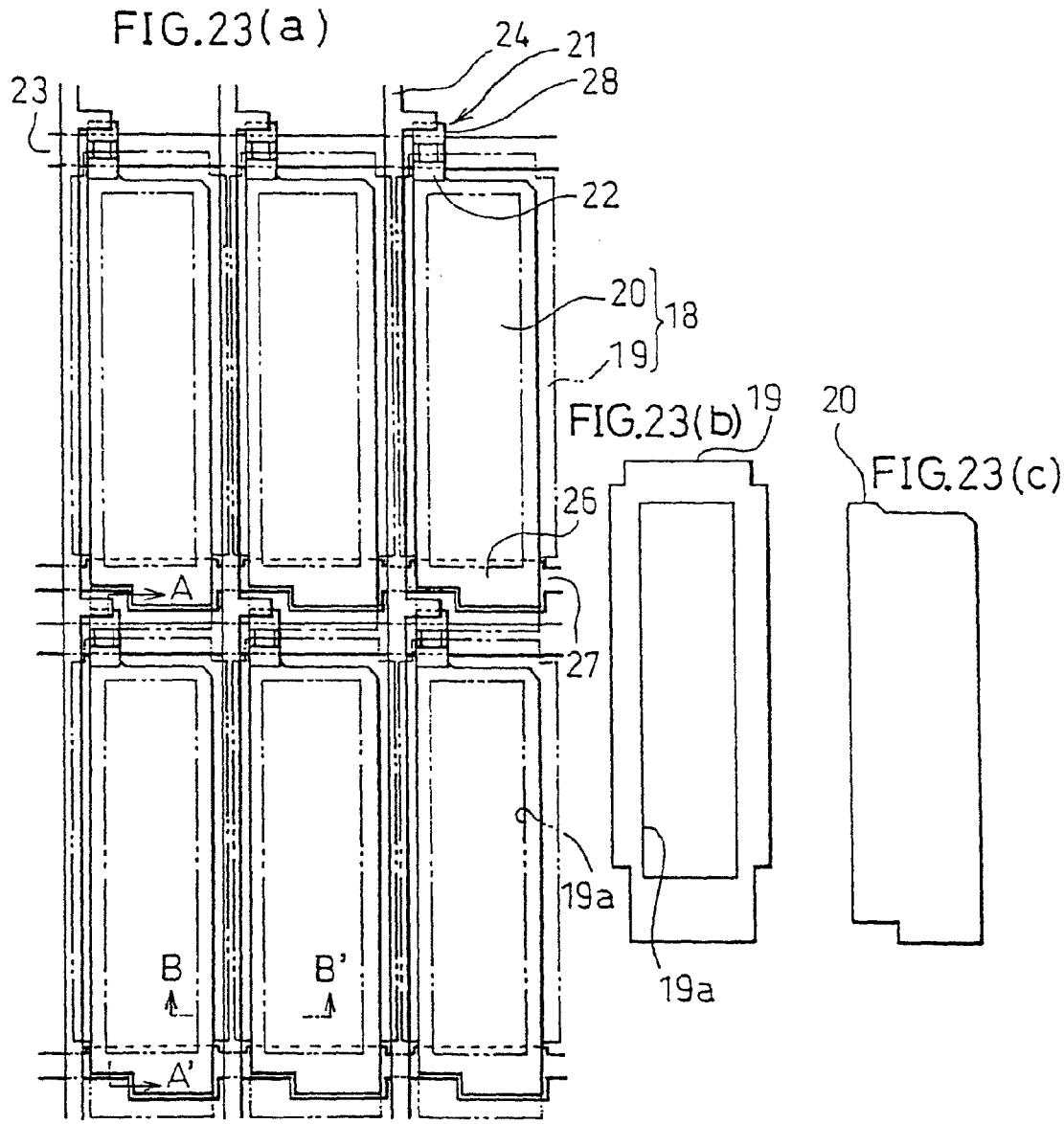
FIG. 23(a) is a plan view showing a major portion of a TFT element substrate for realizing a liquid crystal display of the transmission-main transflective type in accordance with Embodiment 7 of the present invention.
FIG. 23(b) is a view showing a driving electrode of a reflection display section on the TFT element substrate of FIG. 23(a)
FIG. 23(c) is a view showing a transparent pixel electrode on the TFT element substrate of FIG. 23(a)

The display characteristics of the liquid crystal display of Example 12 assembled in the above manner are graphed in FIG. 22. The display characteristics of FIG. 22 were measured in the same manner as Example 1, and in the drawing, the horizontal axis represents a root mean square value of the applied voltage and the vertical axis represents the brightness (reflectance or transmittance).

In FIG. 22, a curve 351 indicates the voltage dependence of the reflectance of the reflection display section 9, and a curve 352 indicates the voltage dependence of the transmittance of the transmission display section 10 in the liquid crystal display of Example 12. Although the optical characteristics differ in the reflection display section 9 depending on the position on the comb-shaped electrode 53, the optical characteristics of the most typical portion are set forth in FIG. 22.

As can be understood from FIG. 22, the liquid crystal display of Example 12 shows the dark display both in the reflection display section 9 and transmission display section As has been explained, according to Example 12, it was confirmed that there can be provided a liquid crystal display of the transflective type which can realize the reflection display on the region above the comb-shaped line 53, which could not be used for the display in the conventional IPS system, while attaining high light utilization.

In the present embodiment, besides the method using the nematic liquid crystal in the aforementioned IPS mode, a method using the ferroelectric liquid crystal display mode or a method using the anti-ferroelectric liquid crystal display mode can be adopted as a method for realizing the above-described director configuration of the liquid crystal.

In Example 13 below, a liquid crystal display using the ferroelectric liquid crystal display mode will be explained as another example liquid crystal display for realizing the above-described director configuration of the liquid crystal.

EXAMPLE 13

In the present example, a liquid crystal cell is produced in the same manner as its counterpart used for assembling the liquid crystal display of Example 1 except that:

surface-stabilized ferroelectric liquid crystal is used as a liquid crystal material;

the thicknesses (d) of the liquid crystal layer 1 in the transmission display section 10 and reflection display section 9 are set to 1.4 m and 0.7 m, respectively;

n d of the liquid crystal layer 1 in the reflection display section 9 and transmission display section 10 are set to 130 nm and 260 nm, respectively; and a reflective electrode is used for a region corresponding to the reflection display section 9 instead of forming the reflection film 8 over the electrode 7 for the reflection display section 9.

To be more specific, the insulation film 11 is patterned over the substrate 5 (glass substrate) in such a manner that no photosensitive resin is left in the transmission display section 10, while a 0.7 m-thick layer of the photosensitive resin is formed in the reflection display section 9. Also, a reflective electrode is formed where the insulation film 11 is formed (reflection display section 9), and a transparent electrode is formed where the insulation film 11 is not provided (transmission display section 10). Then, the alignment film 3 is formed on the substrate 5 on the surface on which is formed the electrode, to which the alignment treatment is applied by means of rubbing, whereby the electrode substrate is produced. The other electrode substrate (opposing substrate) placed in an opposing position to the electrode substrate thus obtained is arranged in the same manner as its counterpart in Example 1. Then, the liquid crystal cell is produced by filling a space between the two electrode substrates with ferroelectric liquid crystal composition containing the surface-stabilizing ferroelectric liquid crystal. Subsequently, the liquid crystal display is assembled by laminating the phase difference compensation plates 16 and 17 and the polarization plates 14 and 15 to the outside of the respective electrode substrates forming the liquid crystal cell. Herein, the phase difference compensation plate 16 is composed of a single phase difference compensation plate, and the phase difference compensation plate 17 is composed of two phase difference compensation plates.

The optical of the polarization plates 14 and 15, phase difference compensation plates 16 and 17, and the liquid crystal layer 1 (that is, the lamination orientation of the polarization plates 14 and 15, and phase difference compensation plates 16 and 17, and the alignment orientation of the liquid crystal of dark display and light display) in the liquid crystal display of the present example is set forth in Table 8 below for ready comparison with reference to a common orientation.

The optical shown in Table 8 is the position of each optical element on the display surface when the viewer observes the display surface, and each phase difference compensation plate forming the phase difference compensation plate 17 is set forth in accordance with the actual position from the viewer's side. Also, in Table 8, each orientation is expressed in degrees from the reference orientation set arbitrarily on the display surface, and the retardation of each phase difference compensation plate is expressed in nm with respect to a beam of monochrome light having the wavelength of 550 nm.

TABLE 8

| | | | EXAMPLE 13 | |
|---|---|---|---|---|
| | | | SEC. 9 | SEC. 10 |
| PLATE 14 | | TRANSMISSION AXIS ORIENTATION (°) | 0 | |
| PLATE 16 | PLATE | SLOW AXIS ORIENTATION (°) | 15 | |
| | | RETARDATION (nm) | 270 | |
| LC LAYER 1 | | SUBSTRATE 51 | D: 75 | |
| | | ALIGNMENT ORIENTATION (°) | L: 120 | |
| | | SUBSTRATE 54 | D: 75 | |
| | | ALIGNMENT ORIENTATION (°) | L: 120 | |
| PLATE 17 | PLATE | SLOW AXIS ORIENTATION (°) | −15 | |
| | | RETARDATION (nm) | 270 | |
| | PLATE | SLOW AXIS ORIENTATION (°) | −75 | |
| | | RETARDATION (nm) | 270 | |
| PLATE 15 | | TRANSMISSION AXIS ORIENTATION (°) | 90 | |

SEC. 9: SECTION 9
SEC. 10: SECTION 10
D: ORIENTATION WHEN DARK DISPLAY IS OBSERVED
L: ORIENTATION WHEN LIGHT DISPLAY IS OBSERVED
PLATES 14 × 15: POLARIZATION PLATES
PLATES 16 × 17: PHASE DIFFERENCE COMPENSATION PLATES

The liquid crystal display assembled in the above manner can attain satisfactory brightness and contrast ratio both in the reflection display section 9 and transmission display section 10.

As has been explained, any type of liquid crystal display which can realize different director configurations of the liquid crystal and different thicknesses of the liquid crystal layer in the reflection display section 9 and transmission display section 10 simultaneously can serve as the liquid crystal display of the transflective type of the present invention and show satisfactory display even if the alignment direction of the liquid crystal layer 1 changes in the plane of the liquid crystal layer upon the voltage application. In case that the liquid crystal display adopts the IPS mode, the light efficiency can be improved compared with the conventional liquid crystal display of the transmission type also adopting the IPS mode. In addition, the liquid crystal display of the present embodiment can be used in the other modes using the ferroelectric liquid crystal and the like.

Embodiment 7

In the present embodiment, a specific example of an element substrate and a color filter substrate driven by an active matrix, which realize the arrangement of the liquid crystal display of the present invention, will be explained.

In assembling the liquid crystal display of the present invention aiming at displaying an image, it is very critical to set a ratio of the transmission display section and reflection display section based on how frequently the liquid crystal display is mainly used for the transmission display and reflection display.

To be more specific, in a first style, like the liquid crystal display of the transmission type currently used, the transmitted light from the lighting device (back light) serving as the back lighting means is mainly used for the display, and the reflection display section is used to prevent the wash-out (this style is referred to as the transmission-main transflective type, hereinafter).

In a second style, the reflection display is mainly used for the display, in which the power-consuming back light is turned ON/OFF frequently depending on the circumstances to save the power consumption, and therefore, the back light is turned ON only when the ambient light is so weak that the display content can not be seen by the reflection display alone (this style is referred to as the reflection-main transflective type, hereinafter).

The above two styles are distinguished from each other based on whether the display is chiefly shown by the transmission display or reflection display, and for this reason, a specific area ratio of the transmission display section and reflection display section, a color of the color filter in case of color display, etc. must be designed differently in each style.

Thus, in the first place, a liquid crystal display using for display TFT elements as adopting one of the active matrix methods will be explained as an example of the liquid crystal display of the transmission-main transflective type. Hereinafter, like components are labeled with like reference numerals with respect to Embodiments 1 through 6, and, for ease of explanation, the description of these components is not repeated here.

To begin with, the arrangement of the substrate in the liquid crystal display of the transmission-main transflective type using the TFT elements for the display will be explained with reference to FIGS. 23(a) through 25.

FIG. 23(a) is a plan view illustrating a major portion of the TFT element substrate for realizing the liquid crystal display of the transmission-main semi-transmission type of present embodiment. FIG. 23(b) is a view showing a driving electrode 19 for the reflection display section 9 (see FIGS. 1, 4, 24, and 25) on the TFT element substrate of FIG. 23(a). FIG. 23(c) is a view showing a transparent pixel electrode 20 on the TFT element substrate of FIG. 23(a).

Figure 24:
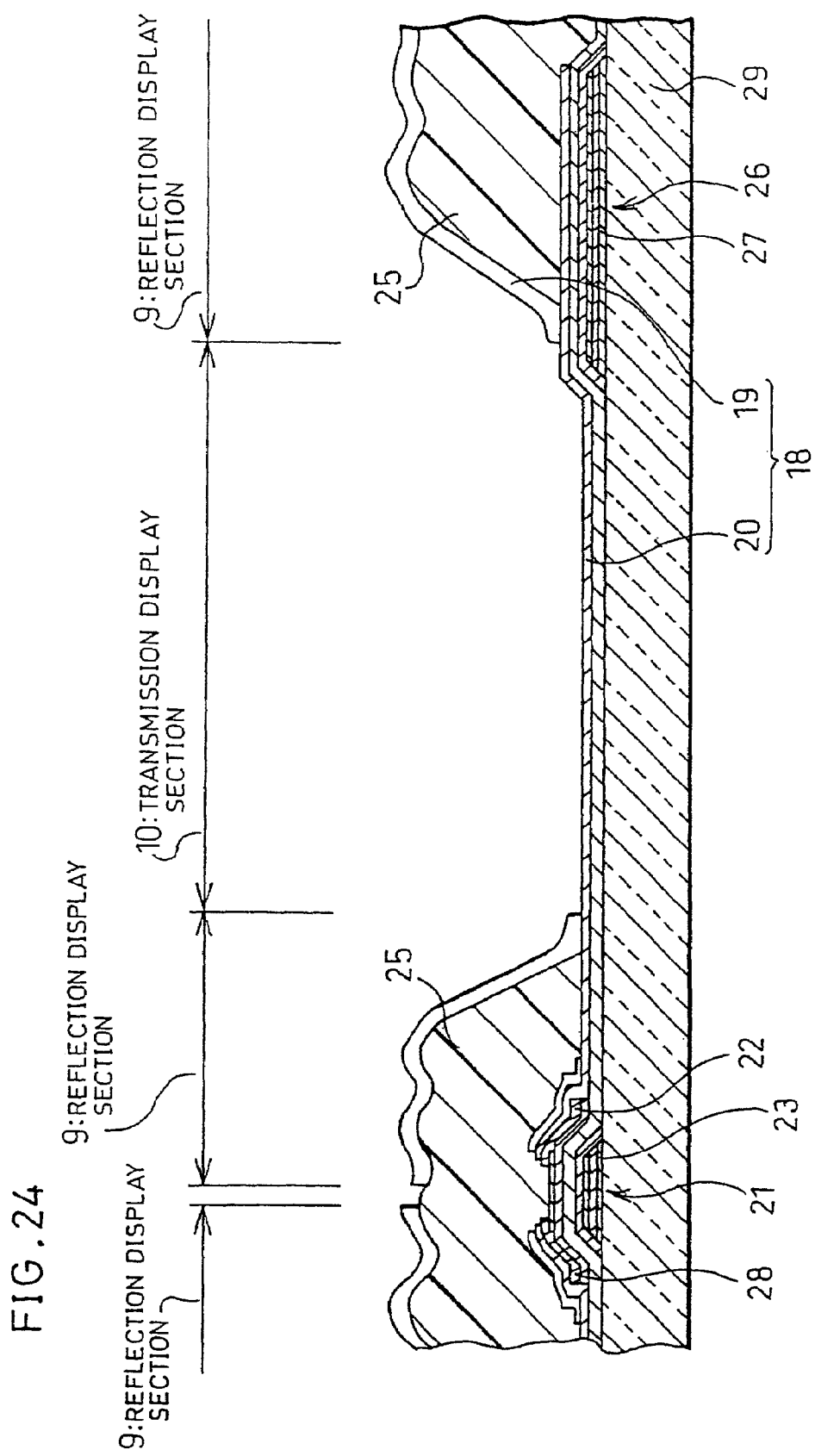
FIG. 24 is a cross section of the TFT element substrate taken on line A-A' of FIG. 23(a)

FIG. 24 is a cross section of the TFT element substrate sliced on line A-A' of FIG. 23(a). To be more specific, FIG. 24 is a cross section of the TFT element substrate traversing the TFT element 21 to the driving electrode 19 and transparent pixel electrode 20 and further to a storage capacitor section 26. FIG. 25 is a cross section of the TFT element substrate of FIG. 23(a) sliced on line B-B' of FIG. 23(a), and shows the arrangement on the cross section at a boundary portion of adjacent pixels.

As shown in FIGS. 23(a), 24, and 25, a pixel electrode 18 driving the liquid crystal layer 1 (see FIGS. 1 and 4) is composed of the driving electrode 19 (display content overwriting means, voltage applying means) in the reflection display section 9 and the transparent pixel electrode 20 (display content overwriting means, voltage applying means) made of ITO. The driving electrode 19 may be a reflective electrode rendering the reflecting properties. Also, the driving electrode 19 and transparent pixel electrode 20 may be electrically connected to each other when adopting a display method in which the display is not inverted when the displays are shown on the same voltage.

The driving electrode 19 and transparent pixel electrode 20 are connected to a drain terminal 22 of the TFT element 21 which controls a voltage applied to each pixel for the display. In case that the driving electrode 19 is a reflective electrode and furnished with a transmission display opening 19a, a region where the transmission display opening 19a is made through is used for the transmission display as the transmission display section 10.

On the layer beneath the driving electrode 19, the TFT element 21, lines 23 and 24, storage capacitor section 26 and a storage capacitor line 27 are provided. Note that, however, since these components are made of light-blocking material, such as metal, the TFT element substrate is produced in such a manner that none of these components is provided in the transmission display opening 19a. In FIG. 23(a), the driving electrode 19 is indicated by a two-dot chain line.

Also, as shown in FIG. 24, a major portion of the driving electrode 19 of the reflection display section 9 for applying a voltage to the reflection display section 9 forming the driving electrode 18 is spaced apart from the surface of the substrate 19 on which are formed the lines 23 and 24 for driving the TFT element 21 and the TFT element 21 (TFT element substrate surface) by an organic insulation film 25. The organic insulation film 25 is made of an organic insulation material having a low dielectric constant so as to have a layer thickness of 3 m for the following reasons:

to prevent a parasitic capacitor component, formed between the pixel electrode 18 and the line 23 which will be used as the gate line of the TFT element 21 or the line 24 which will be used as the source line of the TFT element 21, from delaying or deforming a gate signal waveform or a source signal waveform which controls the opening/closing action of the TFT element 21, so that a high-resolution dot matrix display is shown; and to improve the optical characteristics of the reflection display section 9 and transmission display section 10 in the liquid crystal display of the present embodiment.

The pixel electrode 18 is connected to the drain terminal 22 of the TFT element 21. The drain terminal 22 is an n$^+$ amorphous silicon layer doped to form the n type semiconductor, and serves as the drain electrode of the TFT element 21. In the TFT element substrate of the present embodiment, the ITO layer placed to touch the drain terminal 22 is used as the transparent pixel electrode 20, and the driving electrode 19 of the reflection display section 9 is formed on the organic insulation film 25 which is patterned in such a manner as to cover the transparent pixel electrode 20 partially. In other words, in the liquid crystal display of the transmission-main transflective type using the TFT element substrate of FIG. 24, the transparent pixel electrode 20 used for the transmission display and the driving electrode 19 used for the reflection display are electrically connected at the pattern boundary of the organic insulation film 25. Further, smooth protrusion and depressions may be provided on the surface of the driving electrode 19 of the reflection display section 9 as shown in FIGS. 24 and 25 to prevent the surface from turning into a specular reflector.

Also, as shown in FIG. 25, the organic insulation film 25 is formed to cover the line 24 connected to the source terminal 28 of the TFT element 21 at the boundary of adjacent pixels on the TFT element substrate, whereby the driving electrode 19 of the reflection display section 9 is formed on the organic insulation film 25.

The TFT element substrate produced in this manner can control the parasitic capacitor component produced by the pixel electrode 18 and lines 23 and 24 through the organic insulation film 25 by setting an appropriate relation between the layer thickness and dielectric constant of the organic insulation film 25. Thus, as shown in FIG. 23(a), the driving electrode 19 of the reflection display section 9 can be extended directly above the lines 23 and 24. In this case, a space between the adjacent pixel electrodes 18 can be narrowed, and the leaking electric field from the lines 23 and 24 to the liquid crystal layer 1 through such a space can be reduced. Consequently, the director configuration of the liquid crystal layer 1 is hardly disturbed. Thus, the director configuration of the liquid crystal in the liquid crystal layer 1 can be controlled closer to the boundary between adjacent pixel electrodes 18 by setting an adequate relation between the layer thickness and dielectric constant of the organic insulation film 25. Hence, there can be produced a TFT element substrate for the liquid crystal display of the transmission-main transflective type having a high aperture. In the present embodiment, the organic insulation film 25 is made of an organic insulation material having a relative dielectric constant of 3.5 to have a film thickness of 3 m.

As has been explained, in the present embodiment, the TFT element substrate, in which 45% of the entire pixel area is used for the transmission display, and 38% of the same is used for the reflection display, is produced. Given that the most general conventional TFT liquid crystal display of the transmission type attains an aperture of about 50% in the transmission display section, the present TFT element substrate can be said to be the TFT element substrate for a liquid crystal display of the transmission-main transflective type with high light efficiency, because it secures a ratio for the area of the transmission display section 10 which is substantially the same as in conventional displays, and also shows display by adding the luminance of the display light in the reflection display section 9 to the transmission display light.

The reason why the liquid crystal display of the present embodiment can attain high light utilization is because the light blocking components, such as TFT elements 21, lines 23 and 24, storage capacitor 26, and storage capacitor line 27, are provided to the reflection display section 9, and thus these components do not cause any loss of the light used for the liquid crystal display.

Next, the color filter substrate placed to oppose the TFT element substrate produced in the above manner will be explained with reference to FIGS. 26(a) and 26(b).

Figure 26A:
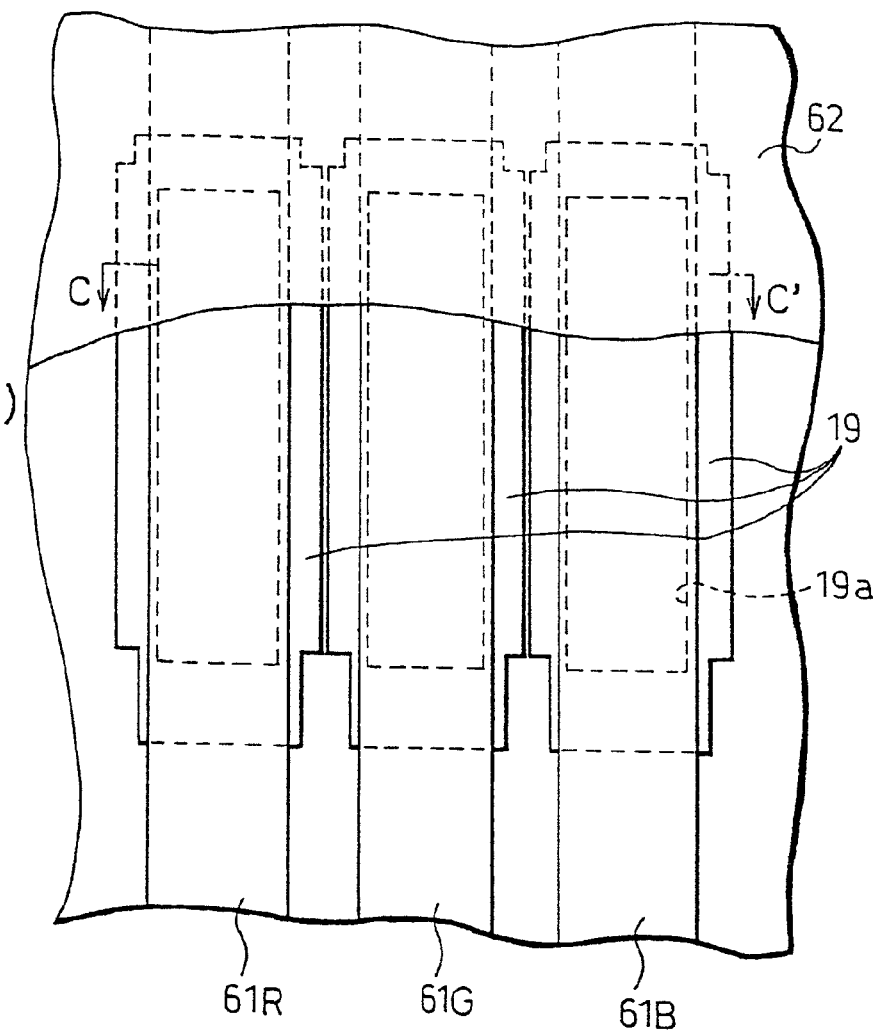
FIG. 26(a) is a plan view showing a major portion of the liquid crystal display of the transmission-main transflective type in accordance with Embodiment 7 of the present invention, and it is a partial cutaway view of a color filter substrate showing an alignment of color filters formed on the color filter substrate used in the above liquid crystal display of the transmission-main transflective type with respect to a transmission display opening of a driving electrode formed in the reflection display section on the TFT element substrate of FIG. 23(a)
Figure 26B:
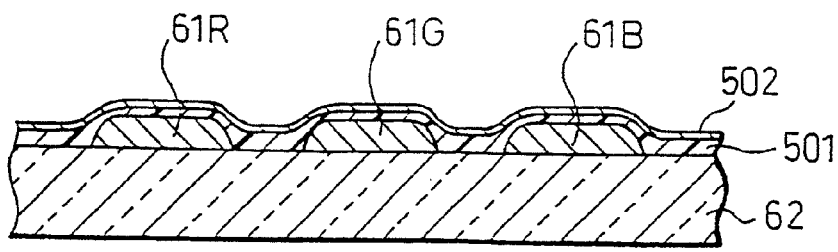
FIG. 26(b) is a cross section of the color filter substrate of FIG. 26(a)

As shown in FIGS. 26(a) and 26(b), three color filters, namely, a color filter 61R for red (R), a color filter 61G for green (G), and a color filter 61B for blue (B), are formed on the color filter substrate. Each of the three color filters 61R, 61G, and 61B is made of photosensitive resin in which a pigment is dispersed, and formed separately on the glass substrate 62 as a planar and stripe color layer in a matching position with the pixels on the TFT element substrate.

Further, as shown in FIG. 26(b), a smoothing layer 501 made of transparent acrylic resin is formed on the glass substrate 62 on the surface where the color filters 61R, 61G, and 61B are formed to cover the same. Also, a 140 nm-thick ITO film is sputtered on the smoothing layer 501, using a blocking mask covering non-specified portions, to serve as a counter electrode 502 (display content overwriting means, voltage applying means) for the pixel electrode 18 of the TFT element substrate. Consequently, the color filters 61R, 61G, and 61B are separated from each other by transparent regions.

The superimposing position of the color filter substrate and TFT element substrate is shown in FIG. 26(a). That is, the transmission display opening 19a (transmission display section 10) of the driving electrode 19 formed in the reflection display section 9 on the TFT element substrate is completely covered with the stripe color filters 61R, 61G, and 61B. On the other hand, only the portion of the driving electrode 19 in the reflection display section 9 along the extending direction of the color filters 61R, 61G, and 61B is covered with the color filters 61R, 61G, and 61B. The transparent regions between adjacent color filters 61R, 61G, and 61B are placed to oppose the driving electrode 19 formed in the reflection display section 9 at the other portion (the portion other than the one along extending direction of the color filters 61R, 61G, and 61B).

Figure 27:
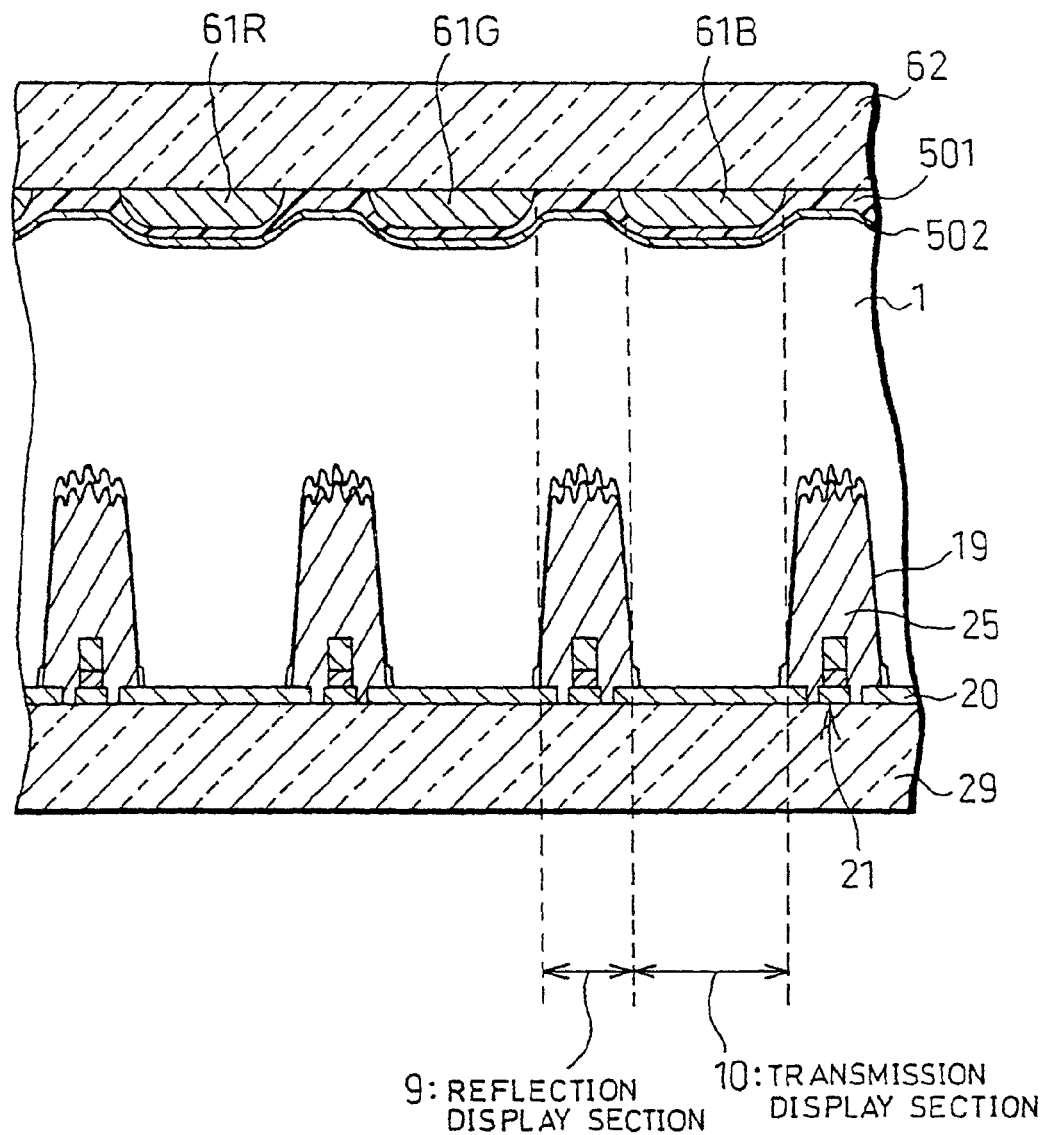
FIG. 27 is a cross section showing a major portion of the liquid crystal display taken on line C-C' of FIG. 26(a)

FIG. 27 shows the positions of the reflection display section 9, transmission display section 10, color filters 61R, 61G, and 61B by way of a combination of the color filter substrate and TFT element substrate. FIG. 27 is a cross section of a major portion of the liquid crystal display sliced on line C-C' of FIG. 26(a), that is, the cross section cut along the line C-C' of the color filter substrate and TFT element substrate superimposed for the use of the liquid crystal display.

Thus, any of the color filters 61R, 61G, and 61B is formed in the transmission display section 10, and the portion of the reflection display section 9 other than the one along the extending direction of the color filters 61R, 61G, and 61B corresponds to the transparent regions among the color filters 61R, 61G, and 61B.

According to the above arrangement, the color filters 61R, 61G, and 61B of the same kind as those used for the transmission display function only on a part of the reflection display section 9. Consequently, the color display can be realized in the reflection display, and reflectance necessary for the refection display section can also be secured.

The transmission colors shown by the light having passed through the color filter substrate produced as shown in FIGS. 26(a) and 26(b) may be the same transmission colors of RGB used for liquid crystal displays of the transmission type for each of the RGB pixels, or may be adjusted in an adequate manner, as the case may be.

In a combination of the TFT element substrate and color filter substrate shown in FIGS. 26(a) and 27, the transmission display section 10 shows the display using only the light having passed through the color filters 61R, 61G, and 61B, and part of the reflection display section 9 shows the display using the color filters 61R, 61G, and 61B used for the transmission display section 10, and the rest shows the display without using the color filters 61R, 61G, and 61B. This is because the reflection display section 9 can not attain sufficient brightness if it uses the color filters 61R, 61G, and 61B entirely, and the brightness is compensated by providing therein a portion where the color filters 61R, 61G, and 61B are not used.

Further, in the present embodiment, since the display light passes through the color filters 61R, 61G, and 61B twice in the reflection display section 9, color filters 61R, 61G, and 61B may be used in the reflection display section 9 which have higher brightness than those used in the transmission display section 10.

Also, as in the present embodiment, the color filters 61R, 61G, and 61B may be provided at least to the transmission display section 10, and the reflection display section 9 may have a region (portion) where no color filters 61R, 61G, and 61B are provided. Further, the color filters 61R, 61G, and 61B may be provided to the transmission display section 10 alone, and not to the reflection display section 9.

In case that color filters 61R, 61G, and 61B are not provided to the reflection display section 9, a display voltage signal necessary for the transmission display is a signal suitable for a color display, and a display voltage signal necessary for the reflection display is a signal suitable for a monochrome display. For this reason, there arises a driving problem that the percentage of the contribution of each of the RGB pixels to the brightness is proportional to the luminous transmittance (Y value) of each color in the transmission display section 10, but the percentage in each pixel is the same in the reflection display section 9.

To be more specific, if the display brightness in a case where the B pixels alone show light display is compared to the display brightness in a case where the G pixels alone show light display, the brightness in each pixel, in which the luminous transmittance is concerned, varies in the transmission display section 10 where the color filters 61R, 61G, and 61B are provided, but is the same in the reflection display section 9 where the color filters 61R, 61G, and 61B are not provided.

This problem can be eliminated by changing the area of the portion of the reflection display section 9 in each of the RGB pixels that does not show the color display in accordance with the Y value for each of the RGB colors of the color filters 61R, 61G, and 61B used for the transmission display. Accordingly, the contribution of the monochrome display of the reflection display section 9 to the brightness in each of the RGB pixels can be adjusted by changing the respective areas of the reflection display section 9 in each RGB pixel and the brightness of the monochrome display based on the area of the reflection display section 9 can be reflected in the display luminance of each color.

In addition, the same effect can be obtained by setting the ratio of coverage of the reflection display section 9 by the color filter to a different value for each color, in the order G,R,B from smallest to largest. This method has another advantage that the slight green coloring occurred when a normal polarization plate is used can be compensated. Also, in case that the color filter substrate and TFT element substrate are superimposed as shown in FIG. 26(*a*), a relatively large allowance can be secured in the accuracy of the superimposing position. The reason why is because each pixel exists between portions where no color filter is formed in the reflection display section 9, if an area of one of those portions increases by the position shift, the other decreases accordingly.

When the TFT element substrate and color filter substrate described as above are used, transmission display as good as the transmission display shown in conventional TFT liquid crystal displays can be displayed with the use of the lighting device (back light) as the back light means. Further, even when the ambient light is too bright, the display content can be seen because the reflected light is used to display the display content very close to the display content in the transmission display. Hence, there can be realized a high-resolution color liquid crystal display which does not cause parallax and does not wash out even when used with too bright ambient light.

Next, the arrangement of the substrate of the liquid crystal display of the reflection-main transflective type will be explained with reference to FIGS. 28, 29(*a*) and 29(*b*). In the liquid crystal display of this type, the arrangements of the TFT element display and color filter substrate are changed, so that it is mainly used as a low power consuming liquid crystal display which uses the reflected light of the ambient light for the display, and shows the transmission display when the ambient light is not sufficiently strong.

Figure 28:
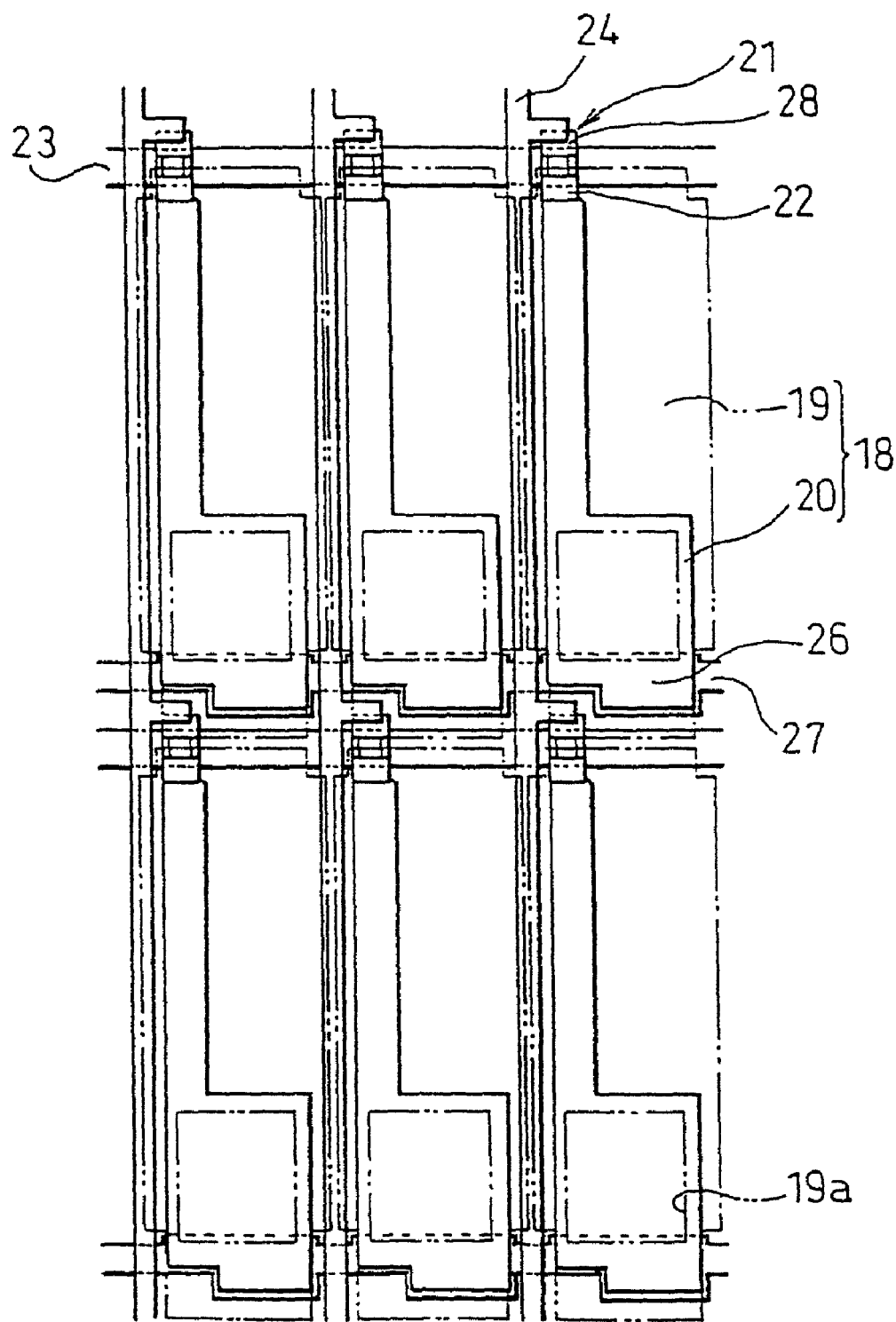
FIG. 28 is a plan view showing a major portion of a TFT element substrate for realizing a liquid crystal display of the reflection-main transflective type in accordance with Embodiment 7 of the present invention.

FIG. 28 is a plan view showing a major portion of the TFT element substrate for realizing a liquid crystal display of the reflection-main transflective type of Embodiment 7, and it shows the TFT element substrate which mainly reflects light. In the drawing, the driving electrode 19 is represented by a two-dot line.

As shown in FIG. 28, the liquid crystal display of the reflection-main transflective type is arranged in the same manner as the above liquid crystal display of the transmission-main transflective type except that the transmission display opening 19*a* of the driving electrode 19 and the transparent pixel electrode 20 are made smaller than their respective counterparts on the TFT element substrate used in the liquid crystal display of the transmission-main transflective type.

In other words, in the liquid crystal display of the reflection-main transflective type, as shown in FIG. 28, the pixel electrode 18 which drives the liquid crystal layer 1 (FIGS. 1 and 4) is composed of the driving electrode 19 and the transparent pixel electrode 20 made of ITO in the reflection display section 9, and the driving electrode 19 and transparent pixel electrode 20 are connected to the drain terminal 22 of the TFT element 21 which controls a voltage applied to each pixel for the display. Also, the driving electrode 19 is furnished with the transmission display opening 19*a*, and in case that the driving electrode 19 is the reflective electrode, a region where the transmission display opening 19*a* is made through is used for the transmission display as the transmission display section 10 (FIGS. 24, 25, and 27).

Also, the TFT element 21, lines 23 and 24, storage capacitor section 26, and storage capacitor line 27 are provided on the layer beneath the driving electrode 19, and these components are provided outside of the transmission display opening 19*a*.

Note that, however, the TFT element substrate of FIG. 28 is arranged in such a manner that the transmission display section 10 is smaller and the reflection display section 9 (FIGS. 24, 25, and 27) is larger compared with those in the TFT element substrate used in the liquid crystal of the transmission-main transflective type.

In this manner, in the present embodiment, the TFT element substrate using 13% of the entire pixel area for the transmission display and 70% of the entire pixel area for the reflection display is produced as the TFT element substrate for the liquid crystal display of the reflection-main transflective type.

Compared with the ratio of the transmission display section 10 in the TFT element substrate of the liquid crystal display of the transmission-main transflective type, 13% is a relatively small value for the ratio of the transmission display section 10 in the TFT element substrate for the liquid crystal display of the reflection-main transflective type. However, in case of the liquid crystal display of the reflection-main transflective type using the TFT element substrate, if the transmission display is shown only when the display content can not be seen with reflection display alone, the ON time of the lighting device (back light) as the back light means is controlled. Consequently, the power consumption can be saved, thereby proving of the practical use of the present liquid crystal display.

Next, the following will explain the arrangement of the color filter substrate used in a combination with the TFT element substrate with reference to FIGS. 29(*a*) and 29(*b*).

As shown in these drawings, the color filter 61R for red (R), color filter 61G for green (G), and color filter 61B for blue (B) are provided on the glass substrate 62 in stripes in the same manner as the color filter substrate for the liquid crystal display of the transmission-main transflective type of FIGS. 26(*a*) and 26(*b*). A smoothing layer 501 made of transparent acrylic resin is formed on the glass substrate 62 on the surface where the color filters 61R, 61G, and 61B are formed to cover the same. Also, a ITO film is sputtered on the smoothing layer 501, using a blocking mask covering non-specified portions, to serve as a counter electrode 502 for the pixel electrode 18 of the TFT element substrate. Note that, however, the color filter substrate for the liquid crystal display of the reflection-main transflective type of FIGS. 29(*a*) and 29(*b*) is different from the one used for the liquid crystal display of the transmission-main transflective type of FIGS. 26(a) and 26(b) in planar shapes and spectral transmittance in each color.

To be more specific, on the color filter substrate of the liquid crystal display of the reflection-main transflective type, the color filters 61R, 61G, and 61B (color layer) are formed to cover the reflection display section 9 on the TFT element substrate entirely, and these color filters 61R, 61G, and 61B are made to attain high brightness to allow the display light to attain satisfactory brightness after having passed through the color filters 61R, 61G, and 61B twice, because the display light passes through the color filters 61R, 61G, and 61B twice in the reflection display section 9.

For this reason, satisfactory reflection display can be shown in the reflection display section 9 by means of a combination of a TFT element substrate having the reflection display section 9 in a large ratio, and a corresponding color filter substrate suited to reflection display.

Further, in the transmission display section 10, the transmission display opening 19a is small, but the display content can also be seen during the transmission display, which is used only when the ambient light is not sufficiently strong by suing the lighting device (back light) as the back lighting means. This is the difference that distinguishes the liquid crystal display of the reflection-main transflective type of the present embodiment from a conventional liquid crystal display of the reflection type. With the liquid crystal display of the reflection-main transflective type of the present embodiment, when the transmission display is shown by the color filters 61R, 61G, and 61B adjusted suitably for the reflection display, the chroma is not satisfactory but the display colors can be confirmed.

Thus, in case that the above liquid crystal display of the reflection-main transflective type shows the color display, it is effective to use an arrangement whereby the color filters 61R, 61G, and 61B are provided to the reflection display section 9 to show the color display, and in the transmission display section 10, either the color filters 61R, 61G, and 61B are not provided or color filters 61R, 61G, and 61B having chroma at least as good as the chroma of those provided to the reflection display section 9 are provided partially.

As has been discussed, the liquid crystal display of the reflection-main transflective type can be arranged in such a manner that the color filters 61R, 61G, and 61B are provided at least to the reflection display section 9, and the transmission display section 10 has a portion where the color filters 61R, 61G, and 61B are not provided, or the color filters 61R, 61G, and 61B are not provided to the transmission display section 10, so that it shows the monochrome display. In the latter case, the transmission display section 10 can be made smaller because the light transmittance increases. Consequently, a larger area can be secured as the reflection display section 9, and more satisfactory display can be obtained in the normal reflection display.

In this case, like in the liquid crystal display of the transmission-main transflective type, the area of the portion of the display section where the color display is not shown, that is, the area of the portion of the transmission display section 10 that does not show the color display, may be changed for each of the RGB pixels in accordance with the Y value of each color of the color filters 61R, 61G, and 61B. In other words, each substrate may be produced in such a manner that the ratio of the transmission display area for each of the RGB pixels is changed, so that the contribution of monochrome display of the transmission display section 10 to the brightness in each of the RGB pixels is set adequately by taking the luminous transmittance into consideration.

On the other hand, although the power consumption increases for turning ON the lighting device (back light) as the back light means, vivid color filters suitable for the transmission display in the transmission display section 10 can be used by brightening the light emanated from the lighting device (back light) sufficiently. In this case, not only the chroma, but also the color reproduction of the transmitted light can be secured. In any case, it is very important to keep the lighting device (back light) turned OFF as much as possible to save the power consumption.

As has been explained, according to the present embodiment, it has become possible to provide a liquid crystal display of the reflection-main transflective type which can save the power consumption during normal use, and prevent washout in the reflection display section 9, while showing the transmission display using the back light means (back light) when occasion demands.

In the above explanation, the TFT element 21 is used as the switching element in the active matrix method, and an amorphous silicon TFT element of the bottom gate type is used as an example of the TFT element 21. However, the switching element of the present embodiment is not limited to the above disclosure, and may be a polysilicon TFT element, or an MIM (Metal Insulator Metal) element known as a 2-terminal element, for example. Also, it should be appreciated that these active elements are not necessarily used, and can be omitted, as the case may be.

As has been explained, in each liquid crystal display of the present embodiment, the thickness of the liquid crystal layer can be changed in the reflection display section 9 and transmission display section 10 by a film thickness of the organic insulation film 25 by employing the TFT element substrate, in which the driving electrode 19 serving as the display electrode is separated from the lines 23 and 24 by the organic insulation film 25. Moreover, in each liquid crystal display of the present embodiment, even when a thickness of the organic insulation film 25 is as thin as 3 m (at which a high capacitor display is allowed based on the line resistance and parasitic capacitor of the TFT element substrate), a difference in liquid crystal layer thickness sufficient to realize satisfactory display on both the reflection display section 9 and transmission display section 10 (as has been discussed Embodiments 1 and 2) can be secured.

Thus, a liquid crystal display capable of showing high capacitor display can be provided by employing the TFT element substrate arranged in the manner illustrated in FIG. 23(a) or 28 and adopting the liquid crystal display method described in Embodiment 1 or 2.

Further, since the TFT element substrate using the above-mentioned organic insulation film 25 has been applied in part to the liquid crystal displays for the transmission display alone adopting the normal TFT element driving method, the above TFT element substrate has fewer technical problems for the mass production, thereby proving of its high probabilities for the practical application.

The inventors of the present invention have been carrying out an assiduous study on the production of a reflection film rendering satisfactory reflection properties by smooth protrusion and depressions provided thereon to prevent the display surface from turning into a specular reflector in the liquid crystal display of the reflection type. They discovered that a similar surface with the protrusion and depressions can be formed on the organic insulation film 25 used in the present invention. Accordingly, the TFT element substrate for the liquid crystal display of the transmission-main transflective type of FIGS. 23(a) through 27 is furnished with the protrusions and depressions in a portion corresponding to the reflection display section 9.

As has been explained, the present embodiment includes the liquid crystal display of the transmission-main transflective type and the reflection-main transflective type, and a ratio of the display surfaces of the transmission display section and reflection display section, colors of the color filters in case of color display, etc. are changed depending on whether the display is mainly shown by the transmission display or reflection display.

Next, a ratio of the transmission display section and reflection display section in the liquid crystal display of the present invention will be explained in Embodiment 8 below.

Embodiment 8

A ratio between the respective areas of the transmission display section and reflection display section must be set by taking the visibility into consideration. Stevens et al. ("Brightness Function: Effect of Adaptation", *Journal of the Optical Society of America*, Vol. 53, No. 3, page 375) investigates the brightness perceived visually (perceived brightness), giving consideration the adaptation of human vision. According to this publication, even when a human is seeing objects with the same luminance, the perceived brightness depends on the brightness to which he is currently adapted, and there has been established a quantitative relation therebetween.

Figure 30:
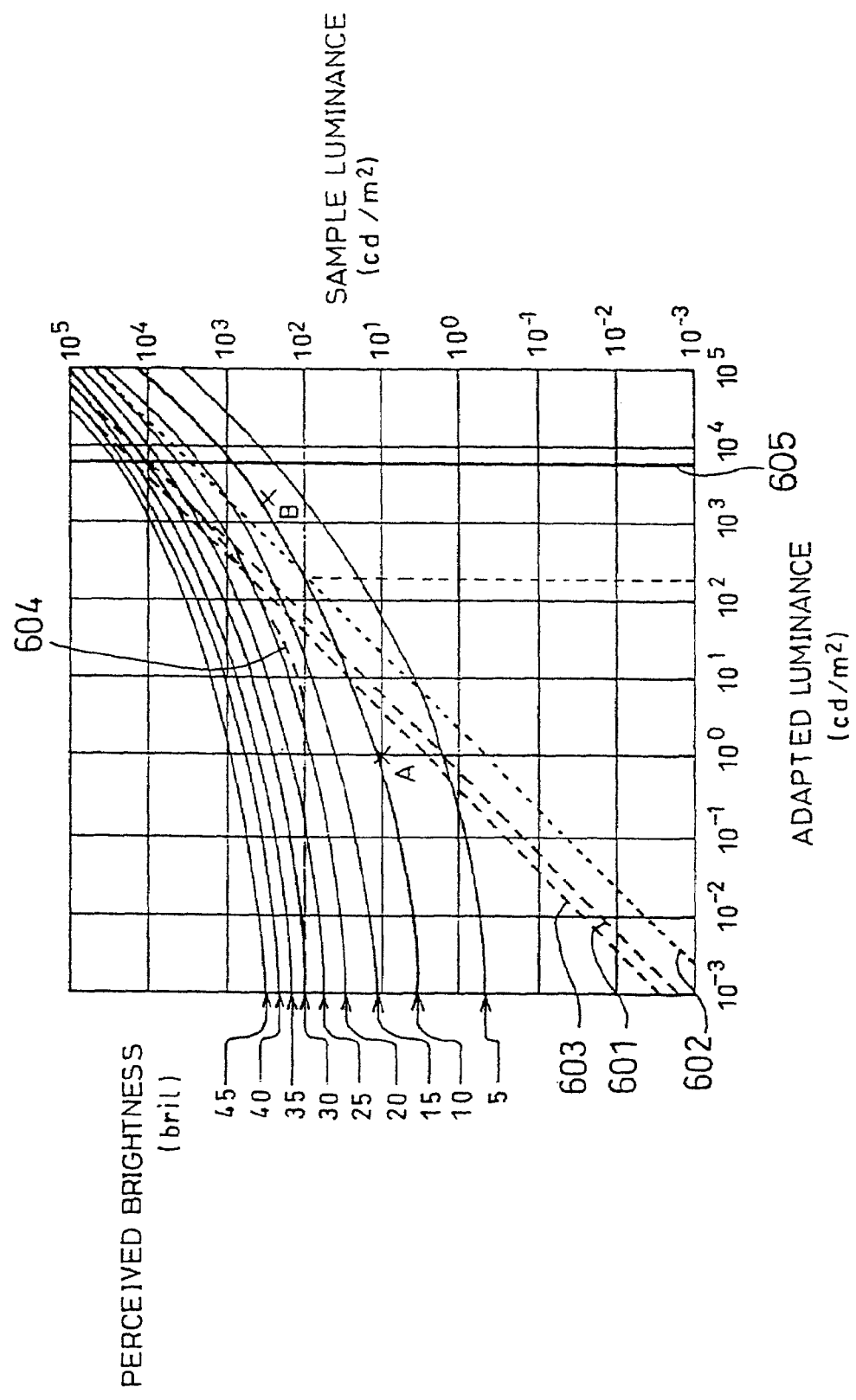
FIG. 30 is a contour plot showing a relation of adapted luminance which imparts perceived brightness of an equivalent value versus sample luminance.

FIG. 30 shows a relation of the adapted brightness for providing the perceived brightness values ranging from 5 brils to 45 brils versus the sample luminance, which was prepared based on the study of Stevens et al. expressed in different units. In the drawing, the horizontal axis represents the adapted luminance (unit: $cd/m^2$) to which a viewer of the sample is adapted, and the vertical axis represents the luminance (unit: $cd/m^2$) of the sample (sample luminance) presented to the viewer.

In the drawing, a point A represents the perceived brightness when a viewer adapted to the adapted luminance of 1 $cd/m^2$ observes a sample having a surface at the luminance of 10 $cd/m^2$, and a point B represents the perceived brightness when a viewer adapted to an adapted luminance of 1700 $cd/m^2$ observes a sample having a surface at the luminance of 300 $cd/m^2$. FIG. 30 reveals that, given the fact that the perceived brightness on both the points A and B shows the same value (9.4 brils), the brightness perceived by human is affected not only by the luminance of the display surface, but also by the adapted luminance.

Next, the adaptation of the viewer of the display surface of a liquid crystal display will be discussed.

To begin with, the object to which the viewer adapts will be discussed. When a human observes a particular object and adapts to its brightness, he adapts to the luminance on the surface of the visible object in the visual surroundings, which generally varies with the circumstantial conditions. However, it is very useful to take the adapted object into consideration as a kind of measure, that is, to consider the situation in which the observed object is assumed to be a surface reflecting the ambient light. This is because whether indoors or outdoors, a human more often adapts to reflection surfaces illuminated by a light source than to the light-emitting light source itself. In the following, the adaptation of the viewer who adapts one's vision to the object's reflection surface will be discussed.

In this case, the adapted luminance of FIG. 30 is represented by a value obtained by multiplying a predetermined value with the illuminance on the object surface to which the viewer adapts, lighted by an illuminating light source. Let L be the illuminance (unit: lux) and B be the luminance (unit: $cd/m^2$), then, the luminance (B) on a surface having a reflectance ratio R in the reference of the perfect reflecting diffuser surface is computed as: $B=LR/$. Herein, it is appropriate to use a surface of N5 on Munsell color standard known as having average reflectance for objects generally observed by humans, and to treat the adapted luminance as the luminance of the surface of the N5 on Munsell color standard lighted by predetermined illuminance. In this case, R is 0.2.

Further, assume that the illuminance light source lighting the surface of N5 on Munsell color standard as the representative of the observed object also lights the surface of a sample object whose perceived brightness is evaluated under the adapted conditions. By the above assumption, the perceived brightness of the reflection display section when the viewer is observing the liquid crystal display can be linked to the illuminance at which the liquid crystal is lighted through the adapted luminance. Consequently, specific reflectance or ratio of the area of the reflection display section can be selected based on the data obtained from the psycho-physical experiments.

As the result of the study of the inventors of the present invention, a specific standard for perceived brightness can be expressed as the brightness values set forth in Table 9 below. The inventors reproduced several combinations of the adapted luminance and sample luminance, and discovered that the brightness expression set forth in Table 9 below is appropriate. Table 9 can be used as the reference when setting the reflection display section based on the perceived brightness.

TABLE 9

| PERCEIVED BRIGHTNESS (UNIT: brils) | |
|---|---|
| 0 £ PB < 5 | TOO DARK TO SEE |
| 5 £ PB < 10 | DARK |
| 10 £ PB < 20 | NORMAL |
| 20 £ PB < 30 | BRIGHT AND GOOD OBSERVATION |
| 30 £ PB | TOO BRIGHT |

Here, typical reflectance (R) of the liquid crystal display of the reflection type is about 30% in the polarization plate method. Thus, the operation of the liquid crystal display of the transflective type of the present invention will be explained using the above specific value.

A straight line 601 of FIG. 30 indicates the display operation of the liquid crystal display having the reflectance of 30%. In other words, let L (unit: lux) be the illuminance of the illuminance light source lighting the luminance surface to which the viewer adapts, then the adapted luminance by the surface of N5 on Munsell color standard is computed as 0.2L/, because the reflectance (R=20%) of the surface of N5 on Munsell color standard varies with the luminance (L/) of the perfect reflecting diffuser surface lighted by the same illuminance light source. Likewise, the luminance on the display surface of the liquid crystal display (sample object) having the reflectance of 30% when lighted by the same illuminance light source can be computed as: 0.3L/. In other words, the straight line 601 is obtained by plotting the varying illuminance (L) on the points which satisfy a relation established between the horizontal axis of 0.2L/ and the vertical axis of 0.3L/. As in the case of using the liquid crystal display having the reflectance of 30% as the sample object, a straight line 602 is obtained by plotting the varying illuminance (L) on the points which satisfy a relation established between the horizontal axis of 0.2L/and the vertical axis of 0.1L/.

Next, the usable circumstances of the above liquid crystal display having the reflectance of 30% will be discussed in the following. The adapted luminance by the surface of N5 on Munsell color standard at the illuminance (about 100,000 lux) of direct sunlight in fair weather, which is the brightest illuminating conditions a human can experience in normal life, is about 6000 cd/m$^2$. Here, as shown in FIG. 30, the perceived brightness on the display surface of the liquid crystal display having the reflectance of 30% is the intersection of the straight line 602 and a straight line 605 indicating the adaptive luminance of 6000 cd/m$^2$, or approximately 30 brils, which is as shown in Table 9 above, is too bright. For this reason, the perceived brightness at lower illuminance is below the value of the above perceived brightness. Hence, the illuminance capable of securing a perceived brightness of 10 brils is about 450 lux (found by calculating backward from the corresponding adapted luminance using the above equation). In other words, when light display having brightness between 10 brils and 30 brils inclusive is necessary, the illuminance is 450 lux at the minimum and 100,000 lux at the maximum. Thus, the above liquid crystal display can be used outdoors during normal day time or in interiors having illuminance of 450 lux or above (for example, in a room lighted by a light of 450 lux or above), but when used in a darker place, the illuminance is too low to enable the viewer to perceive the display.

A relation of the adapted luminance versus the sample luminance when the reflectance is 50% is shown as a straight line 603 in FIG. 30. As can be understood from the straight line 603, when the reflective display is shown at the reflectance of 50% or above as with normal white paper, the perceived brightness exceeds 30 brils under the high illuminance circumstances of 1800 lux or above (for example, a bright interior near the window, or under direct sunlight). Under these circumstances, the viewer feels the white paper is too bright. Thus, it is not appropriate to use the display surface having the reflectance of 50% or above under the high illuminance circumstance from the standpoint of the visibility, and it can be understood that preferable reflectance of the display surface (luminance surface) for the reflection display used under these circumstances is 30% or so.

On the other hand, in the reflection display at the reflectance of 30% and the reflection display at the reflectance of 10% respectively shown as the straight lines 601 and 602, the illuminance which can give the perceived brightness of 10 brils is about 450 lux and 3000 lux, respectively. In other words, when the reflectance decreases to one third, the illuminance 6.7 times brighter is necessary. This means that, if the illuminance is increased because the reflectance of the liquid crystal display decreases, the eyes of the human adapt to a bright reflective object other than the liquid crystal display, and the illumination must be raised more than the reciprocal of a changing ratio of the reflectance.

Further, as can be understood from FIG. 30, there is a problem that the viewer feels that the display on a display body (for example, a typical display of the illuminance type) having predetermined luminance is very dark when the surroundings are bright.

However, the liquid crystal display of the transflective type of the present invention uses for display a sum of a predetermined luminance determined by the back light and the transmittance in the transmission display section, and an luminance (sample luminance) determined by predetermined reflectance in the reflection display section. In other words, in the liquid crystal display of the transflective type of the present invention, the display at the display luminance indicated by a curve 604 in FIG. 30 can be realized, for example. As indicated by the curve 604, in the liquid crystal display of the transflective type of the present invention, the visibility is secured by the reflection display when the illuminance is high, while the visibility is secured by the transmission display using the lighting device (back light) as the back light means when the illumination is low.

Figure 31:
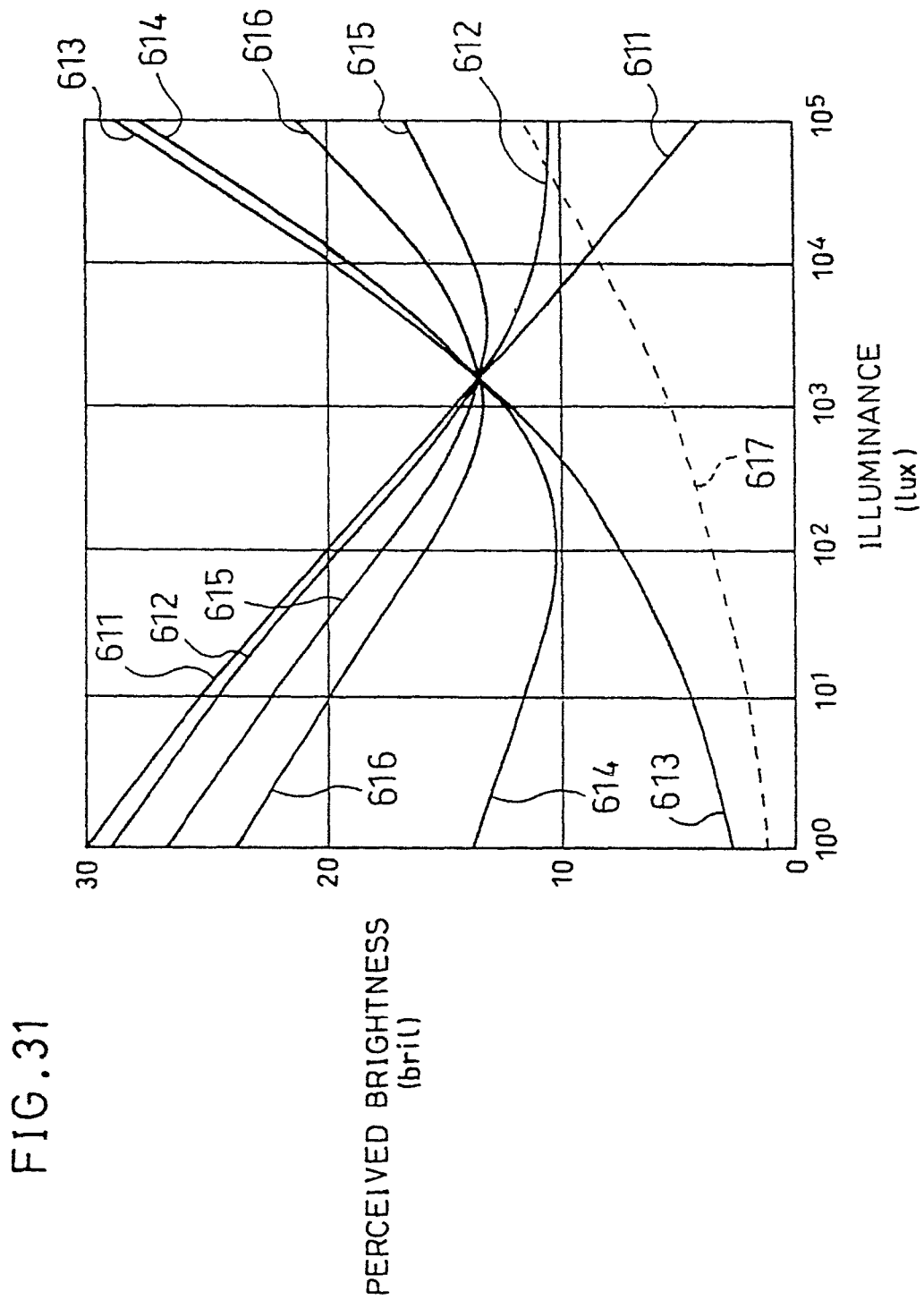
FIG. 31 is a view showing characteristics of a relation of illuminance versus perceived brightness in a liquid crystal display of the transflective type in accordance with Embodiment 8 of the present invention.

Next, the perceived brightness was checked when changing the illuminance using the surface luminance of the above liquid crystal display of the transflective type, the result of which is set forth in FIG. 31. Also, relations of the illuminance versus the perceived brightness in the liquid crystal displays of the transmission type and reflectance type are respectively set forth in FIG. 31 for comparison. Here, the conditions for computing the perceived brightness are: the reflectance is 30% when the entire display area is used for the reflection display of color; the transmittance is 7.5% when the entire display area is used for the transmission display; the luminance of the back light is 2000 cd/m$^2$; the illuminance of the surface to which the viewer is adapted is equal to the illuminance of the display surface of the liquid crystal display of color; and the reflectance of the adapted object surface is assumed to be 20% based on the brightness of N5 on Munsell color standard.

In FIG. 31, a value of the perceived brightness when the illuminance is varied depends on a ratio (Sr) of the reflection display section in the displayable area on the liquid crystal display of the transflective type. A curve 611 shows a relation of the illuminance versus perceived brightness when the normal liquid crystal display of the transmission type shows the transmission display alone, that is when Sr=0. The luminance on the display surface of the liquid crystal display of the transmission type is 150 cd/m$^2$, and when the illuminance is 6000 lux or above, the perceived brightness is 10 brils or below. Thus, to secure the perceived brightness of 10 brils or above by changing a part of the transmission display section to the reflection display section, as is indicated by the curve 612, Sr=0.1, that is $\frac{1}{10}$ of the displayable area should be used as the reflection display section.

A curve 613 shows a relation of the illuminance versus the perceived brightness of the liquid crystal display of the reflection type which shows the reflection display alone, that is, Sr=1. The reflectance of the display surface on the liquid crystal display of the reflection type is 30% compared with a perfect reflecting diffuser surface, and when the illuminance is 450 lux or below, the perceived brightness is 10 brils or below. Thus, to secure the perceived brightness of 10 brils or above by changing a part of the reflection display section to the transmission display section, as is indicated by the curve 614, Sr=0.9, that is, $\frac{1}{10}$ of the displayable area should be used as the transmission display section.

Also, as can be understood from FIG. 31, when Sr is in a range between 0.1 and 0.9, satisfactory display with the perceived brightness of 10 brils or above and less than 30 brils can be shown. When Sr is set to 0.30 (curve 615) or 0.50 (curve 616), satisfactory light display with the perceived brightness of 20 brils or above and less than 30 brils can be shown.

Also, surface reflection occurs on the surface of liquid crystal displays. The surface reflection interferes with the display more markedly as the illuminance of the surrounding rises. In FIG. 31, a relation of the perceived brightness and illuminance caused by the surface reflection is shown (curve 617). Though the surface reflection is affected considerably by the finish of the surface, the curve 617 shows the relation of the perceived brightness form the surface refection versus illuminance in case that the surface reflection caused at the interface between air and a medium having a refractive index of 1.5 has the same diffusing abilities as a perfect diffuse surface (that is, when the reflectance by surface reflection is 4%). Thus, when the surface reflectance is taken into consideration, in order to obtain satisfactory display, it is preferable if an area of the reflection display section accounts for 30% or above (that is, Sr>0.3) of a total of areas of the reflection display section and transmission display section.

According to the above analysis, it is understood that, satisfactory color display can be shown both in the reflection display section and transmission display section of the liquid crystal of the present embodiment when the area of reflection display section accounts for 30% or above and 90% or below of a total of the areas of the reflection display section and transmission display section.

A ratio of each display section for showing satisfactory display can be analyzed in the above manner even when at least one of the reflection display and transmission display is not used for the color display. However, in any case, the satisfactory display can be realized when a ratio of the area of the reflection display section in a total of areas of the reflection display section and transmission display section is in the above specified range. The liquid crystal displays of the transmission-main transflective type and the reflection-main transflective type of Example 7 are assembled using a preferable ratio in the above specified range.

Embodiment 9

In the present embodiment, an active matrix liquid crystal display adopting the liquid crystal display method described in Embodiments 1 and 2, to be more specific, a liquid crystal display for showing the color display using the TFT element substrate, will be explained by way of examples for purposes of explanation only, without any intention as a definition of the limits of the invention.

A procedure for assembling the active matrix liquid crystal display of the present embodiment is composed of a process of producing the TFT element substrate; a process of producing the color filter substrate; a process of producing a liquid crystal cell for filling using the TFT element substrate and color filter substrate; and a process of assembling the liquid crystal display by filling the liquid crystal into the liquid crystal cell for filling obtained in the preceding process.

Thus, the manufacturing method of the active matrix liquid crystal display of each example below in the present embodiment will be explained from the process of producing the TFT element substrate, to begin with.

As shown in FIGS. 23(a) through 25, the TFT element substrate is composed of a light transmitting substrate 29 on which is formed a TFT element 21 for each pixel by the following steps.

Here, a glass substrate made of a substance having no alkali contents, such as non-alkali glass, is used as the substrate 29 on which the TFT elements 21 are formed. In the first place, a film of tantalum is sputtered on the substrate 29, which will be made into the line 23 as the gate line and the storage capacitor line 27 by patterning. The line 23 and storage capacitor line 27 are patterned in such a manner as to have gradual step in each (line 23 and storage capacitor line 27), so that they can be covered satisfactorily with the line 24 formed thereon in the later stage to prevent line disconnection.

Further, a layer of tantalum oxide ($Ta_2O_5$) is formed over the line 23 and storage capacitor line 27 by the anodic oxidation process, over which a film of silicon nitride which will serve as a gate insulation film is formed. Then, a layer of hydrogenated amorphous silicon as an intrinsic semiconductor layer (i layer) which will be made into a switching region of the TFT element 21 and a layer of silicon nitride as an etching stopper layer are formed in this order by the CVD (Chemical Vapor Deposition) method using monosilane gas and sputtering (silicon nitride), respectively. Then, the top layer (silicon nitride layer) is patterned as the etching stopper layer, after which an $n^+$ layer, which will be made into the source terminal 28 and drain terminal 22 of the TFT element 21, is formed by the CVD method using a monosilane gas mixed with a phosphine gas. Subsequently, the $n^+$ layer and i layer are patterned, and further, the gate insulation film is patterned. Here, silicon nitride on the connection terminal portion on the line 23 (gate line) outside the display region is removed.

Next, a film of ITO, which will be made into the transparent pixel electrode 20, is sputtered in such a manner as to touch the source terminal 28 and drain terminal 22, and a film of tantalum, which will be made into the line 24 as the source line, is sputtered. The tantalum film is patterned into the line 24, and the ITO film formed beneath the tantalum film is patterned into the transparent pixel electrode 20. As previously mentioned, the transparent pixel electrode 20 is connected to the source terminal 28 and drain terminal 22, and it also forms ohmic contact between these terminals (source terminal 28 and drain terminal 22) and the lines 23 and 24.

Next, the organic insulation film 25 having the protrusions and depressions on the surface is formed on the TFT element 21 as the insulation film of the reflection display section. Then, a film of aluminum, which will be made into the driving electrode 19 of the reflection display section 9, is sputtered in such a manner as to touch the transparent pixel electrode 20 at a contact hole formed through the organic insulation film 25 to serve as the transmission display opening. Subsequently, the aluminum film is patterned by means of the dry etching, whereby the driving electrode 19 serving as the reflective electrode on which are provided the same protrusions and depressions as those on the surface of the organic insulation film 25 is formed.

In each of the above patterning steps, each component is formed into a necessary shape based on a design, by means of the photolithographic technique. In the photolithographic steps, the steps of coating and drying photosensitive resin (resist), irradiating the pattern, developing, baking and curing the resist, dry etching, wet etching, removing the resist, etc. are combined.

The protrusions and depressions are formed in the reflection display section 9 by applying an insulation photopolymeric resin material thereon and subjecting the same successively to the pattern irradiating step, developing step, and curing step. In other words, a dot pattern is formed in the developing step, and a smoothing layer is formed on the dot pattern out of the same material. Here, the organic insulation layer 25 is not formed in the transmission display section 10.

The TFT element 21 is provided to each pixel in the TFT element substrate produced in the above steps, and each pixel is composed of the refection display section 9 and transmission display section 10. Here, two types of TFT element substrate are produced: the TFT element substrate of FIG. 23(a) and the TFT element substrate of FIG. 28, and a ratio of the transmission display section 10 and reflection display section 9 in each type is set as described in Embodiment 7.

Next, the procedure of producing the color filter substrate will be explained. This procedure is composed of a step of producing the RGB color layers (color filters) on the substrate, a step of forming a smoothing layer on the color filters, and a step of forming a counter electrode to the transparent pixel electrode 20 formed on the TFT element substrate driven by the TFT element 21.

Figure 29A:
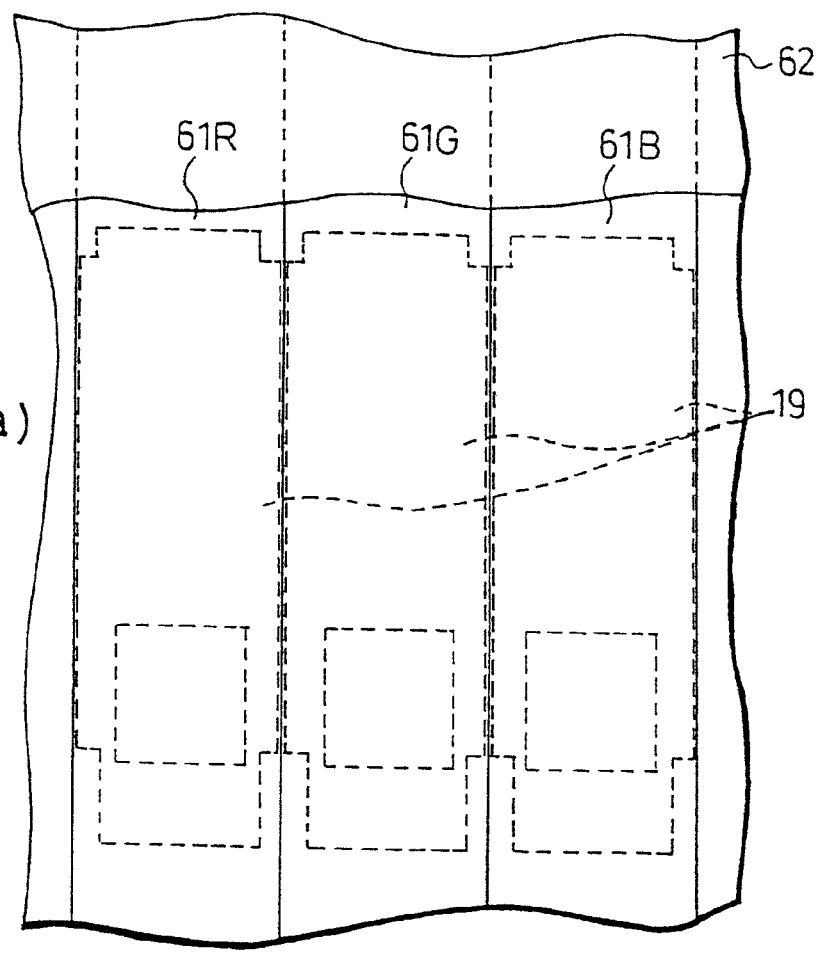
FIG. 29(a) is a plan view showing a major portion of the liquid crystal display of the reflection-main transflective type in accordance with Embodiment 7 of the present invention, and it is a partial cutaway view of a color filter substrate showing an alignment of color filters formed on the color filter substrate used in the above liquid crystal display of the reflection-main transflective type with respect to a transmission display opening of a driving electrode formed in the reflection display section on the TFT element substrate of FIG. 28.
Figure 29B:
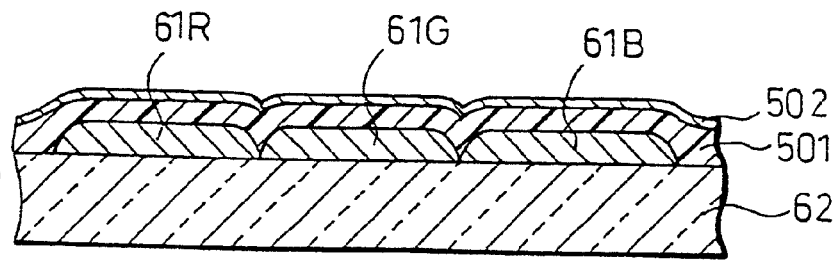
FIG. 29(b) is a cross section of the color filter substrate of FIG. 29(a)

In the present embodiment, as shown in FIG. 26(b) or FIG. 29(b), the color filter 61R for red (R), color filter 61G for green (G), and color filter 61B for blue (B) are formed on the glass substrate 62 in stripes. Then, a smoothing layer 501 is formed on the glass substrate 62 on the surface where the color filters 61R, 61G, and 61B are formed to cover the same, and the counter electrode 502 is formed on the smoothing layer 501, whereby the color filter substrate is formed.

During the step of forming the color filter substrate, the color filters 61R, 61G, and 61B are formed by using photolithography to pattern a resin material prepared by dispersing the pigment in photosensitive resin. The method of producing the color filters 61R, 61G, and 61B is not limited to the above method using the dispersed pigment, and for example, the electro-deposition method, film transfer method, and dying process can be adopted as well.

The smoothing layer 501 is formed by applying acrylate resin having high light transmittance on the glass substrate 62 on the surface where the color filters 61R, 61G, and 61B are formed, and curing the same by heat. The counter electrode 502 formed on the smoothing layer 501 is a counter electrode opposing the pixel electrode 18 driven by the TFT element 21, and is formed as a transparent electrode by sputtering layers of ITO with masking and shaping the resulting deposit of the ITO layers into a planar shape.

In the present embodiment, two types of color filter substrates are formed: the color filter substrate having high chroma for the transmission display, and the color filter substrate having high brightness for the reflection display. The former is patterned as shown in FIGS. 26(a) and 26(b), and the latter is patterned as shown in FIGS. 29(a) and 29(b).

Next, the step of producing the liquid crystal cell for filling by placing the TFT element substrate and color filter substrate to oppose each other to assemble the liquid crystal layer will be explained.

In this step, alignment films are formed on the TFT element substrate and color filter substrate on their respective opposing surfaces (the surface where the TFT element 21 is formed on the TFT element substrate and the surface where the color filters 61R, 61G, and 61B are formed on the color filter substrate) by applying a soluble polyimide solution in the liquid crystal display area by the offset printing method, and subjecting the same to the drying and baking steps. Further, the alignment treatment, which determines the alignment direction of the liquid crystal, is applied to these alignment films by means of rubbing. Whether the parallel aligning alignment films or perpendicular aligning films are used depends on each example.

Subsequently, spherical spacers of the uniform particle size are scattered on one of the TFT element substrate and color filter substrate treated in the above manner, and a sealing agent for sealing the liquid crystal layer in a space between the TFT element substrate and color filter substrate and fixing these substrates is printed to the other substrate. Meanwhile, conductive paste is provided to let the current flow from the TFT element substrate side to the counter electrode 502 on the color filter substrate.

Then, the TFT element substrate and color filter substrate are placed to oppose each other with surface provided with the TFT element 21 and the surface provided with the color filters 61R, 61G, and 61B inside, and after the positions of these substrates are aligned with respect to each other, the sealing agent and conductive paste are cured under applied pressure.

By the above procedure and steps, the mother glass substrate 21 containing a plurality of the liquid crystal cells for filling is produced, and the filling cells are produced by cutting the mother glass substrate 21.

Later, the liquid crystal composition is introduced into the liquid crystal cell by means of vacuum injection, and photopolymeric resin is applied at the inlet of the liquid crystal and cured through polymerization upon irradiation of UV rays, so that the liquid crystal layer filled therein will not be exposed to air, whereby the liquid crystal cell is produced.

Then, a short-ring portion, provided at the end portion of the TFT element substrate to short-circuit the line terminals to prevent the electrostatic breakdown of the TFT element 21, is removed to connect the TFT element 21 to an external circuit for driving the TFT element 21. Further, the back light serving as the light source for the transmission display is provided, whereby the active matrix liquid crystal display of the present embodiment is assembled.

EXAMPLE 14

The active matrix liquid crystal display of the present example is a liquid crystal display of the transmission-main transflective type adopting the GH method, which uses for display the same GH method as that used in the liquid crystal display of Example 1 in Embodiment 1.

The liquid crystal composition used in the present example is prepared in the same manner as Example 1 in Embodiment 1. In other words, the liquid crystal composition using the dichroic dye (dichroic dye 12) used in Example 1 is used herein too. Also, in the present example, vertical aligning alignment films which align the liquid crystal perpendicular to the display surface are used, and the alignment treatment is applied to these alignment films in such a manner as to obtain uniform vertical alignment. In the present example, neither the phase difference compensation plates nor polarization plates are laminated to the liquid crystal cell, because the GH method using the dichroic dye as the liquid crystal composition is adopted.

In the present example, since the transmission display is mainly used, the color filters 61R, 61G, and 61B are designed to have chroma as high as that in the conventional transmission display method, and the color filter substrate is placed as shown in FIGS. 26(a) and 26(b). The TFT element substrate laminated to the color filter substrate has a large transmission display opening 19a and a wide transmission display section 10, as shown in FIG. 23(a).

As shown in FIGS. 26(a) and 26(b), in the liquid crystal display of the present example, only a specific portion of the driving electrode 19 of the reflection display section 9 is covered with the color filters 61R, 61G, and 61B covering the transmission display opening 19a which will serve as the transmission display section 10 (a portion opposing the color filters 61R, 61G, and 61B in the extending direction thereof). The driving electrode 19 also has a display portion which has no color filter and thereby transmits white light.

A display signal was inputted into the liquid crystal display assembled in the above manner, and the liquid crystal display was observed visually. Then, it turned out that, with the liquid crystal display of the present example, the back light has to be turned ON. However, with the back light kept turned ON, the brightness and contrast ratio are both satisfactory, and satisfactory display is always shown thereon. Further, the display content can be observed visibly under direct light, and there occurs no wash-out.

In other words, in the present example, it has become possible to provide a high-resolution color liquid crystal display without causing wash-out nor parallax, which can attain high brightness by using the back light when the ambient light is weak, as does the conventional liquid crystal display, while enabling the user to observe the display content even when the ambient light is strong by changing the brightness of the reflection display section 9 in proportion to the ambient light. In addition, in the present example, very satisfactory reflection display having no parallax (double image) can be realized.

EXAMPLE 15

The active matrix liquid crystal display of the present example is a liquid crystal display of the reflection-main transflective type adopting the GH method, which uses for display the same GH method as that used in the liquid crystal display of Example 1 in Embodiment 1.

Like in Example 14, the liquid crystal composition used in the present example is prepared in the same manner as Example 1 in Embodiment 1. In other words, the liquid crystal composition containing the dichroic dye (dichroic dye 12) used in Example 1 is used herein too. Also, in the present example, vertical aligning alignment films which align the liquid crystal perpendicular to the display surface are used, and the alignment treatment is applied to these alignment films by means of rubbing in such a manner as to obtain uniform vertical alignment. In the present example, neither the phase difference compensation plates nor polarization plates are laminated to the liquid crystal cell, because the GH method using the dichroic dye as the liquid crystal composition is adopted.

In the present example, since the reflection display is mainly used, the color filters 61R, 61G, and 61B are designed to have brightness higher than that in the conventional liquid crystal display of the transmission type, and the color filter substrate is placed as shown in FIGS. 29(a) and 29(b). The TFT element substrate laminated to the color filter substrate has a small transmission display opening 19a and a wide reflection display section 9, as shown in FIG. 28.

A display signal was inputted into the liquid crystal display assembled in the above manner, and the liquid crystal display was observed visually. Then, it turned out that the present liquid crystal display can show the reflection display without turning ON the back light when used during the day time under indoor lighting or surrounding exterior light. In the present example, very satisfactory reflection display having no parallax (double image) can be realized. Also, the display content can be visually confirmed by turning ON the back light when the ambient light is too weak for the user to observe the display using reflected light alone.

To be more specific, in the present example, the color filters 61R, 61G, and 61B and the color filter substrate used are designed for the reflection transmission as previously mentioned, and thus the color display can be shown by the reflected light alone. Consequently, the present liquid crystal display can be used with the reflection display alone while keeping the back light turned OFF for the use in indoor lighting or outdoor during the day time. In addition, the visibility can be secured even when the lighting is too weak by turning ON the back light, as needed.

Unlike the conventional liquid crystal display of the transmission type, the back light does not have to be kept turned ON in the liquid crystal display of the present embodiment. Consequently, the present liquid crystal display can save the power consumption while causing no wash-out in the reflection display section 9; moreover, it can show the transmission display using the back light, as needed.

EXAMPLE 16

The active matrix liquid crystal display of the present example is a liquid crystal display of the transmission-main transflective type using the polarization converting function of the liquid crystal layer for the display, which uses for display the same polarization plate method as used in the liquid crystal display of Example 5 in Embodiment 2.

The liquid crystal composition used in the present example is prepared in the same manner as Example 5 in Embodiment 2. Herein, the phase difference compensation plates (phase difference compensation plates 16 and 17) and polarization plates (polarization plates 14 and 15) are laminated to the liquid crystal cell (TFT liquid crystal panel) in which is sealed the liquid crystal. Further, in the present example, the alignment treatment is applied to the parallel aligning alignment films by means of rubbing in such a manner as to form the crossed rubbing angle of 250.

Like in Example 14, in the present example, since the transmission display is mainly used, the color filters 61R, 61G, and 61B are designed to have the same transmission colors as those in the conventional transmission display method, and the color filter substrate is placed as shown in FIGS. 26(a) and 26(b). The TFT element substrate laminated to the color filter substrate has a large transmission display opening 19a and a wide transmission display section 10 as shown in FIG. 23(a).

As shown in FIGS. 26(a) and 26(b), in the liquid crystal display of the present example, only a specific portion of the driving electrode 19 in the reflection display section 9 is covered with the color filters 61R, 61G, and 61B covering the transmission display opening 19a which will serve as the transmission display section 10 (a portion opposing the color filters 61R, 61G, and 61B in the extending direction thereof). The reflection display section 9 also has a display portion which has no color filter and thereby reflects white light.

A display signal was inputted into the liquid crystal display assembled in the above manner, and the liquid crystal display was observed visually. Then, it turned out that, with the liquid crystal display of the present example, the back light has to be kept turned ON. However, with the back light kept turned ON, the brightness and contrast ratio are both satisfactory, and satisfactory display is always shown thereon. Further, the display content can be observed visibly under direct sunlight, and there occurs no wash-out.

In other words, in the present example, a liquid crystal display attaining high brightness by using the back light when the ambient light is weak, as does the conventional liquid crystal display of the transmission type is provided, and on the other hand, even when the ambient light is strong, the display content can be confirmed visually by changing the brightness of the reflection display section 9 in proportion to the ambient light, thereby eliminating the wash-out caused in the conventional display of the illuminance type or liquid crystal display of the transmission type. Further, in the present example, very satisfactory reflection display having no parallax (double image) can be realized.

EXAMPLE 17

The active matrix liquid crystal display of the present example is a liquid crystal display of the reflection-main transflective type using the polarization converting function of the liquid crystal layer for the display, which uses for display the same polarization plate method as that used in the liquid crystal display of Example 5 in Embodiment 2.

Like in Example 16, the liquid crystal composition used in the present example is prepared in the same manner as Example 5 in Embodiment 2. Herein, the phase difference compensation plates (phase difference compensation plates 16 and 17) and polarization plates (polarization plates 14 and 15) are laminated to the liquid crystal cell (TFT liquid crystal panel) in which is sealed the liquid crystal. Further, in the present example, the alignment treatment is applied to the parallel aligning alignment films by means of rubbing in such a manner as to form the crossed rubbing angle of 250.

Also, like in Example 15, since the reflection display is mainly used, the color filters 61R, 61G, and 61B are designed to have brightness higher than that in the conventional liquid crystal display of the transmission type, and the color filter substrate is placed as shown in FIGS. 29(a) and 29(b). The TFT element substrate laminated to the color filter substrate has a small transmission display opening 19a and a wide reflection display section 9 as shown in FIG. 28.

A display signal was inputted into the liquid crystal display assembled in the above manner, and the liquid crystal display was observed visually. Then, it turned out that the present liquid crystal display can show the reflection display without turning ON the back light when used during the day time under indoor lighting or surrounding exterior light. In the present example, very satisfactory reflection display having no parallax (double image) can be realized. Also, the display content can be visually confirmed by turning ON the back light when the ambient light is too weak for the user to observe the display using reflected light alone.

To be more specific, in the present example, the color filters 61R, 61G, and 61B and color filter substrate used are designed for the reflection display as previously mentioned, and thus the color display can be shown by the reflected light alone. Consequently, the present liquid crystal display can be used with the reflection display alone while keeping the back light turned OFF when used either in indoor lighting or outdoors during the day time. In addition, even when the lighting is too weak, the visibility can be secured by turning ON the back light, as needed.

Unlike the conventional liquid crystal display of the transmission type, the back light does not have to be kept turned ON in the liquid crystal display of the present embodiment. Consequently, the present liquid crystal display can save the power consumption while causing no wash-out in the reflection display section 9; moreover, it can show the transmission display using the back light, as needed.

As has been discussed by way of Examples 14 through 17, according to the present embodiment, a high-resolution active matrix liquid crystal display adopting the liquid crystal display method of Embodiment 1 or 2 can be realized.

In Examples 14 through 17, each liquid crystal display is assembled to have different thicknesses of the liquid crystal layer in the reflection display section 9 and transmission display section 10 by providing the organic insulation film 25 (equivalent to insulation film 11) on the active matrix substrate (TFT element substrate). However, it should be appreciated that the same effect can be attained when any other liquid crystal display principle of the present invention is adopted.

Embodiment 10

The present embodiment will explain how the luminance of the back light used in the liquid crystal display of the present invention is changed.

The luminance of the back light is changed mainly for the three following reasons.

A first purpose is to secure the visibility. As has been discussed in Embodiment 8, the perceived brightness perceived by a human is determined by the adapted luminance and the luminance of the display surface. Thus, to realize satisfactory display with satisfactory visibility, it is effective to change the luminance of the back light to the perceived brightness of human eyes in response to the adapted luminance. As described in Embodiment 8, it is preferable to change the luminance of the display surface by controlling the luminance of the back light in response to the adapted luminance, so that the perceived brightness is in a range from 10 brils inclusive to 30 brils exclusive. In short, the back light also serves as display surface luminance changing means. Consequently, the visibility can be improved when the transmission display is mainly responsible for the display. Here, a value of the perceived brightness specified in Embodiment 8 is set on the assumption that the luminance of the display surface is proportional to the adapted luminance to which the viewer has adapted. Thus, satisfactory display can be obtained only by changing the luminance of the back light in accordance with the perceived brightness.

A second purpose is to save the power consumption. There are cases where the visibility is not affected much whether the back light is turned ON or OFF. An example of such a case would be when a liquid crystal display of the transflective type is used where the ambient light lighting the liquid crystal display has sufficiently high illuminance, so that the luminance of the display surface is maintained mainly by the reflection display section. In this case, the luminance of the display surface may not be affected even if the luminance of the transmission display is high, and in such a case, it is preferable to turn OFF the back light to save the power consumption.

A third purpose is to furnish more than one function to the liquid crystal display by enabling the user to switch the color display to the monochrome display and vice versa by turning ON/OFF the back light, in cases where the color display is shown by either the reflection display or transmission display alone.

For example, when the reflection display section is not provided with the color filters, and shows the monochrome display alone, and the transmission display section alone is provided with the color filters to show the color display, the resolution of the reflection display can be set higher than in the transmission display section which displays one monochrome unit by a plurality of pixels using color filters. Consequently, the reflection display is high-resolution monochrome display, while the transmission display is color display with moderate resolution. Conversely, the color filters may be used for the reflection display alone. In this case, more than one function can be provided to the liquid crystal display. Consequently, it has become possible to change the display content significantly in response to the ON/OFF state by switching the color display to the monochrome display and vice versa or changing the illuminating colors by turning ON/OFF the back light.

As has been discussed above, the luminance of the back light can be controlled by an adequate signal in response to the intended use or use conditions. When the luminance of the back light is changed in response to the aforementioned adapted luminance, to improve the visibility, the luminance of the back light is controlled in response to the visual environment, such as the illuminance of the light incident on the display surface, and the kinds of the display adopted by the liquid crystal display.

When the luminance of the back light is controlled in response to the illuminance, it is preferable to control the ON/OFF state of the back light in the following manner. That is, the back light is turned OFF when the illuminance is high, whereas the back light is turned ON in a moderate state when the illuminance is low so as to avoid excessive brightness, and the back light is turned ON in a strong state when the illuminance is neither too high nor too low.

In this case, if the ON/OFF state of the back light or the luminance thereof are controlled by a signal from external devices or a timer connected to the liquid crystal cell or liquid crystal display, unnecessary power consumption can be saved.

Further, in controlling the luminance of the back light, if he back light is only turned ON when the user manipulates the apparatus including the liquid crystal display, or for a fixed period thereafter, the overall power consumption of the apparatus can be saved, and the user can be provided with display he feels to be satisfactory. The luminance of the back light may also be controlled by any other applicable signal besides the illuminance of the light incident on the display surface.

To achieve the above objects, it is very effective to allow the user to control the ON/OFF state of the back light or the luminance thereof, or the director configuration of the liquid crystal in the reflection display section and transmission display section by inputting a signal through a touch panel (pressed coordinate detecting type input means) layered on the display surface of the liquid crystal cell, or by controlling the luminance of the back light in association with some other signal giving a warning to the user. In this manner, a liquid crystal display with visibility and consuming less power can be provided by controlling the luminance of the display surface from the outside of the liquid crystal cell.

Embodiment 11

Explained in the present embodiment is a liquid crystal display of the present invention, provided with a touch panel (pressed coordination detecting type input means) as information input means, and used in a portable device, which is the field in which the liquid crystal display of the present invention is chiefly used. Hereinafter, like components are labeled with like reference numerals with respect to Embodiments 1 through 10, and, for ease of explanation, the description of these components is not repeated here.

Figure 32:
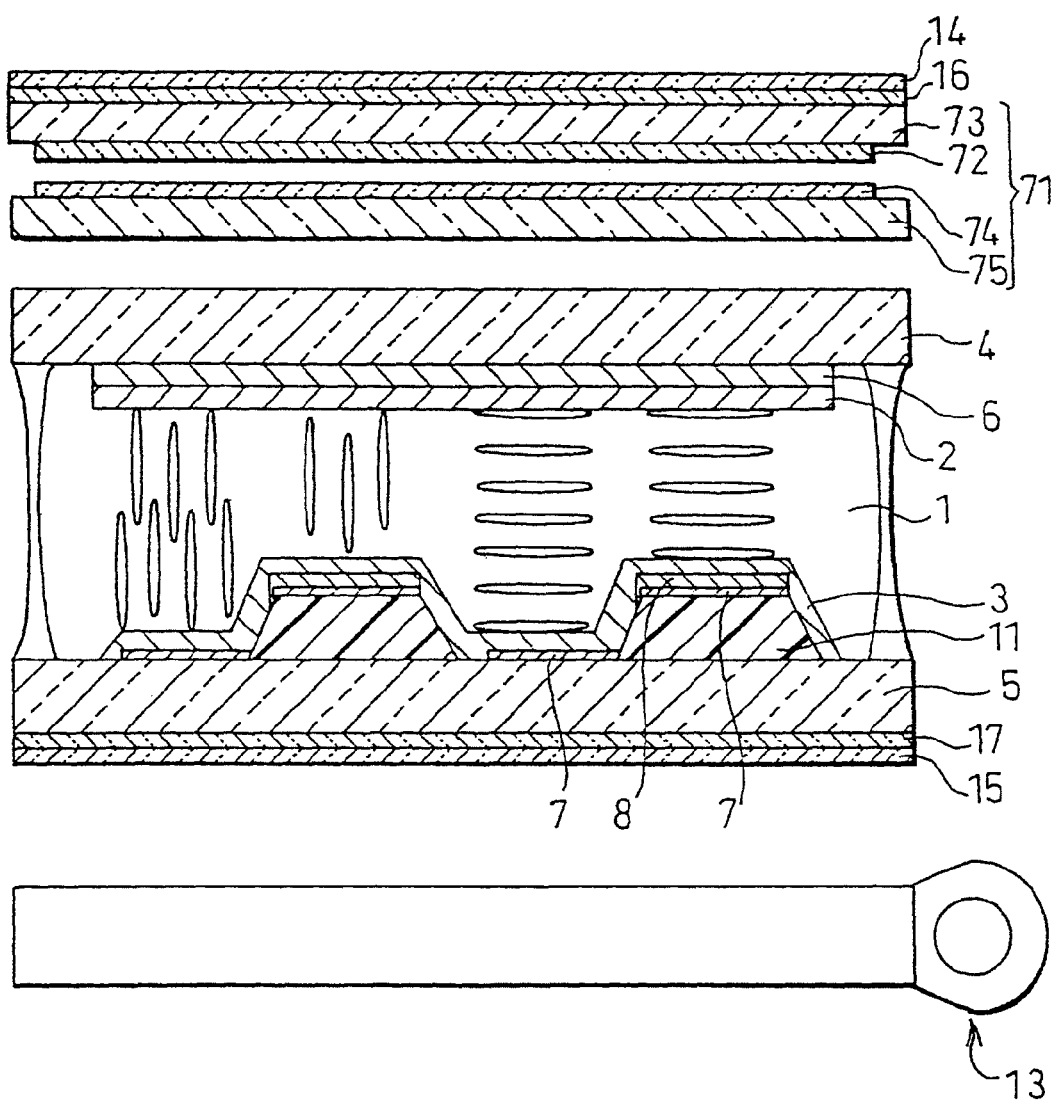
FIG. 32 is a cross section schematically showing an arrangement of a major portion of a liquid crystal display incorporating an input device in accordance with Embodiment 11 of the present invention.

In the present embodiment, a touch panel is attached to the liquid crystal display of Example 17 in Embodiment 9, whereby a liquid crystal display of the transmission type incorporating an input device is assembled, the arrangement of which is illustrated in FIG. 32. The basic arrangement of the liquid crystal display of the present embodiment, that is, the liquid crystal cell and back light 13, is identical with the arrangement of Example 17 in Embodiment 9 and Example 5 in Embodiment 2 except for the touch panel 71, and, for ease of explanation, the description of these components is not repeated here.

The touch panel 71 includes a flexible substrate 73 on which is formed a transparent electrode layer 72 and a supporting substrate 75 on which is formed a transparent electrode layer 74. The flexible substrate 73 and supporting substrate 75 are placed to oppose each other with their respective transparent electrode layers 72 and 74 inside, with spacers (not shown) maintaining a predetermined distance therebetween so that, when they are supplied with an electrical current, the transparent electrode layers 72 and 74 do not touch each other. According to this arrangement, the transparent electrode layer 72 formed on the flexible substrate 73 and the transparent electrode layer 74 formed on the supporting substrate 75 keep a space from each other under the normal state, and are allowed to touch each other at a position only when such a position on the flexible substrate 73 is specified (pressed) by a finger or a stylus. Accordingly, the touch panel 71 functions as an input device by detecting a position (coordinate position) where the transparent electrodes 72 and 74 touch each other by a pressing force applied on the flexible substrate 73.

The touch panel 71 is provided between the phase difference compensation plate 16 and substrate 4 of the liquid crystal cell by laminating the phase difference compensation plate 16 and polarization plate 14 on the flexible substrate 73, so that it forms an integral unit together with the phase difference compensation plate 16 and polarization plate 14. In the present embodiment, to attain the effect of the polarization plate of Example 17 by the polarization plate 14 laminated to the touch panel 71, both the flexible substrate 73 and supporting substrate 75 forming the touch panel 71 are made of a material having no birefringence.

In the present embodiment, a space is secured between the supporting substrate 75 of the touch panel 71 and the substrate 4 of the liquid crystal cell, so that the pressure applied on the touch panel 71 is not transferred to the liquid crystal cell without using a pressure damping member, whereby the touch panel 71 and substrate 4 of the liquid crystal cell can attain a pressure transfer preventing effect.

In the liquid crystal display incorporating the input device assembled in the above manner, the back light 13 can be turned OFF when the user does not observe the display and turned ON upon input of information into the touch panel 71 by changing the luminance of the back light 13 in response to signals from the touch panel. Consequently, the liquid crystal display of the present embodiment can show satisfactory display while saving the power consumption. In addition, according to the present embodiment, visibility can be improved by providing the polarization plate 14, touch panel 71, and liquid crystal cell in this order, because the polarization plate 14 also absorbs unwanted reflected light from the touch panel 71, thus reducing such unwanted reflected light.

As has been explained, a liquid crystal display of the present invention is arranged in such a manner as to comprise:

a liquid crystal display element having a pair of substrates, to which alignment members (alignment means), such as alignment films, are provided to their respective opposing surfaces, and a liquid crystal layer sandwiched by the pair of substrates;

alignment mechanism for providing at least two different director configurations simultaneously on different arbitrary regions used for display in the liquid crystal layer; and a reflecting member (reflecting means), such as a reflection film or a reflective electrode, provided to at least one of the different arbitrary regions showing different director configurations, wherein the different arbitrary regions showing different director configurations are used for a reflection display section for showing reflection display and a transmission display section for showing transmission display, respectively.

According to the above arrangement, the director configuration of the liquid crystal can take different director configurations simultaneously. Thus, for example, an amplitude of modulation in an opti-physical quantity, such as an amount of absorbed light (absorbance) when a light absorber like a dichroic dye is used for the display, and a phase difference when optical anisotropy is used for the display, can be changed separately in each region. Thus, according to the above arrangement, it is possible to obtain transmittance or reflectance based on an amplitude of modulation in an opti-physical quantity in response to the director configuration of the liquid crystal layer, thereby making it possible to set the transmission display section and transmission display section independently. Hence, according to the above arrangement, a high contrast ratio can be attained without causing parallax and the visibility can be improved when the surroundings are dark, while satisfactory visibility can be attained even when the ambient light is strong. Consequently, according to the above arrangement, it has become possible to provide a liquid crystal display of the transflective type, having excellent visibility, and capable of showing high-resolution display and using both the reflected light and transmitted light for the display.

One alignment mechanism which may be suitably used is display content overwriting means for overwriting a display content with an evolution of time. In this case, the display content overwriting means and the alignment mechanism are realized by a single means, so that the above liquid crystal display can be obtained without adding any additional members. It should be appreciated that, however, electrical liquid crystal alignment control means currently used extensively for overwriting the display content with an evolution of time, namely, any applicable means used for voltage application, such as electrodes, can be used as the display content overwriting means for realizing more than one state of director configuration of the liquid crystal. In this case, a plurality of regions having different director configurations can be provided in the liquid crystal layer by using different electrodes in the transmission display section and reflection display section, or changing the voltage itself in the transmission display section and reflection display section.

Also, in case that an amplitude of modulation in an opti-physical quantity, such as an amount of absorbed light and a phase difference caused by the optical anisotropy, is set independently in the reflection display section and transmission display section, even if the alignment direction of the liquid crystal obtained by the voltage application is substantially uniform across the region used for the display in the liquid crystal layer, in regions having different thicknesses of the liquid crystal layer, there can be offered the same effect as the one attained in the case where the alignment direction of the liquid crystal layer is changed. In particular, in the GH method (which uses a light absorber like a dichroic dye and makes use of light absorption) or the polarization plate method which makes use of birefringence or polarization rotation phenomenon), the phenomena, (such as light absorption or birefringence) occurring in the liquid crystal layer, are the phenomena that take place in association with the light propagation, and thus a relation is established between the distance of the light propagation in the liquid crystal layer and the degree of each phenomenon. Further, the display light passes through the liquid crystal layer twice in the reflection display section and only once in the transmission display section. Thus, when the director configuration of the liquid crystal is substantially the same in the reflection display section and transmission display section, neither sufficient brightness nor contrast ratio can be obtained if the thickness of the liquid crystal layer is the same in the reflection display section and transmission display section, thereby making it impossible to eliminate the above problems.

Therefore, a liquid crystal display of the present invention may be arranged in such a manner as to comprise a liquid crystal display element having a pair of substrates, to which alignment means are provided to their respective opposing surfaces, and a liquid crystal layer sandwiched by the pair of substrates, wherein:

a region used for display in the liquid crystal layer is composed of regions having at least two different thicknesses of the liquid crystal layer;

the regions having at least two different thicknesses are used for a reflection display section and a transmission display section, respectively;

reflecting means is provided at least to the reflection display section; and the thickness of the liquid crystal layer is thinner in the reflection display section than in the transmission display section.

According to the above arrangement, it is possible to obtain the transmittance or reflectance based on an amplitude of modulation in an opti-physical quantity in the regions having different thicknesses of the liquid crystal layer, thereby making it possible to set the transmission display section and transmission display section independently. Hence, according to the above arrangement, a high contrast ratio can be attained without causing parallax and the visibility can be improved when the surroundings are dark, while satisfactory visibility can be attained even when the ambient light is strong. Consequently, according to the above arrangement, it has become possible to provide a liquid crystal display of the transflective type, having excellent visibility and capable of showing high-resolution display and using both the reflected light and transmitted light for the display.

The above-arranged liquid crystal display of the present invention may be arranged in such a manner that, in order to provide at least two different director configurations simultaneously on different arbitrary regions used for display in the liquid crystal layer, an alignment means is provided in a region of the surface at least one of the substrates touching a region of the liquid crystal layer used for display, so as to impart at least two different director directions to an director configuration of the liquid crystal layer at an interface touching the region in which the alignment mechanism is provided.

Besides the above display content overwriting means, an alignment film provided on the substrate at the interface touching the liquid crystal, to which the alignment treatment is applied in such a manner as to impart at least two different directions of director to the director configuration of the liquid crystal layer at the interface touching to the same, can be used as the means for allowing the director configuration of the liquid crystal to take different director configurations simultaneously. By providing the alignment means in a region of the surface of the substrate touching the region of the liquid crystal layer used for display so as to impart at least two different director directions to the director configuration of the liquid crystal layer at the interface touching the region in which the alignment is provided, the liquid crystal layer can take at least two different director configurations simultaneously upon the voltage application at different arbitrary regions used for the display in the liquid crystal layer, and as a consequence, the reflection display and transmission display can be shown respectively in these regions having different director configurations in the liquid crystal layer.

In this case, the director configuration of the liquid crystal that determines the optical characteristics and a change of the alignment upon the voltage application can both be changed by modifying an angle of the director configuration of the liquid crystal layer with respect to the substrate or an orientation angle, thereby allowing each of the reflection display section and transmission display section to show adequate display thereon.

It is preferable that the liquid crystal display of present invention is arranged in such a manner that at least one of the pair of substrates includes an insulation film at least on the region corresponding to the reflection display section, the insulation film being thicker in the region corresponding to the reflection display section than in the region corresponding to the transmission display section.

In other words, it is preferable that the liquid crystal display of the present invention is arranged in such a manner that it includes an insulation film on one of the smooth substrates sandwiching the liquid crystal layer, and the insulation film is made thinner in a region corresponding to the transmission display section than in a region corresponding to the reflection display section, or the insulation film is formed on the region corresponding to the reflection display section alone, and not on the region corresponding to the transmission display section.

According to the above arrangement, a liquid crystal display having at least two different thicknesses of the liquid crystal layer in the region used for the display in the liquid crystal layer (that is, a liquid crystal display having different thicknesses of the liquid crystal layer in the reflection display section and transmission display section) can be readily obtained.

Also, the insulation film not only functions as the liquid crystal layer thickness adjusting means, but also applies a driving voltage to the liquid crystal layer without any loss by forming a display electrode on the surface touching the liquid crystal layer in the reflection display section.

In this case, a light-reflecting film is formed, as reflecting means, on the substrate placed to oppose the substrate of the display surface side, and protrusions and depressions are provided on the light-reflecting film. This arrangement is effective as specular reflection preventing means for the reflection display which impairs neither the resolution nor display ability of the transmission display section. If the insulation film is provided with the protrusions and depressions like those provided to the light-reflecting film, a light-reflecting film having protrusions and depressions can be readily formed.

As has been explained, in the liquid crystal display of the present invention, the arrangement for providing two different director configurations simultaneously on different arbitrary regions used for the display in the liquid crystal layer, that is, the alignment mechanism, is not especially limited as long as it can provide two different director configurations simultaneously on different arbitrary regions used for the display in the liquid crystal display. Examples of the alignment mechanism include: electrodes or applied voltages which provide different voltages to or generate different electric fields in the different arbitrary regions used for the display in the liquid crystal, an alignment film to which the alignment treatment is applied in at least two different orientations and provided to each of the different arbitrary regions used for the display in the liquid crystal display, an insulation film or substrate formed to have at least two different thicknesses on the regions used for the display in the liquid crystal layer, particular kinds of liquid crystal materials, a liquid crystal layer arrangement structured to be driven independently, polarization plates, phase difference compensation plates, or a combination of the aforementioned.

According to the present invention, satisfactory display can be shown on both the reflection display section and transmission display section by the aforementioned means and alignment mechanism. However, an optimal ratio of the reflection display section to the transmission display section for showing satisfactory display varies depending on the desired display, such as color display or monochrome display, or whether the display is shown mainly by the reflection display or transmission display.

In the liquid crystal display of the present invention, in case that both the reflection display section and the transmission display section show color display, it is preferable that an area of the reflection display section accounts for 30% or above and 90% or less of a total of areas of the reflection display section and the transmission display section.

According to the above arrangement, satisfactory color display can be shown both in the reflection display section and transmission display section.

Also, it is preferable that the display content is not inverted in the reflection display section and transmission display section from the standpoint of the visibility. This is because, if the display content is inverted in the reflection display section and transmission display section under the circumstance where the lighting environment changes or such a change is hard to predict, a contrast ratio of the display changes considerably with the luminance of the ambient light. Such a change in the contrast ratio is deemed as a similar phenomenon to the wash-out in terms of the visibility, thereby deteriorating the visibility considerably.

Thus, to secure the visibility, it is very important that the transmission display section and reflection display section show the light display simultaneously, and the transmission display section and reflection display section show dark display simultaneously.

Thus, the liquid crystal display of the present invention is arranged in such a manner that when the transmission display section shows the light display, so does the reflection display section, and when the transmission display section shows the dark display, so does the reflection display section.

According to the present invention, the reflection display section can show the light display when the transmission display section does so, and the reflection display section shows the dark display when the transmission display section does so by changing the alignment mechanism or the thicknesses of the liquid crystal layer. In particular, according to the present invention, even if the display content inverts in the reflection display section and transmission display section if no countermeasure is taken, both the sections readily can show the same kind of display by controlling the overwriting of the display content in the reflection display section and transmission display section independently by employing the display content overwriting means as the alignment mechanism. Thus, according to the above arrangement, there can be offered an effect that satisfactory visibility can be secured.

Further, it is preferable that the liquid crystal display of the present invention is arranged in such a manner that the liquid crystal layer is made of liquid crystal composition prepared by blending a dichroic dye with liquid crystal. If the liquid crystal layer is made of liquid crystal composition prepared by blending a dichroic dye with liquid crystal, an amount of absorbed light can be optimized in each of the reflection display section and transmission display section.

It is effective to adopt a method of using the birefringence or polarization rotation phenomenon using the polarization plate as the display method for showing satisfactory display on both the reflection display section and transmission display section.

For this reason, it is preferable that a polarization plate is provided to at least one of the pair of substrates on a surface which does not touch the liquid crystal layer.

According to the above arrangement, since optimal birefringence can be set in each of the reflection display section and transmission display section, a satisfactory display can be shown on each. Here, in order to realize sufficient display reliably in the transmission display section in a liquid crystal display adopting the polarization plate method in the reflection display section and having different thicknesses of the liquid crystal layer in the reflection display section and transmission display section, a polarization plate has to be provided in the transmission display section on the light incident side in addition to the one provided on the display surface side.

Also, in the liquid crystal display furnished with the polarization plate, to switch the display, it is preferable that an amount of change of the phase difference in the light caused by a change in the alignment in response to a voltage applied to the liquid crystal layer be set suitably for the light passing through liquid crystal layer and returning through the same in the reflection display section, and suitably for the light passing through the liquid crystal layer in the transmission display section.

For this reason, it is preferable to arrange the liquid crystal display of the present invention in such a manner as to further comprise voltage applying means for applying a voltage to the liquid crystal layer in such a manner that display light on the reflecting means of the reflection display section has a phase difference of approximately 90 between the light display and the dark display, and so that display light going out from the liquid crystal layer in the transmission display section has a phase difference of approximately 180 between the light display and dark display.

In this case, it is preferable that the liquid crystal layer is aligned with a twist between the pair of substrates at a twist angle in a range between 60 and 100 inclusive, or in a range between 0 and 40 inclusive.

When the liquid crystal is assembled in such a manner that the liquid crystal layer is aligned with a twist between the pair of substrates at a twist angle in a range between 60 and 100 inclusive, a change of the almost rotatory polarized light along the twist of the director configuration of the liquid crystal can be used for the display in the liquid crystal layer in the transmission display section, whereas in the refection display section, a change of the polarized light controlled by the optical rotatory polarization and retardation can be used for the display.

When the liquid crystal is assembled in such a manner that the liquid crystal layer is aligned with a twist between the pair of substrates at a twist angle in a range between 0 and 40 inclusive, a change of the retardation can be used for the display in the liquid crystal layer both in the transmission display section and reflection display section.

Also, in the liquid crystal display of the present invention, satisfactory display can be shown even if the director configuration of the liquid crystal is only changed along an in-plane orientation parallel to the substrates.

To be more specific, the liquid crystal display of the present invention may be arranged in such a manner that the liquid crystal display element shows the display by changing the director configuration of the liquid crystal layer by rotating liquid crystal molecules in parallel with the pair of substrates in at least one of the reflection display section and the transmission display section.

Further, in the present invention, the drawback of the in-plane switching method, that is, low light utilization, can be overcome by positively exploiting for display, as reflection display, the insufficient director configuration of the liquid crystal that causes the low transmittance. In other words, the liquid crystal display of the present invention may be arranged in such a manner that the liquid crystal display element includes, in one of the reflection display section and transmission display section, voltage applying means for generating an electric field in the liquid crystal display along an in-plane direction of the pair of substrates.

The liquid crystal layer may be aligned either in parallel with the display surface like in most of the conventional cases, or perpendicular to the display surface. In other words, the liquid crystal display of the present invention may be arranged in such a manner that at least one of the pair of substrates includes a vertical aligning alignment film on a surface touching the liquid crystal layer at a region corresponding to at least one of the reflection display section and the transmission display section.

When the vertical aligning alignment film is provided to the substrate and the liquid crystal is aligned perpendicular to the substrates in the above manner, there can be offered an advantage that a display contrast ratio can be improved, which has an advantageous effect in showing satisfactory display on the liquid crystal display.

In addition, when color display is shown on the liquid crystal display of the present invention, not only the liquid crystal layer, but also design of the color filter layer is critical, which plays an important role in color reproduction. According to the study of the inventors of the present invention, the liquid crystal display of the transflective type includes two styles.

One is a style that mainly shows the transmission display in general use and uses the reflection display supplementarily, so that the wash-out can be prevented under the lighting environment where the ambient light is too strong, and therefore, this style can be used in diversified lighting environments compared with displays of the luminous type and liquid crystal displays which show transmission display alone. The other is a style that mainly shows the reflection display in general use, thereby exploiting the advantage of the reflection display that the power consumption is small, and turns ON the lighting device known as the back light under the circumstances where the lighting is too weak, and therefore, like the former style, this style can be also used in diversified lighting environments.

In the former style, (the style showing the transmission display mainly), by providing a color filter having a transmission color at least to a region corresponding to the transmission display section in a region forming the display region of each pixel on one of the pair of substrates, it has become possible to provide a liquid crystal display with excellent visibility, capable of showing high-resolution color display while using both the reflected light and transmitted light for the display.

When the color display is shown in the above manner, it is effective if the color filter having a transmission color is provided at least to the transmission display section in each pixel, and the reflection display section either is not provided with a color filter, or is at least partially provided with a color filter having the same brightness as the color filter provided to the transmission display section, or with a color filter having a transmission color brighter than that of the color filter provided to the transmission display section.

This is because when the color filter used for the transmission display section is used for the reflection display section directly, the brightness becomes insufficient. Thus, when showing the color display in the reflection display section, the brightness can be compensated by either forming in the reflection display section a region having no color filter, or providing the reflection display section with a color filter having a transmission color brighter than the transmission color of the color filter provided. Consequently, the color display can be shown in the reflection display while securing necessary reflectance for the reflection display section.

Since the display light passes through the color filter twice in the reflection display section, it is preferable to use a color filter having a transmission color brighter than the one in the transmission display section for the reflection display section.

Also, in the former style mainly using the transmission display, when the reflection display section is arranged to have a region where no color filter is formed, a display voltage signal necessary for the transmission display is a signal suitable for the color display, and when the color filter is not used at all in the reflection display section, a display voltage signal necessary for the transmission display is a signal suitable for the monochrome display. Thus, in the case where no color filter is provided in the reflection display section, the percentage of the contribution of the pixels of respective colors to the brightness is in proportion to the luminous transmittance in respective colors in the transmission display section, but it is equal in the reflection display section. Hence, in the case where no color filter is provided in the reflection display section, it is preferable to change the area of the portion of the reflection display section where the color display is not shown in accordance with the luminous transmittance in the color of each color filter used for the transmission display.

In the latter style (the style mainly using the reflection display), by providing a color filter having a transmission color at least to a region corresponding to the reflection display section in the region forming the display region of each pixel on at least one of the pair of substrates, it has become possible to provide a liquid crystal display with excellent visibility and capable of showing high-resolution color display and using both the reflected light and transmitted light for the display.

When the color display is shown in the above manner, it is effective if the color filter having a transmission color is provided at least to the reflection display section in each pixel, and the transmission display section either is not provided with a color filter, or is at least partially provided with a color filter, having a transmission color with chroma as good as or better than the chroma of the transmission color of the color filter provided to the reflection display section.

In this style mainly using the reflection display, when the transmission display section shows the monochrome display by omitting the color filter, the transmission display section can be made smaller because the light transmittance increases. Accordingly, a larger area can be secured as the reflection display section, and as a consequence, more satisfactory display can be obtained in the reflection display in the normal use.

In this style mainly using the reflection display, the contribution of the monochrome display in the transmission display section of each pixel to brightness can be set adequately in consideration of the luminous transmittance by changing the area of the part of the transmission display section where the color display is not shown, in response to the luminous transmittance in each color of the color filter used for the reflection display.

Also, as has been explained, since the liquid crystal display of the present invention has the reflection display section, it renders the characteristics of the conventional liquid crystal display of the reflection type, namely, small power consumption. However, if power consuming illumination light is kept turned ON, the power consumption undesirably increases.

Thus, it is preferable to arrange the liquid crystal display of the present invention in such a manner as to further comprise a lighting device for emitting light to the liquid crystal display element from behind, the lighting device also serving as display surface luminance changing means for changing luminance on the display surface.

According to the above arrangement, satisfactory visibility is realized while reducing the power consumption by changing the luminance on the display surface by means of the lighting device.

In this case, it is preferable that the lighting device changes the luminance on the display surface in response to adapted luminance in such a manner as to attain perceived brightness ranging from 10 brils inclusive to 30 brils exclusive.

The perceived brightness is determined by the adapted luminance and the luminance on the display surface. Here, to realize satisfactory visibility while reducing the power consumption, it is very preferable, if, in changing the brightness of the display surface to attain the foregoing perceived brightness, the lighting device changes its ON/OFF state or luminance in response to the display content on the liquid crystal display and the adapted luminance which varies with the visual circumstances such as the lighting. In particular, in case that the lighting device is controlled from outside the liquid crystal display element by pressed coordinate detecting type input means, such as a touch panel, the above effect becomes more noticeable.

In addition, according to the above arrangement, the visibility can be improved where the transmission display is mainly responsible for the display. Thus, there can be offered an effect that satisfactory visibility can be realized with reduced power consumption.

The liquid crystal display of the transflective type of the present invention is particularly advantageous in that the pressed coordinate detecting type input means, such as a touch panel, can be used more readily compared with liquid crystal displays of the reflection type which uses a so-called front light. Hence, to provide a low-power consumption liquid crystal display incorporating the input device, it is effective to realize satisfactory display on the display of the transflective type using the pressed coordinate detecting type input means.

In other words, it is preferable that the liquid crystal display of the present invention further comprises pressed coordinate detecting type input means, superimposed on a display surface, which, when pressed, detect a pressed coordinate position.

Further, in case that such pressed coordinate detecting type input means is used, whether the viewer is using the display or not can be readily detected by a signal from the pressed coordinate detecting type input means. Thus, to realize satisfactory visibility while reducing the power consumption, it is effective to change the luminance on the display surface by changing the luminance of the lighting device (which affects overall power consumption of the liquid crystal display), or to change the director configuration of the liquid crystal, in response to the above signal from the pressed coordinate detecting type input means.

For this reason, it is preferable that the liquid crystal display of the present invention further comprises pressed coordinate detecting type input means, superimposed on the display surface, which, when pressed, detect a pressed coordinate position, wherein the lighting device changes the luminance on the display surface in association with an output signal from the pressed coordinate detecting type input means.

Also, it is preferable that the liquid crystal display of the present invention further comprises pressed coordinate detecting type input means, superimposed on a display surface, which, when pressed, detect a pressed coordinate position, wherein the alignment mechanism changes the director configuration of the liquid crystal layer in at least one of the reflection display section and the transmission display section in association with an output signal from the pressed coordinate detecting type input means.

Moreover, it is preferable that the liquid crystal display of the present invention further comprise pressed coordinate detecting type input means, superimposed on a display surface, which, when pressed, detect a pressed coordinate position, and a polarization plate, the polarization plate, the pressed coordinate detecting type input means, and the liquid crystal display element being provided in that order.

According to the above arrangements, an effect that a low-power consumption liquid crystal display incorporating the input device can be provided, which uses birefringence for the display, and which includes a polarization plate and pressed coordinate detecting type input means. In addition, satisfactory visibility can be attained because the polarization plate also absorbs unwanted reflected light from the pressed coordination detecting type input means.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display device comprising:
    a pair of polarization plates;
    a pair of substrates interposed between said polarization plates;
    a liquid crystal layer interposed between said substrates;
    a back light device provided adjacent to one of said polarization plates; and
    a plurality of pixels;
    some of said pixels each including a light reflecting display section and a light transmitting display section, wherein the light transmitting display section is without the light reflecting display section;
    wherein at least one of said some of said pixels includes a light transmitting display section provided with a color filter, and includes a light reflecting display section that is without color filters.

2. The liquid crystal display device of claim 1, wherein whole of the light reflecting display section of the at least one of said some of said pixels is without color filters.

3. The liquid crystal display device of claim 1, wherein whole of the light reflecting display section of each said some of said pixels is without color filters.

* * * * *